United States Patent
Yamashita

(10) Patent No.: US 8,164,611 B2
(45) Date of Patent: *Apr. 24, 2012

(54) MULTIBEAM IMAGE FORMING

(75) Inventor: Hidetoshi Yamashita, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 260 days.

This patent is subject to a terminal disclaimer.

(21) Appl. No.: 12/561,748

(22) Filed: Sep. 17, 2009

(65) Prior Publication Data
US 2010/0150591 A1  Jun. 17, 2010

(30) Foreign Application Priority Data

Sep. 17, 2008 (JP) ................................ 2008-238710
Sep. 3, 2009 (JP) ................................ 2009-203653

(51) Int. Cl.
B41J 2/435 (2006.01)
(52) U.S. Cl. ........................................ 347/236; 347/246
(58) Field of Classification Search .................. 347/132, 347/133, 162, 168, 236, 237, 246, 247
See application file for complete search history.

(56) References Cited

U.S. PATENT DOCUMENTS

| | | | | |
|---|---|---|---|---|
| 5,892,219 A * | 4/1999 | Minakuchi et al. | ........... | 250/205 |
| 5,959,655 A * | 9/1999 | Maruo et al. | ................. | 347/246 |
| 7,253,386 B2 * | 8/2007 | Ernst | ............................. | 250/205 |
| 7,511,868 B2 * | 3/2009 | Nakajima | ................. | 359/204.1 |
| 7,542,189 B2 * | 6/2009 | Tanimura et al. | ......... | 359/205.1 |
| 2008/0292342 A1 | 11/2008 | Yamashita | | |
| 2009/0190943 A1 | 7/2009 | Yamashita | | |

FOREIGN PATENT DOCUMENTS

| | | |
|---|---|---|
| JP | 2005-161790 | 6/2005 |
| JP | 2006-284822 | 10/2006 |
| JP | 2007-21826 | 2/2007 |
| JP | 2007-79295 | 3/2007 |
| JP | 2007-171648 | 7/2007 |

OTHER PUBLICATIONS

U.S. Appl. No. 12/404,477, filed Mar. 16, 2009, Yamashita.

* cited by examiner

Primary Examiner — Hai C Pham
(74) Attorney, Agent, or Firm — Oblon, Spivak, McClelland, Maier & Neustadt, L.L.P.

(57) ABSTRACT

A first beam splitter splits each laser beam into a first beam and a second beam. A deflecting unit deflects a direction of the second beam. A second beam splitter splits the second beam into multiple split beams. A first photoelectric converting unit measures intensity of the first beam and outputs first voltage. A second photoelectric converting unit measures intensity of each split beam and outputs second voltage. A control unit updates a driving-current correction value using the first voltage and the second voltage, corrects a driving current, and controls intensity of the laser beam based on corrected driving current.

19 Claims, 47 Drawing Sheets

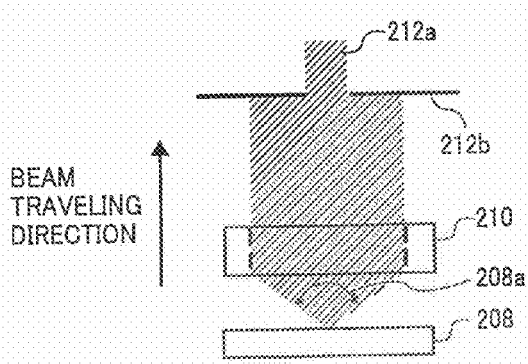
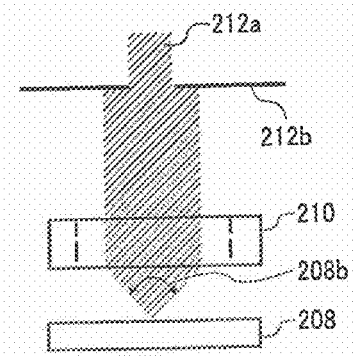
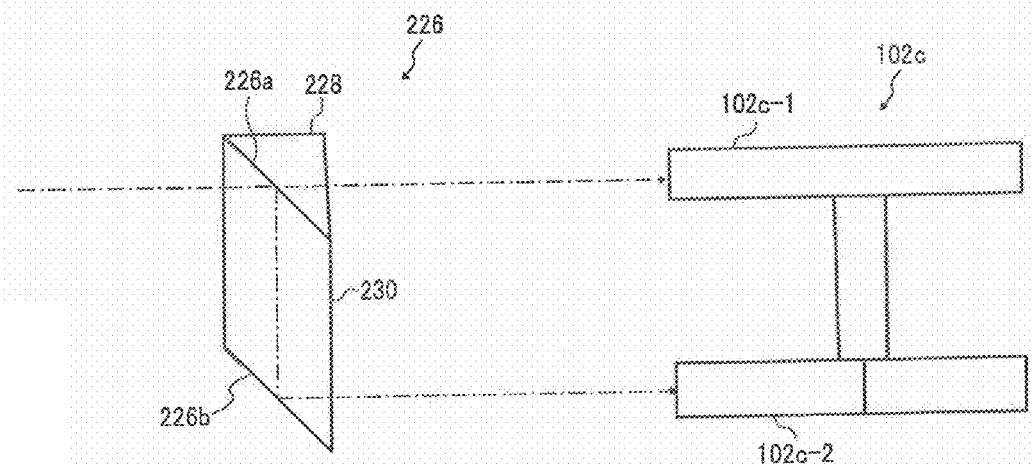

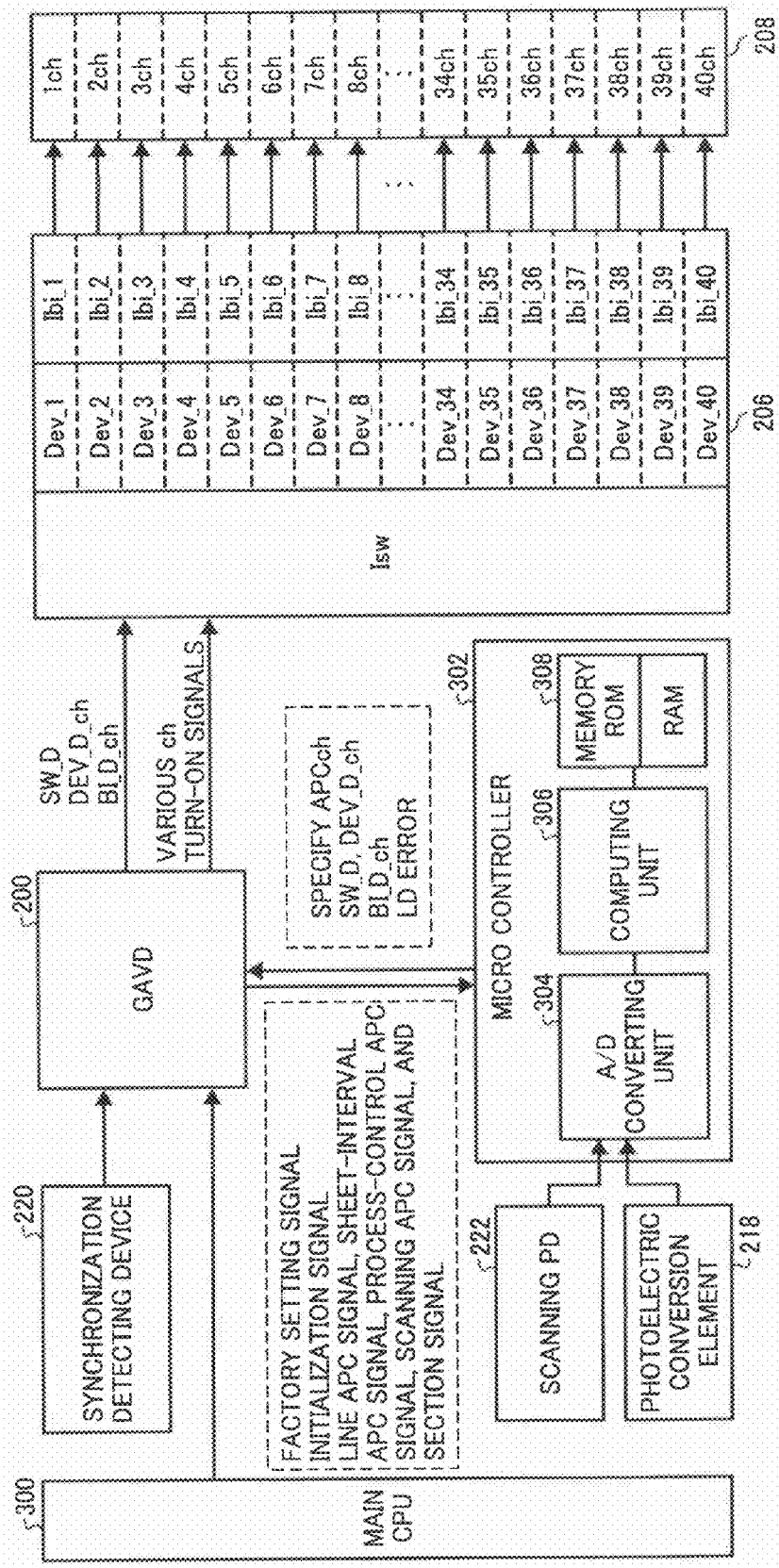

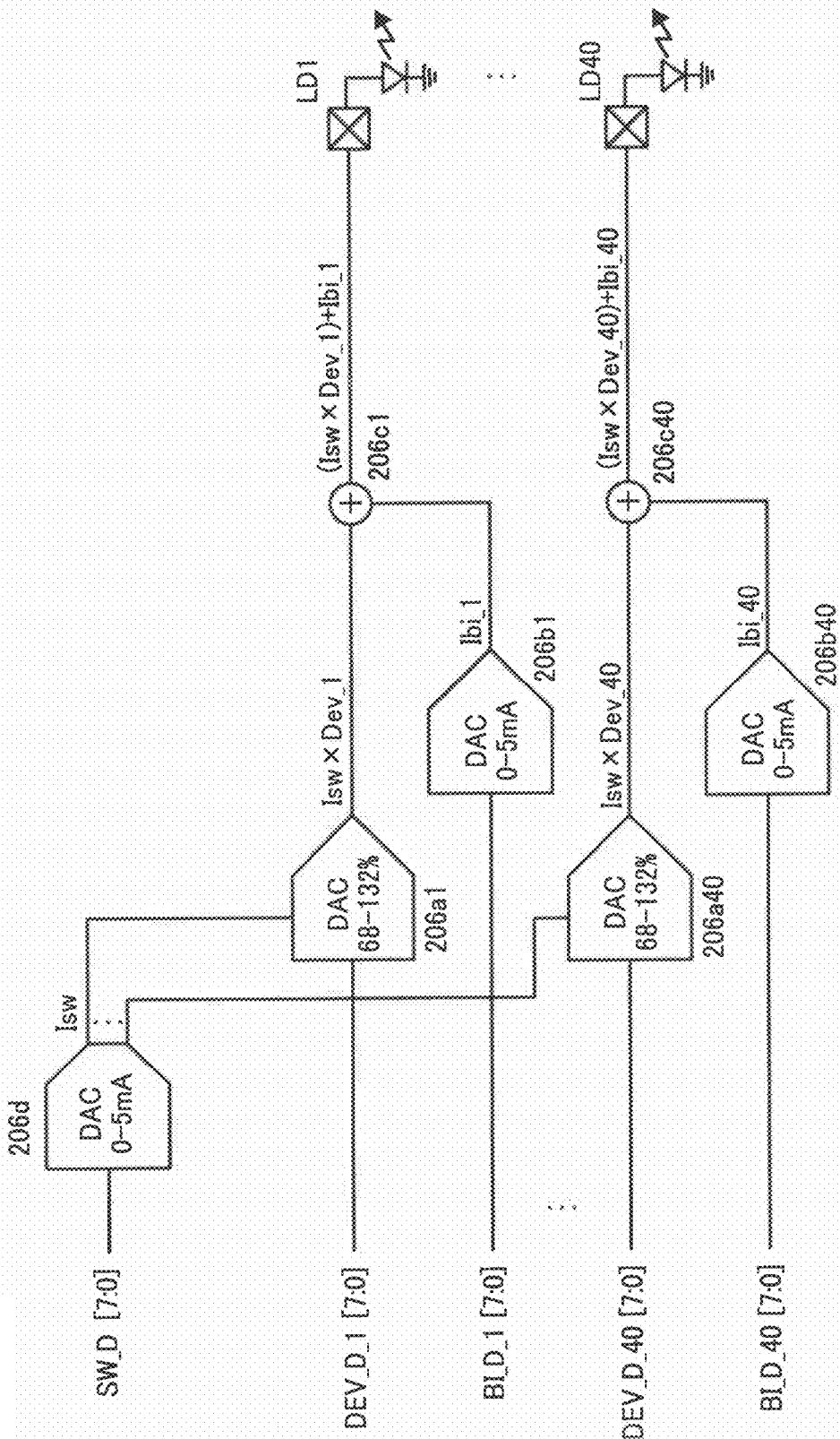

FIG. 13

| FIG. 13A |
|----------|
| FIG. 13B |

| CHANNEL NUMBER | INTENSITY MONITOR VOLTAGE Vpd OBSERVED AT TARGET INTENSITY | ROM AREA DEFAULT COMMON CURRENT Isw(0) | SCANNING MONITOR VOLTAGE Vsc OBSERVED AT TARGET INTENSITY |
|---|---|---|---|
| ch1 | Vpd_1a(0) | MEDIAN OF MAXIMUM VALUE AND MINIMUM VALUE AMONG Isw_1a(0) TO Isw_40a(0)=Isw_a(0) | Vsc_a(0) |
| ch2 | Vpd_2a(0) | | |
| ch3 | Vpd_3a(0) | | |
| ch4 | Vpd_4a(0) | | |
| ch5 | Vpd_5a(0) | | |
| ⋮ | ⋮ | | |
| ch39 | Vpd_39a(0) | | |
| ch40 | Vpd_40a(0) | | |
| ch1 | Vpd_1b(0) | MEDIAN OF MAXIMUM VALUE AND MINIMUM VALUE AMONG Isw_1b(0) TO Isw_40b(0)=Isw_b(0) | Vsc_b(0) |
| ch2 | Vpd_2b(0) | | |
| ch3 | Vpd_3b(0) | | |
| ch4 | Vpd_4b(0) | | |
| ch5 | Vpd_5b(0) | | |
| ⋮ | ⋮ | | |
| ch39 | Vpd_39b(0) | | |
| ch40 | Vpd_40b(0) | | |

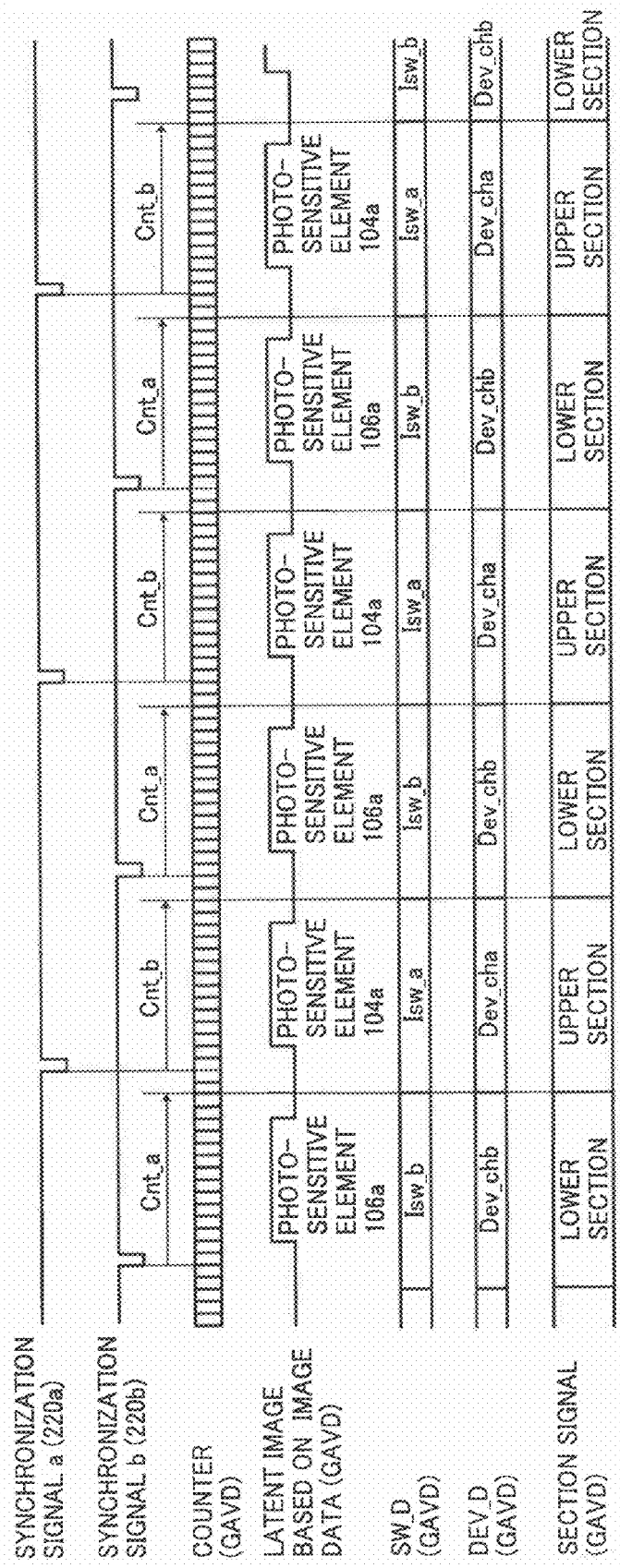

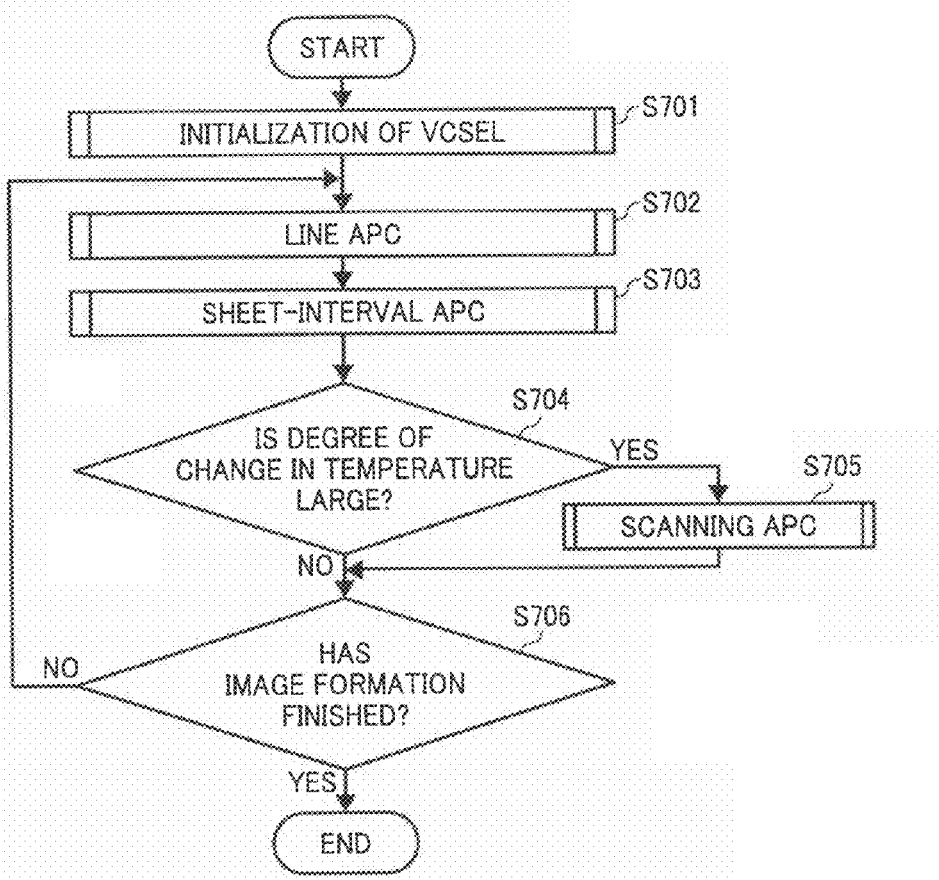
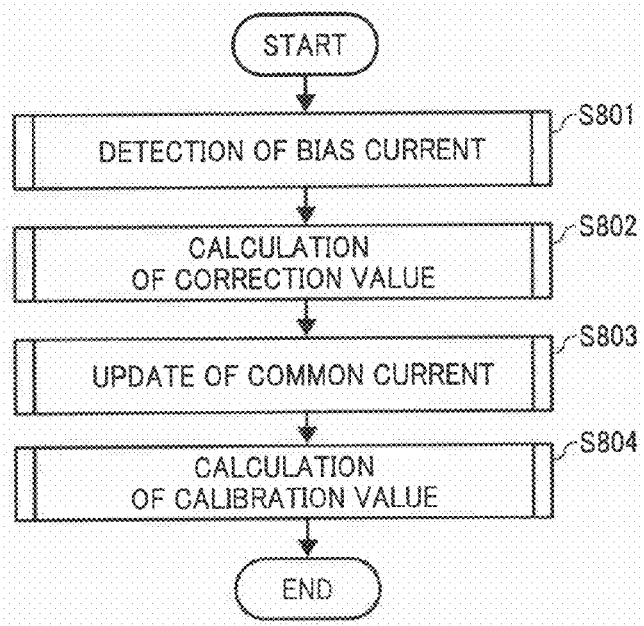

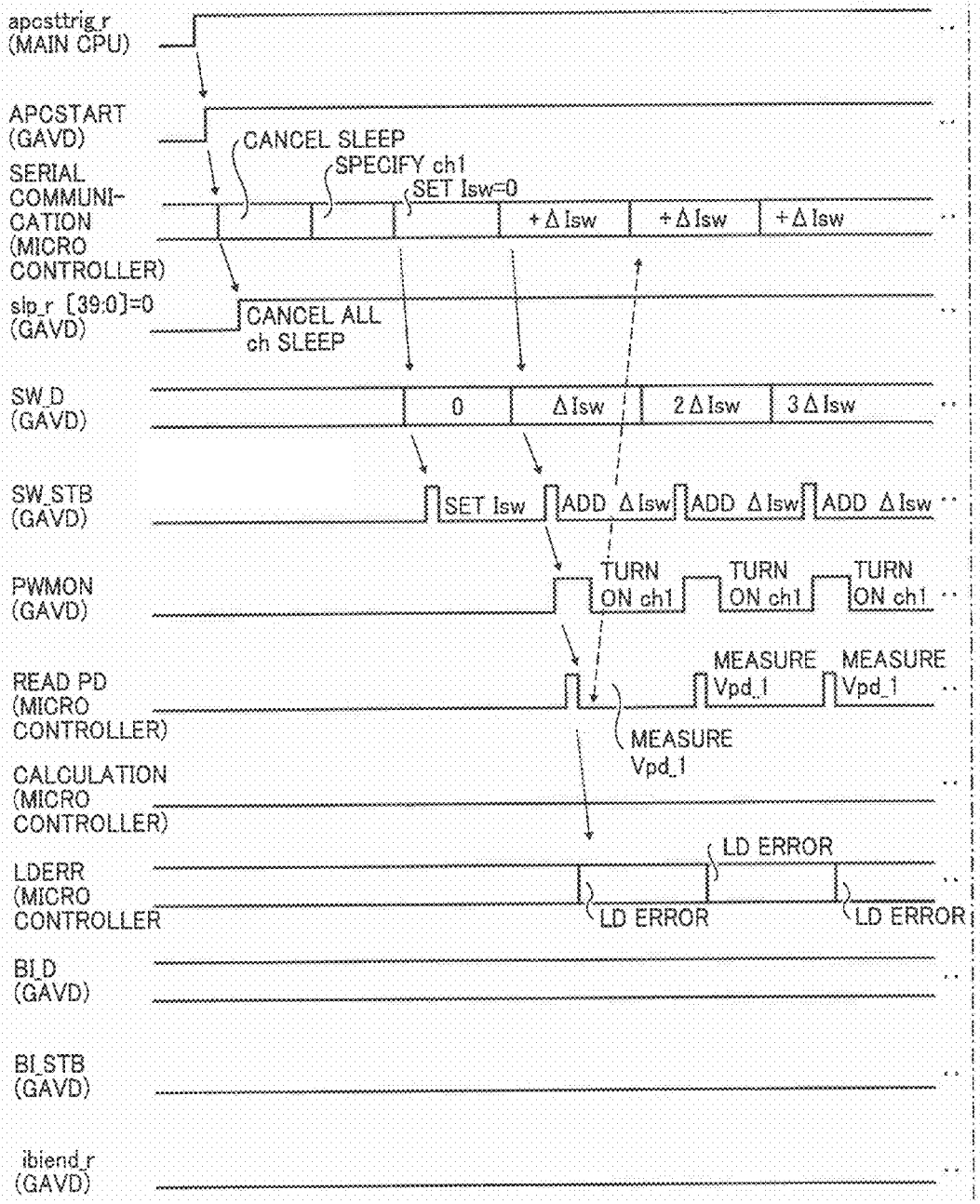

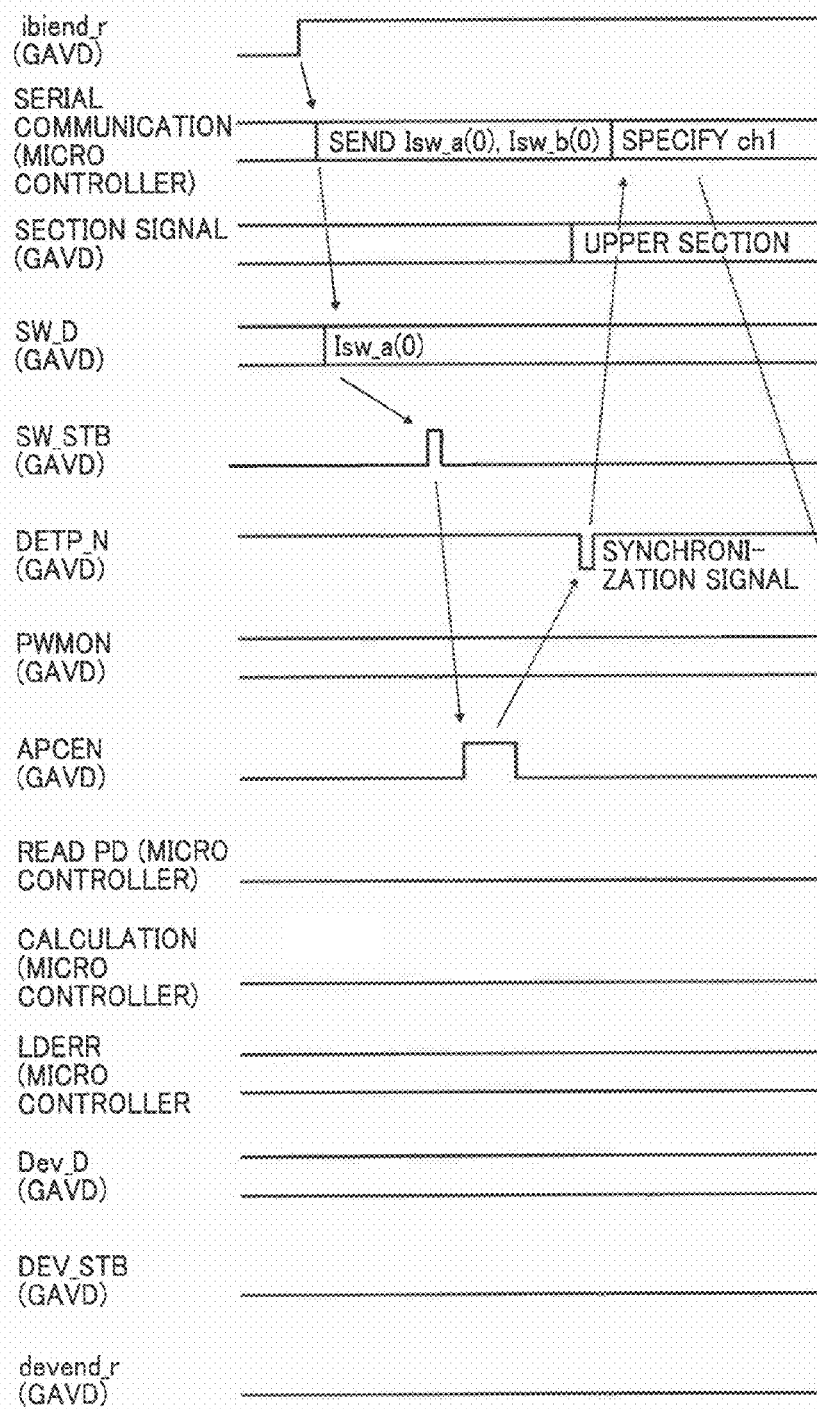

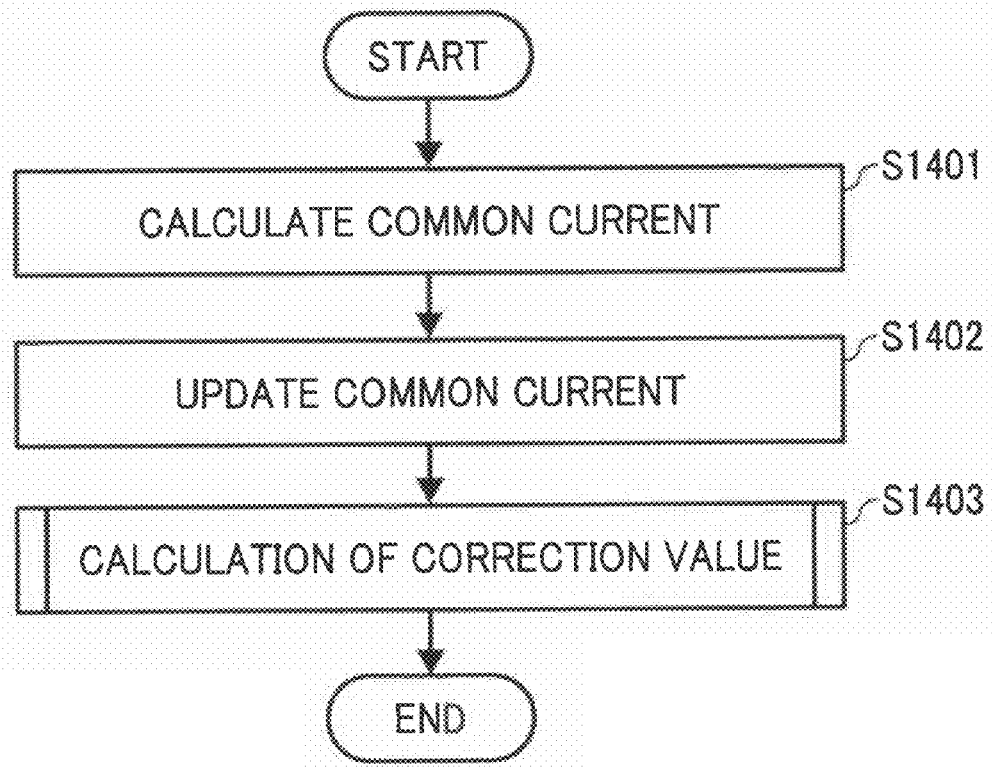

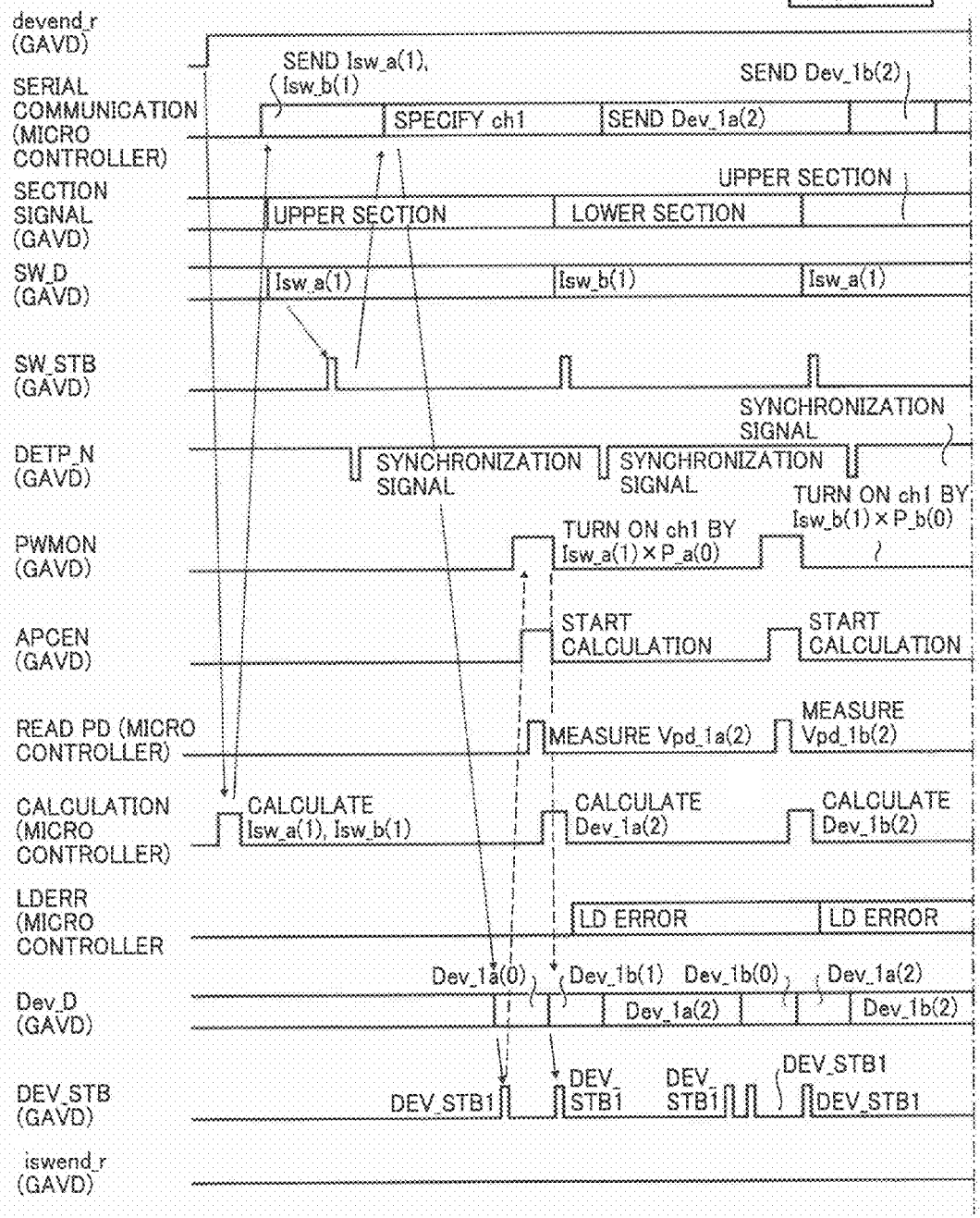

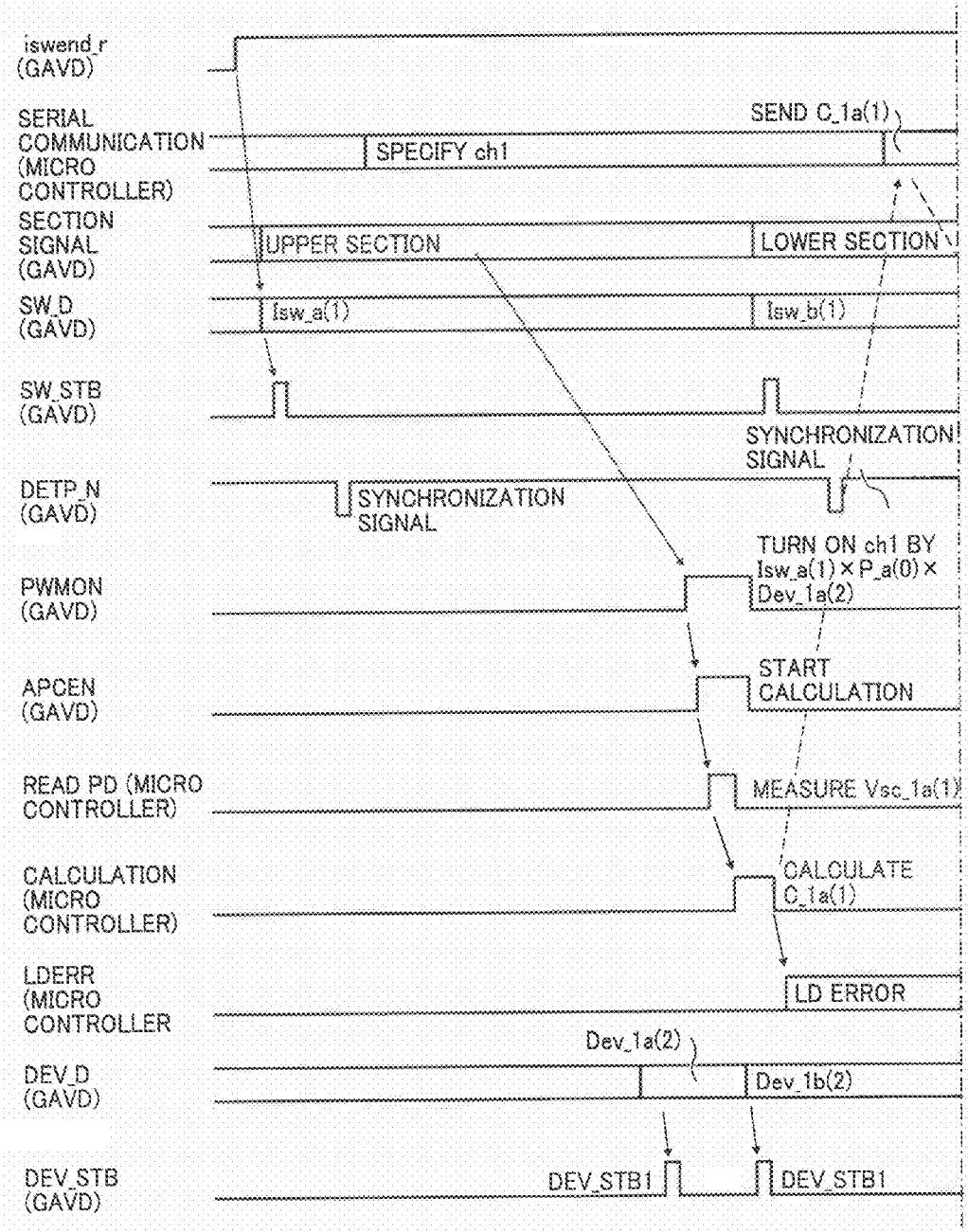

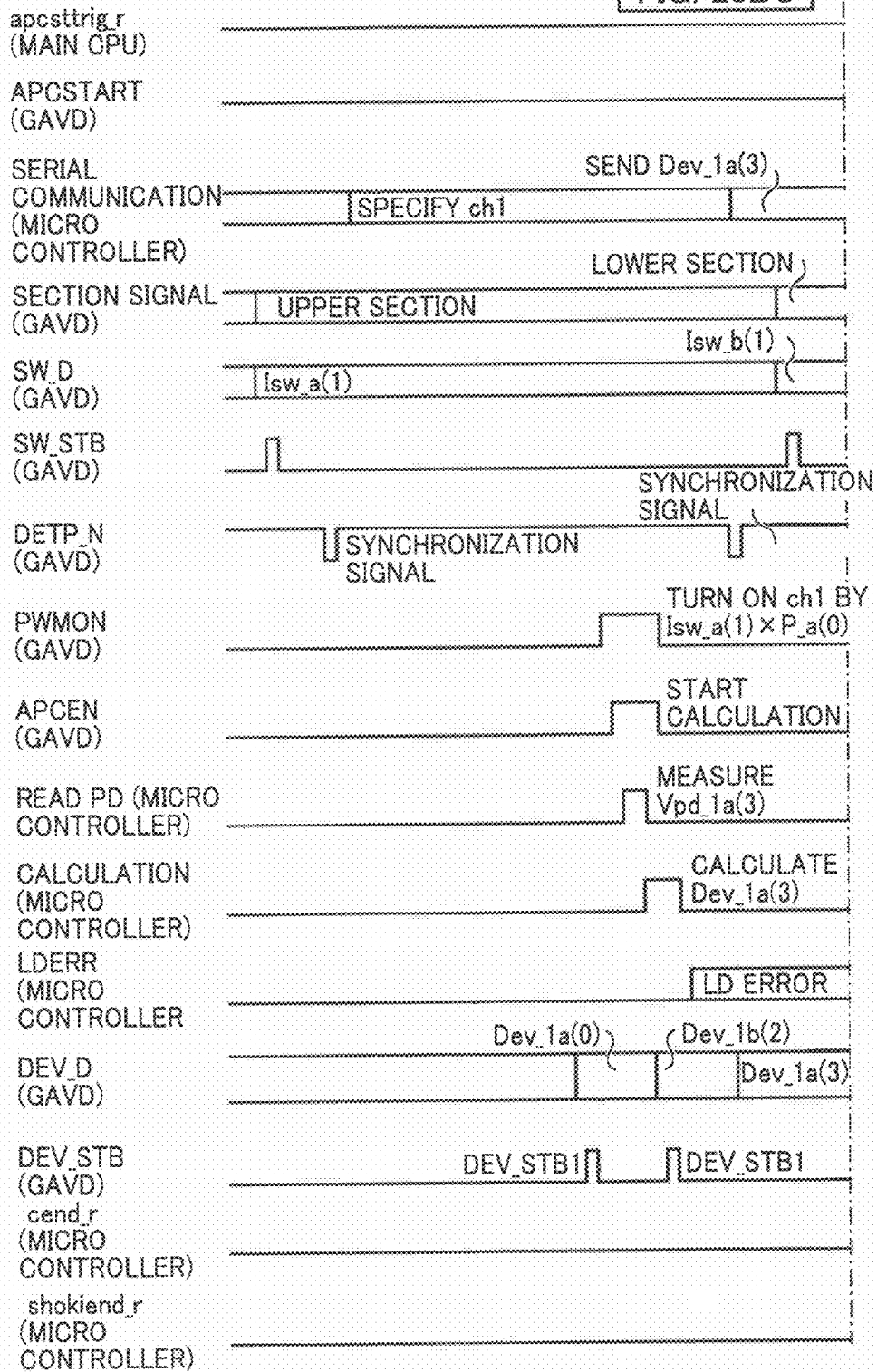

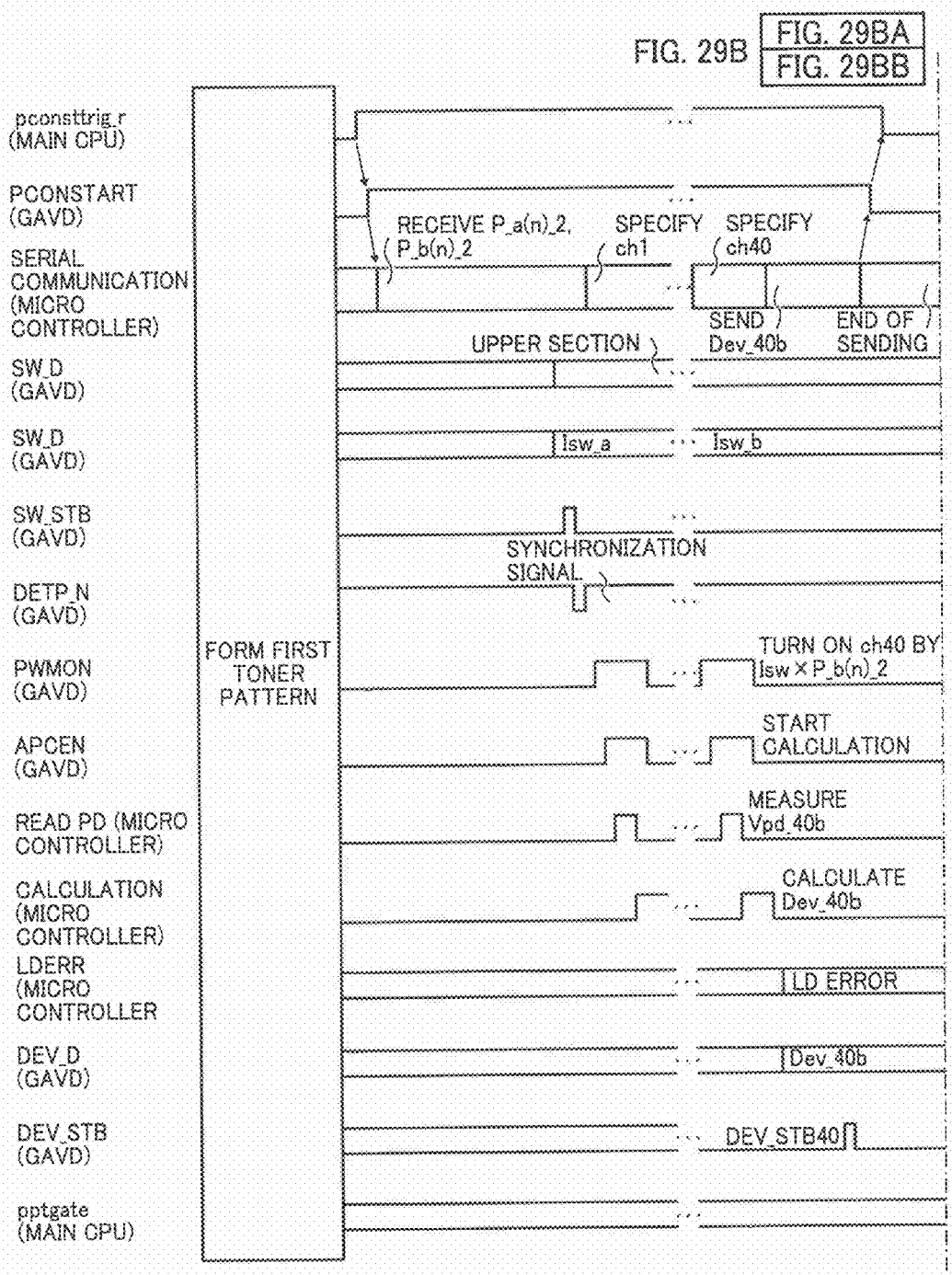

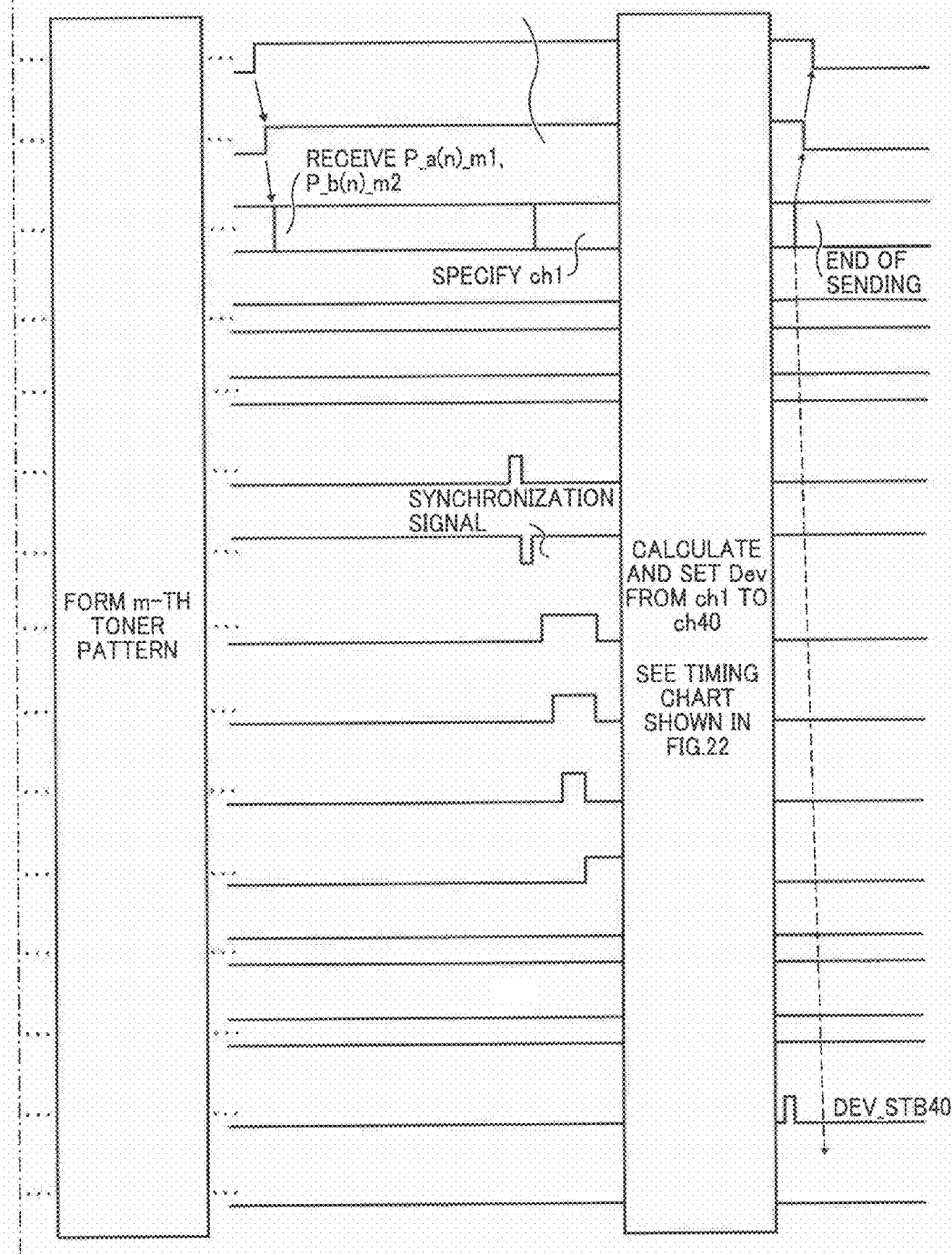

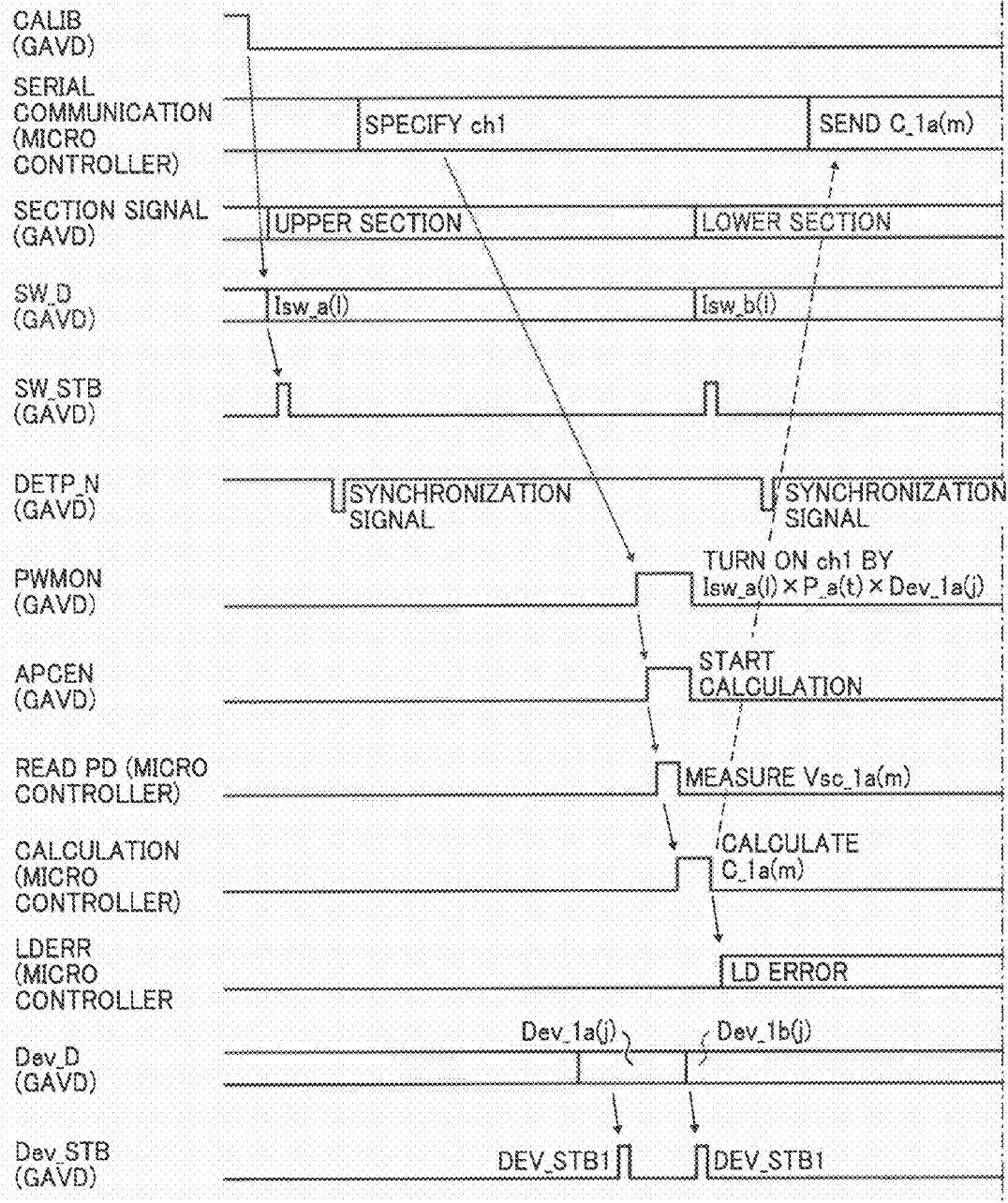

MULTIBEAM IMAGE FORMING

CROSS-REFERENCE TO RELATED APPLICATIONS

The present application claims priority to and incorporates by reference the entire contents of Japanese Patent Application No. 2008-238710 filed in Japan on Sep. 17, 2008 and Japanese Patent Application No. 2009-203653 filed in Japan on Sep. 3, 2009.

BACKGROUND OF THE INVENTION

1. Field of the Invention

The present invention relates to an image forming apparatus and an image forming method for forming an image using a multibeam system.

2. Description of the Related Art

A typical electrophotographic image forming apparatus first forms a latent image on a photosensitive element by exposing a charged photosensitive element to light emitted from a laser diode (LD) and then develops the latent image with developer. A typical LD emits one to four or, at most, eight laser beams from each semiconductor element. Surface-emitting lasers including vertical-cavity surface-emitting lasers (VCSELs) have been put to practical use and are available commercially. High-quality, high-speed image forming apparatuses using VCSELs have accordingly been provided.

A typical VCSEL emits about 40 laser beams from each chip. Therefore, if a VCSEL is used in an image forming apparatus to form a latent image, the image forming apparatus can perform high-quality, high-speed image formation. However, an adequate latent image cannot be formed just by replacing a laser device including an LD with a laser device including a VCSEL. The VCSEL emits multiple laser beams from a predetermined light-emitting area. It is necessary to control intensities of the laser beams to be emitted in order to form an adequate latent image. Because the intensities are integrated in the light-emitting area in the VCSEL, controlling the intensities of the laser beams (hereinafter, "intensity control") is especially required to always form a high-quality latent image.

As the number of the laser beams increases, the intensity control takes longer if the intensity control is performed in the same manner. This eventually decreases the speed of image formation, which reduces the advantage of using the VCSEL. If some steps of the intensity control are skipped to increase the speed, a high-quality image cannot be formed.

Various technologies are offered to solve the problem. For example, Japanese Patent Application Laid-open No. 2007-021826 discloses an image forming apparatus and an optical writing device. The image forming apparatus or the optical writing device includes a light source unit that includes a plurality of light-emitting elements and an intensity detecting element that detects the intensity of light emitted from each of the light-emitting elements. The optical writing device includes volume resistances and sample/hold capacitors and uses those elements to perform intensity control. The number of the volume resistances is equal to the light beams. The intensities of the multiple laser beams can be controlled correctly with the method that is disclosed in Japanese Patent Application Laid-open No. 2007-021826. However, a larger control circuit is required to control the VCSELs. Moreover, it is necessary to adjust the same number of the volume resistances as emitted laser beams in order to perform intensity control, which decreases operational efficiency and requires additional maintenance.

In a typical color image forming apparatus, one LD or one VCSEL is allocated to one color. In contrast, in a scanning device disclosed in Japanese Patent Application Laid-open No. 2006-284822, two different-colored latent-images are formed using two beams that are split by a half-mirror prism from a single laser beam that is emitted from one VCSEL. The manner of exposure using the split beams is called, hereinafter, "split-beam exposure". The split-beam exposure decreases the number of the required VCSELs by half, which reduces the manufacturing cost and occurrence of failures related to the light sources.

If the split-beam exposure disclosed in Japanese Patent Application Laid-open No. 2006-284822 is used, the number of the volume resistances and the number of the sample/hold capacitors become double, which requires a much larger control circuit. In the split-beam exposure, as described above, the latent images are formed on the two photosensitive elements for different colors using the laser beam emitted from a single VCSEL. Because, after splitting by the half-mirror prism, the split beams travel along different optical paths, the transmittances of the split beams are different from each other. Therefore, it is necessary to correct the intensity of the laser beam that is emitted from the single VCSEL using different correction values.

SUMMARY OF THE INVENTION

It is an object of the present invention to at least partially solve the problems in the conventional technology.

According to one aspect of the present invention, there is provided an image forming apparatus including: a light source that emits a plurality of laser beams; a first beam splitter that splits each of the laser beams into a first beam for measuring an intensity of the laser beam and a second beam for scanning a photosensitive element to form an image based on image data; a deflecting unit that deflects a direction of the second beam using a multifaceted reflecting mirror provided in a multi-stage with a common rotating axis; a second beam splitter that splits the second beam into a plurality of split beams so that each of the split beams is incident on a reflecting surface of the deflecting unit in each stage; a first photoelectric converting unit that measures an intensity of the first beam and outputs a first voltage corresponding to measured intensity of the first beam; a second photoelectric converting unit that measures an intensity of each of the split beams and outputs a second voltage corresponding to measured intensity of each of the split beams; and a control unit that updates, for each of the split beams, a driving-current correction value for correcting a driving current commonly set to for laser beams to be emitted from the light source in advance based on the first voltage and the second voltage, corrects the driving current using updated driving-current correction value, and controls intensities of the laser beams based on corrected driving current.

Furthermore, according to another aspect of the present invention, there is provided an image forming method for an image forming apparatus that includes a light source that emits a plurality of laser beams. The image forming method includes: first beam splitting including a first beam splitter splitting each of the laser beams into a first beam for measuring an intensity of the laser beam and a second beam for scanning a photosensitive element to form an image based on image data; deflecting including a deflecting unit including a direction of the second beam using a multifaceted reflecting mirror provided in a multi-stage with a common rotating axis; second beam splitting including a second beam splitter splitting the second beam into a plurality of split beams so that each of the split beams is incident on a reflecting surface of the deflecting unit in each stage; first converting including a first photoelectric converting unit measuring an intensity of the first beam and outputting a first voltage corresponding to measured intensity of the first beam; second converting including a second photoelectric converting unit measuring an intensity of each of the split beams and outputting a second voltage corresponding to measured intensity of each of the split beams; and controlling including a control unit updating, for each of the split beams, a driving-current correction value for correcting a driving current commonly set to for laser beams to be emitted from the light source in advance based on the first voltage and the second voltage, correcting the driving current using updated driving-current correction value, and controlling intensities of the laser beams based on corrected driving current.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6A is a schematic diagram that explains a ratio between a first area of the laser beam that passes through an aperture of the aperture mirror and a second area of the laser beam that is reflected by the light reflecting member, in which the laser beam has a large beam divergence angle;

FIG. 6B is a schematic diagram that explains the ratio between the first area and the second area, in which the laser beam has a small beam divergence angle;

FIG. 7 is a plane view of a beam-splitter prism and a polygon mirror, viewed from a direction indicated by an arrow B shown in FIG. 2;

FIG. 9 is a block diagram of a driving circuit of a VCSEL shown in FIG. 2;

FIG. 10 is a block diagram of a driver shown in FIG. 9;

FIG. 13 is a table of control values of the VCSEL that are stored in a ROM area of a micro controller;

FIG. 15 is a timing chart that explains switching between common currents Isw_a and Isw_b and correction values Dev_cha and Dev_chb in split-beam exposure;

FIG. 16 is a flowchart of an image forming process according to the first embodiment;

FIG. 17 is a flowchart of an initializing operation of the micro controller;

FIG. 23 is a flowchart of a common-current updating process;

FIGS. 29A and 29B are timing charts that explain processes by a process-control APC;

DETAILED DESCRIPTION OF THE PREFERRED EMBODIMENTS

Exemplary embodiments of the present invention are described in detail below with reference to the accompanying drawings. It is noted that the present invention is not limited to the exemplary embodiments.

Figure 1:
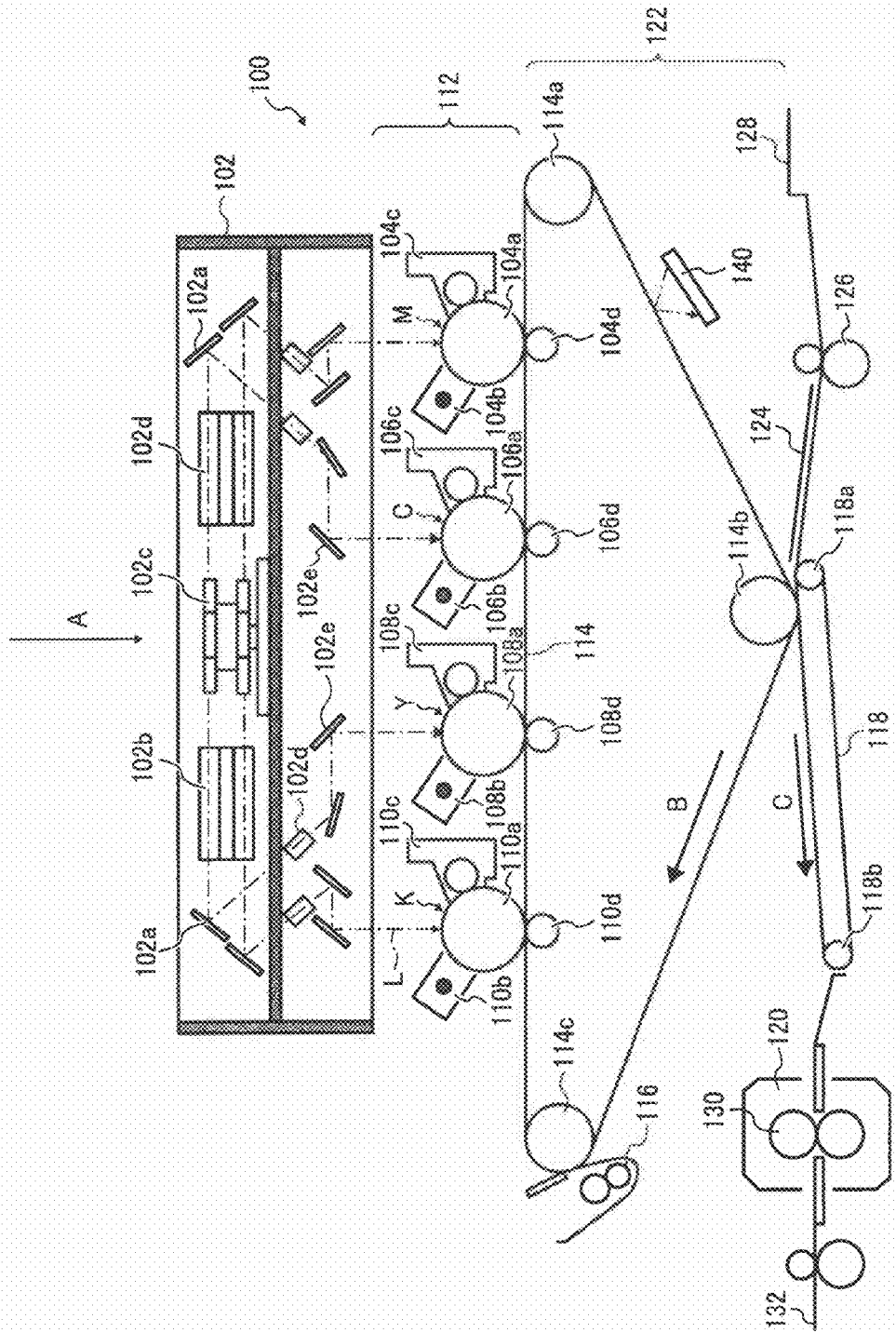
FIG. 1 is a schematic diagram of an image forming apparatus according to a first embodiment of the present invention.

FIG. 1 is a schematic diagram of an image forming apparatus 100 according to a first embodiment of the present invention. The image forming apparatus 100 includes an optical device 102 that includes optical devices, such as LDs (not shown) and a polygon mirror 102c; an image forming unit 112 that includes photosensitive elements 104a, 106a, 108a, and 110a, charging devices 104b, 106b, 108b, and 110b, and developing devices 104c, 106c, 108c, and 110c; and a transferring unit 122 that includes an intermediate transfer belt 114. In the optical device 102, the LDs emit light beams; the polygon mirror 102c receives the light beams from the LDs and deflects the light beams to an fθ lens 102b. The light beams are produced to irradiate the photosensitive elements 104a, 106a, 108a, and 110a for different colors including cyan (C), magenta (M), yellow (Y), and black (K), respectively. After passing through the fθ lens 102b, the light beams are reflected by reflecting mirrors 102a.

A wide toroidal lens (WTL) 102d shapes the corresponding light beam and then outputs the shaped light beam to a reflecting mirror 102e. The light beam is reflected by the reflecting mirror 102e and then irradiates the corresponding one of the photosensitive elements 104a, 106a, 108a, and 110a as a light beam L for exposure to form a latent image. Because various optical elements are used to irradiate the photosensitive elements 104a, 106a, 108a, and 110a, as described above, timing for irradiation by the light beam L is synchronized with respect to the main-scanning direction and the sub-scanning direction. The main-scanning direction corresponds to a scanning direction in which the light beam moves for scanning; the sub-scanning direction corresponds to a direction that is perpendicular to the main-scanning direction, i.e., direction in which the photosensitive elements 104a, 106a, 108a, and 110a rotate.

Each of the photosensitive elements 104a, 106a, 108a, and 110a includes a drum-shaped member made of conductive material, e.g., aluminum. A photoconductive layer that includes a charge generating layer and a charge transport layer is formed on the drum-shaped member. The surfaces of the photoconductive layers of the photosensitive elements 104a, 106a, 108a, and 110a are charged by the charging devices 104b, 106b, 108b, and 110b, respectively. Each of the charging devices 104b, 106b, 108b, and 110b includes a corotron, a scrotron, or a charging roller.

After charged by the charging devices 104b, 106b, 108b, and 110b, the photosensitive elements 104a, 106a, 108a, and 110a are exposed by the light beams L: thereby, latent images are formed on the photosensitive elements 104a, 106a, 108a, and 110a. After that, the latent images are developed into visual images with developer by the developing devices 104c, 106c, 108c, and 110c. Each of the developing devices 104c, 106c, 108c, and 110c includes a development sleeve, a developer supplying roller, and a restricting blade.

The cyan image, the magenta image, the yellow image and the black image are transferred from the photosensitive elements 104a, 106a, 108a, and 110a onto the rotating intermediate transfer belt 114 in a superimposed manner: thus, a multicolor image is formed on the intermediate transfer belt 114. The intermediate transfer belt 114 is rotated by conveyer rollers 114a, 114b, and 114c in a direction indicated by an arrow B. The multicolor image on the intermediate transfer belt 114 is conveyed to a secondary-transfer unit. The secondary-transfer unit includes a secondary-transfer belt 118 and conveyer rollers 118a and 118b. The secondary-transfer belt 118 is rotated by the conveyer rollers 118a and 118b in a direction indicated by an arrow C. An image receiving medium 124, e.g., a paper sheet or a plastic sheet, is conveyed from a sheet accommodating unit 128 to the secondary-transfer unit by the rotation of a pair of conveyer rollers 126.

The secondary-transfer unit charges a secondary-transfer bias and transfers the multicolor image onto the image receiving medium 124 that is carried by the secondary-transfer belt 118. The image receiving medium 124 is then conveyed to a fixing device 120 by rotation of the secondary-transfer belt 118. The fixing device 120 includes a fixing member 130. The fixing member 130 is, for example, a pair of fixing rollers made of silicon rubber or fluorine rubber. The fixing device 120 fixes the multicolor image onto the image receiving medium 124 by the heat and pressure. The image receiving medium 124 with the fixed multicolor image is discharged out of the image forming apparatus 100 as a printed matter 132. After the multi image is transferred from the intermediate transfer belt 114, residual developer is removed from the intermediate transfer belt 114 by a cleaning unit 116 including a cleaning blade. After the cleaning, the intermediate transfer belt 114 is subjected to the next image formation.

A sub-scanning misalignment detecting device (not shown) is arranged near the end of the scanning line running in the main-scanning direction on each of the photosensitive elements 104a, 106a, 108a, and 110a. The sub-scanning misalignment detecting device detects misalignment in the sub-scanning direction.

Figure 2:
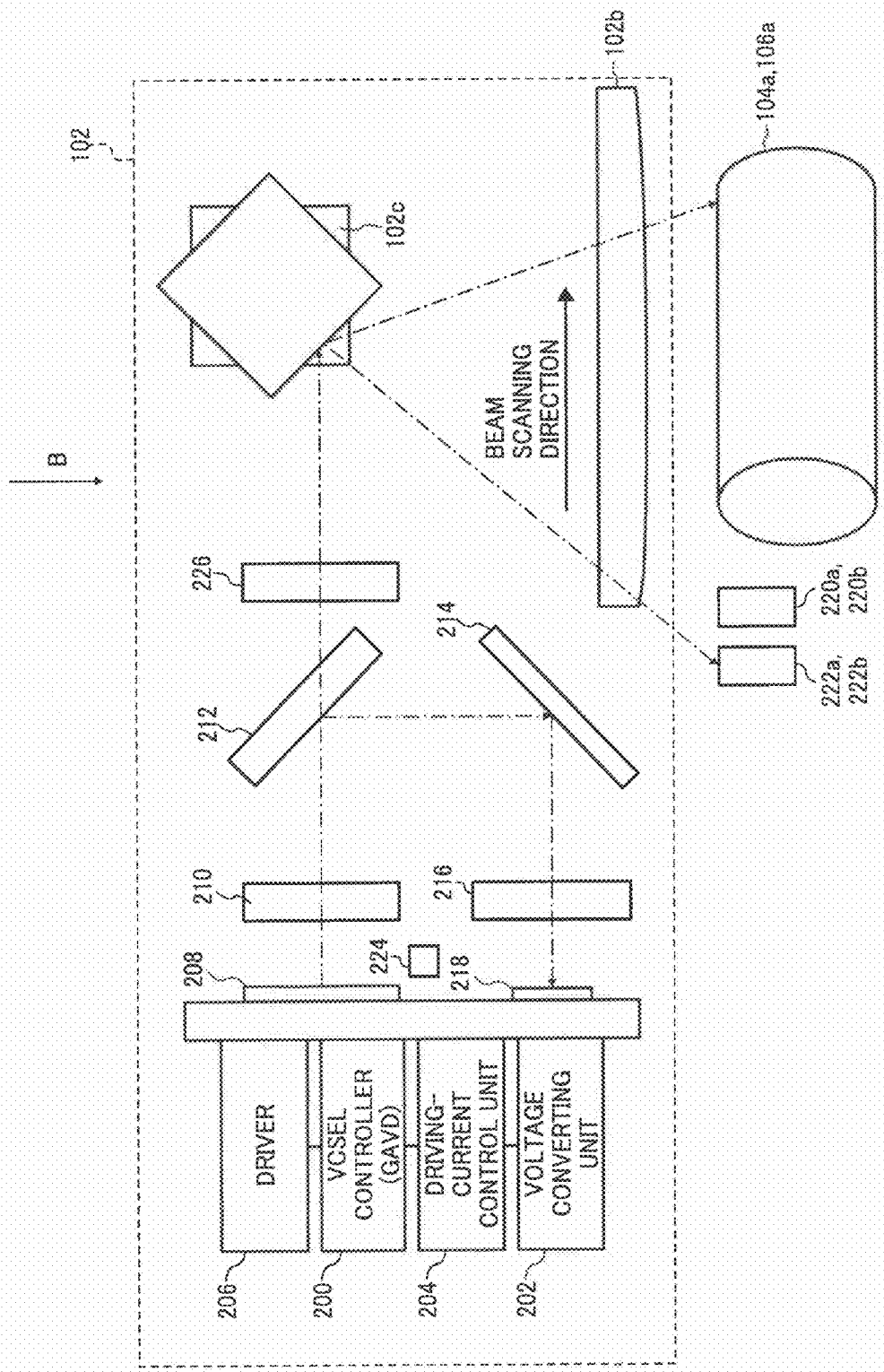
FIG. 2 is a plane view of an optical device shown in FIG. 1.

FIG. 2 is a plane view of the optical device 102, viewed from a direction indicated by an arrow A shown in FIG. 1. In the split-beam exposure, two photosensitive elements are exposed by light that is emitted from a single VCSEL to form latent images. The number of photosensitive elements corresponding to a single VCSEL is not limited to two. It is allowable to configure in such a manner that a single VCSEL forms latent images on three or more photosensitive elements. In the example shown in FIG. 2, the photosensitive elements 104a and 106a are exposed by light emitted from a single VCSEL 208 to form latent images. The optical device 102 includes a VCSEL controller (hereinafter, "gate array video driver (GAVD)") 200 that controls operation of the VCSEL 208. The GAVD 200 functions as an application specific integrated circuit (ASIC). A main central processing unit (CPU) 300 controls operation related to image formation performed by the image forming apparatus 100. The GAVD 200 receives various control signals from the main CPU 300 and sends various command signals to a driver 206 to control operation of the VCSEL 208. Upon receiving the control signals from the main CPU 300, the GAVD 200 sends control signals to the driver 206, such as a factory setting signal, an initialization signal, a line automatic power control (APC) signal, a sheet-interval APC signal, a process-control APC signal, and a scanning APC signal. The factory setting signal is a control signal to adjust an intensity of a scanning beam before shipment, i.e., before the image forming apparatus 100 is shipped from the factory. The line APC signal is a control signal that is output from the GAVD 200 to correct an intensity of a laser beam. The line APC signal is output, when the image forming apparatus 100 is in operation, each time the laser beam starts scanning a main-scanning line. The sheet-interval APC signal is a control signal that is output from the GAVD 200 to correct the intensity of the laser beam in a manner different from that in the line APC. The sheet-interval APC is output in an interval between adjacent sheets to be printed out sequentially.

Figure 3:
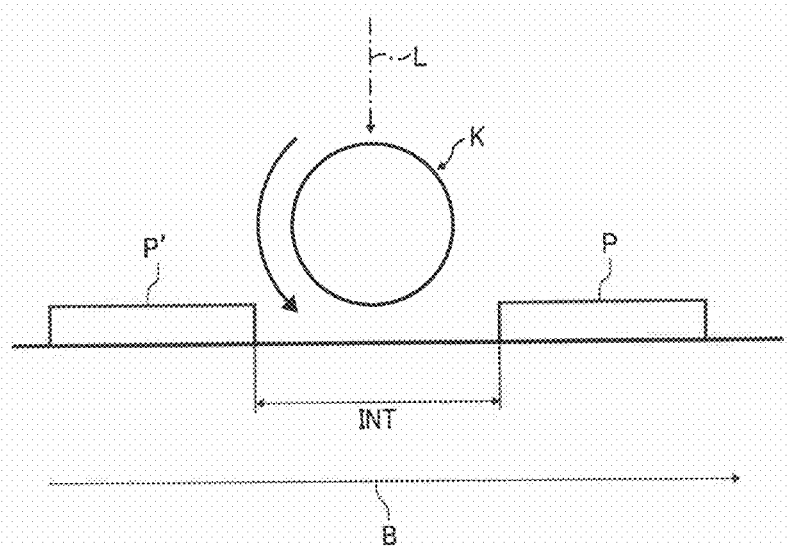
FIG. 3 is a schematic diagram that explains timing when a sheet-interval APC is performed.

More particularly, the sheet-interval APC signal is a control signal that is output from the GAVD 200 at sheet-interval timing so that the intensity correction is performed during the sheet interval. Suppose that, as shown in FIG. 3, the intermediate transfer belt 114 rotates in the direction indicated by the arrow B; the light beam L scans the photosensitive element 104a to form a first latent image and a second latent image. The first latent image is developed into a first toner image and then the first toner image is transferred onto a sheet P. The second latent image is developed into a second toner image and then the second toner image is transferred onto a sheet P'. The sheet interval corresponds to an interval INT, i.e., after the light beam L irradiates the photosensitive element 104a to form the first latent image and before the light beam L irradiates the photosensitive element 104a to form the second latent image.

The process-control APC signal is a control signal that is output from the GAVD 200 to adjust the intensity of the laser beam as part of a process control for adjusting image-forming performance of the image forming apparatus 100. The scanning APC signal is a control signal that is output from the GAVD 200 to correct the intensity of the laser beam under specific environments, for example, where the temperature inside the image forming apparatus 100 changes by a predetermined degree or more or where a predetermined number of sheets or more have printed out sequentially.

The process control is performed to maintain the image-forming performance high enough to form images having a desired density even when, for example, the humidity surrounding or inside the image forming apparatus 100 is changed, the image forming apparatus 100 have not been used for a long time, or a supply system is deteriorated with the passage of time. The process control is performed at a later-described predetermined timing. In the process control, the current image-forming performance is checked and optimum image-formation conditions are determined.

The optical device 102 includes the VCSEL 208 and the driver 206 that supplies various driving currents to the VCSEL 208. Upon receiving various control signals, including the line APC signal, from the GAVD 200, the driver 206 causes the VCSEL 208 to produce the laser beams by supplying the driving currents to restive channels of the VCSEL 208. It is assumed in the description that the VCSEL 208 has 40 channels and emits up to 40 laser beams on the channel basis. The number of the laser beams can be more than or less than 40. The driving current is, as described in detail later, a current that is obtained by correcting a common current Isw using a correction value Dev. The common current, hereinafter, includes the driving current.

The laser beam is converted into parallel light by a coupling optical element 210. The parallel light is split into a monitor beam (first beam) and a scanning beam (second beam) by an aperture mirror 212 that functions as a beam splitter. The aperture mirror 212 is, for example, an aperture mirror that is disclosed in Japanese Patent Application Laid-open No. 2007-298563 that is formed with a light reflecting member that allows a specific beam to path through and reflects the beams other than the specific beam. In the following description, "laser beam" with no adjective terms or the like means the pre-splitting laser beam including both the monitor beam and the scanning beam.

Figure 4:
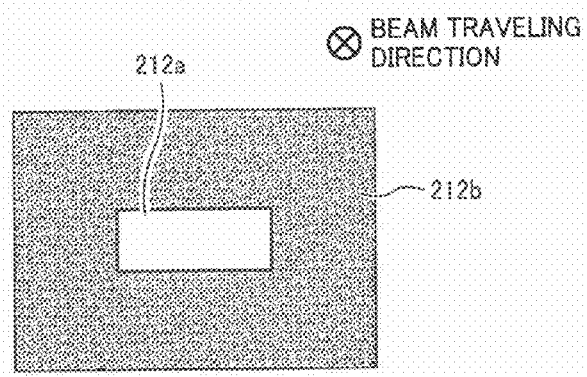
FIG. 4 is a schematic diagram of an aperture mirror formed with a light reflecting member, viewed from a direction in which a laser beam travels.
Figure 5:
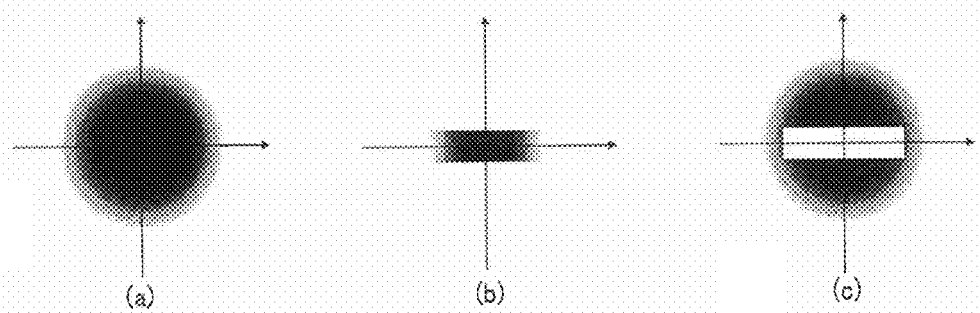
FIG. 5 shows cross-sectional views of the laser beam: (a) before shaping; (b) after shaping; and (c) that cannot pass through the aperture mirror.

FIG. 4 is a schematic diagram of the aperture mirror 212, viewed from a direction in which the laser beam travels (hereinafter, "beam traveling direction"). The aperture mirror 212 has an aperture 212a defined by a light reflecting member 212b. The shape of the aperture 212a defines a shape of the laser beam. FIG. 5 shows cross-sectional views of the laser beam: (a) before shaped by the aperture mirror 212, where the cross section of the laser beam is substantially circle; (b) after shaping; and (c) that cannot pass through the aperture mirror 212. The part of the laser beam shown in (c) of FIG. 5 is not used in generally. However, the part is reflected by the light reflecting member 212b and is used as the monitor beam. The other part of the laser beam that passes through the aperture mirror 212 is used as the scanning beam. The beam-splitting manner using the aperture mirror is called "aperture-mirror beam split". In contrast, in a beam-splitting manner using a half mirror (hereinafter, "half-mirror beam split"), part of the scanning beam is used as the monitor beam. Because light that is not used in the half-mirror beam split is used as the monitor beam in the aperture-mirror beam split, a required intensity of the VCSEL 208 is reduced as compared with an example of the half-mirror beam split. If the half-mirror beam split is used, an aperture having the same shape as the aperture 212a shown in FIG. 4 is arranged between the coupling optical element 210 and the aperture mirror 212 shown in FIG. 2 to shape the laser beam. The aperture mirror 212 is replaced with a half mirror. If the aperture-mirror beam split is used, it is unnecessary to arrange the aperture between the coupling optical element 210 and the aperture mirror 212 in the optical device 102.

The half-mirror beam split has an advantage in a ratio between the scanning beam and the monitor beam (hereinafter, "split ratio"). The split ratio is fixed in the half-mirror beam split, while the split ratio changes as a beam divergence angle of the VCSEL 208 changes in the aperture-mirror beam split. The beam divergence angle is a value indicative of divergence of the laser beam from the luminous point. In the examples shown in FIGS. 6A and 6B, a beam 208a has a beam divergence angle larger than that of a beam 208b. In the beam 208a, a ratio between a first area of the part that passes through the aperture 212a and a second area of the part that is reflected by the light reflecting member 212b is 5:5. On the other hand, in the beam 208b, the ratio between the first area and the second area is 7:3. Even in the single VCSEL 208, the laser beams allocated to different channels have different beam divergence angles; therefore, the split ratios are different from one another on the channel basis. A solution to cope with this problem will be described later in an example in which a monitor voltage is stored in a memory.

The scanning beam is further split into two beams (hereinafter, "split beams") by a beam-splitter prism 226 as shown in FIG. 7. The split beams are deflected by the polygon mirror 102c. The deflected split beams pass through the fθ lens 102b. After that, one of the split beams (hereinafter, "first scanning beam") irradiates the photosensitive element 104a, while the other (hereinafter, "second scanning beam") irradiates the photosensitive element 106a. The polygon mirror 102c has an upper section 102c-1 and a lower section 102c-2 each having four side faces. A phase of the side faces of the lower section 102c-2 is displaced 45 degrees from a phase of the side faces of the upper section 102c-1. The difference between the phase of the side surfaces of the upper section 102c-1 and that of the lower section 102c-2 can be any degrees. Synchronization detecting devices 220a and 220b are arranged scanning start point of the photosensitive elements 104a and 106a, respectively. An arbitrary one of the synchronization detecting devices 220a and 220b will be referred to as "synchronization detecting device 220". The synchronization detecting device 220 includes a photo diode (PD). The synchronization detecting device 220 detects the split beam and issues a synchronization signal. Upon receiving the synchronization signal from the synchronization detecting device 220, the GAVD 200 corrects the intensity of the laser beam. This intensity correction is called "first intensity correction". Scanning PDs 222a and 222b are arranged next to the synchronization detecting devices 220a and 220b, respectively in the main-scanning direction. The scanning PDs 222a and 222b measures the intensities of the scanning beams. An arbitrary one of the scanning PDs 222a and 222b will be referred to as "scanning PD 222".

FIG. 7 is a plane view of the beam-splitter prism 226 and the polygon mirror 102c, viewed from the direction indicated by the arrow B shown in FIG. 2. The beam-splitter prism 226 has a triangle section 228 and a rectangular section 230. A cross-sectional view of the triangle section 228 is a triangle; a cross-sectional view of the rectangular section 230 is a parallelogram. A joint surface 226a that joins the triangle section 228 and the rectangular section 230 together is a half mirror. The joint surface 226a splits received light into transmitted light and reflected light at a ratio 1:1. A surface of the rectangular section 230 that is opposed to the joint surface 226a is a total reflection surface and turns the direction in which the laser beam travels (hereinafter, "beam travelling direction"). Although a half-mirror prism is used as the beam-splitter prism 226, it is allowable to use an individual half mirror and a typical mirror in a separated manner. The ratio between the transmitted light and the reflected light can be other than 1:1. The ratio can be set appropriately, taking conditions of another optical system into consideration. The first scanning beam is input to the upper section 102c-1 of the polygon mirror 102c, while the second scanning beam is input to the lower section 102c-2.

Figure 8A:
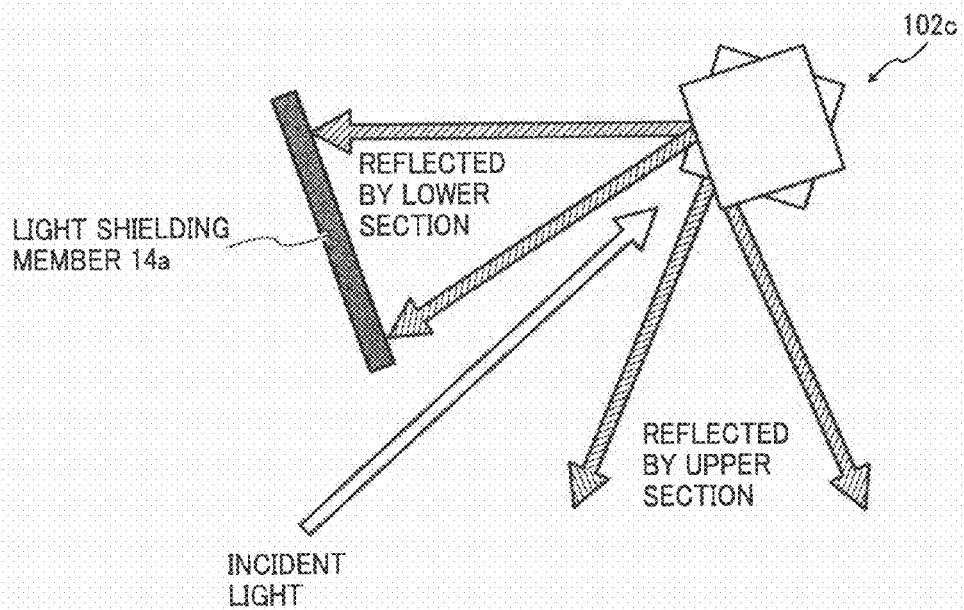
FIG. 8A is a schematic diagram of the polygon mirror, in which the polygon mirror includes an upper section and a lower section, and a first scanning beam coming from a light source is reflected by the upper section to a first photosensitive element.
Figure 8B:
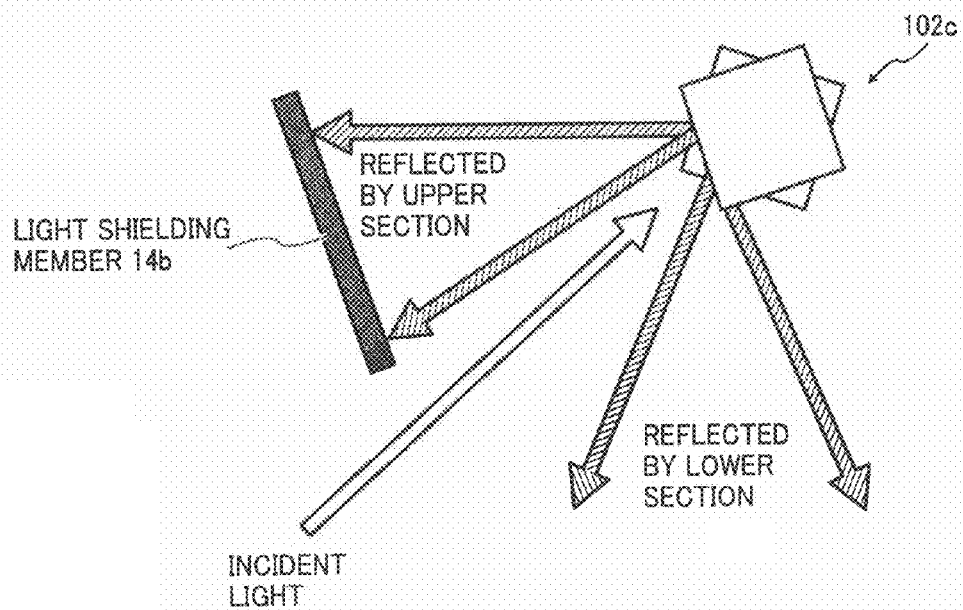
FIG. 8B is a schematic diagram of the polygon mirror in which a second scanning beam coming from the light source is reflected by the lower section to a second photosensitive element.

FIGS. 8A and 8B are schematic diagrams that explains optical canning using the polygon mirror 102c having the upper section 102c-1 and the lower section 102c-2. Light shielding members 14a and 14b are arranged near the polygon mirror 102c. FIG. 8A is a schematic diagram of the polygon mirror 102c, viewed from the bottom. FIG. 8B is a schematic diagram of the polygon mirror 102c, viewed from the top. As shown in FIG. 8A, when the first scanning beam, which is reflected by the upper section 102c-1, is scanning the photosensitive element 104a, the second scanning beam, which is reflected by the lower section 102c-2, irradiates other than the photosensitive elements, preferably, the light shielding member 14a. As shown in FIG. 8B, when the second scanning beam, which is reflected by the lower section 102c-2, is scanning the photosensitive element 106a, the first scanning beam, which is reflected by the upper section 102c-1, irradiates other than the photosensitive elements, preferably, the light shielding member 14b. When the light source is modulated, the first scanning bean and the second scanning beam are used, alternatively. When the first scanning beam is scanning the corresponding photosensitive element 104a, the light source is modulated based on image data (e.g., black image data) corresponding to the first scanning beam. When the second scanning beam is scanning the corresponding photosensitive element 106a, the light source is modulated based on image data (e.g., magenta image data) corresponding to the second scanning beam.

Referring back to FIG. 2, the other part of the laser beam split by the aperture mirror 212 is used as the monitor beam. The monitor beam is reflected by a total reflection mirror 214 to a second collective lens 216. After passed through the second collective lens 216, the monitor beam is input to a photoelectric conversion element 218. The photoelectric conversion element 218 is, for example, a PD and generates an intensity monitor voltage Vpd corresponding to the intensity of the monitor beam. The intensity monitor voltage Vpd is sent to a voltage converting unit 202 and then sent to a driving-current control unit 204. The driving-current control unit 204 performs arithmetic processing using the intensity monitor voltage Vpd. The driving-current control unit 204 calculated, for example, an 8-bit VCSEL control value using the value of the intensity monitor voltage Vpd corresponding to the intensity of the monitor beam and sends the 8-bit VCSEL control value to the GAVD 200. The GAVD 200 generates a VCSEL control value and sends the VCSEL control value to the driver 206 to control the driving current of the driver 206. The voltage converting unit 202 and the driving-current control unit 204 can be implemented using separated modules. Alternatively, the voltage converting unit 202 and the driving-current control unit 204 are implemented as a single unit, for example, a micro controller 302 that includes a read only memory (ROM) and a random access memory (RAM) that store therein various control values to be used in later-described various processes. The VCSEL control values, hereinafter, collectively indicate various data including data about a common current and a bias current that is stored in a RAM area of a memory 308 and is used to control the intensity of the VCSEL 208.

FIG. 9 is a block diagram of a driving circuit of the VCSEL 208 shown in FIG. 2. Upon receiving the control signal from the main CPU 300, The GAVD 200 starts factory setting of the VCSEL 208, initializing operation of the VCSEL 208, and operation control of the synchronization detecting device 220. The voltage converting unit 202 shown in FIG. 2 is implemented as an analog-to-digital (A/D) converting unit 304. The driving-current control unit 204 is implemented as a computing unit 306. The voltage converting unit 202 and the driving-current control unit 204 are implemented as a part of the micro controller 302. The micro controller 302 includes the memory 308 that stores therein various control values that are used by the computing unit 306 (the driving-current control unit 204). The memory 308 includes a ROM area and a RAM area. The ROM area stores therein factory setting data. The factory setting data is set before shipment of the image forming apparatus 100 and used to control the intensities of the scanning beam and the monitor beam. The RAM area is, for example, a register memory that stores therein values to be used to control the intensities of the scanning beam and the monitor beam.

Referring back to FIG. 9, upon receiving a predetermined instruction from the GAVD 200, the micro controller 302 performs the initializing operation using the factory setting data and the intensity of the monitor beam and stores calculated values in the RAM area. After that, upon receiving a predetermined instruction from the GAVD 200, the micro controller 302 calculates values for operation control. The micro controller 302 updates various data to be used to control the VCSEL 208 that is stored in the RAM area of the memory 308. When changes in the environment occur because of the control of the intensity of the laser beam emitted from the VCSEL 208 or heat produced by the image forming apparatus 100, the intensity of the laser beam emitted from the VCSEL 208 is controlled using the updated data.

The micro controller 302 sends the VCSEL control values to the GAVD 200. The VCSEL control values include a digital value SW_D that represents the common current; a digital value BI_D_ch (where "ch" is channel number) that represents the bias current of the channel; a digital value DEV_D_ch that represents the correction value that is set individually on the channel basis. The GAVD 200 sends, together with the VCSEL control values, a turn-on signal that is used to turn a light source corresponding to a specified channel ON (hereinafter, "ch turn-on signal") to the driver 206. Upon receiving the VCSEL control values and the ch turn-on signal, the driver 206 calculates a value of driving current using the digital values included in the VCSEL control values, converts the calculated value to a pulse-width modulated (PWM) value, and sets the driving current. Furthermore, the driver 206 applies a current having a level equivalent to the driving current to the channel specified by the ch turn-on signal and feedbacks the intensity of the laser beam that is allocated to the specified channel of the VCSEL 208.

The channels are allocated to the LDs of the driver 206, respectively. The driver 206 is measured on the channel basis before shipment. The VCSEL 208 is subjected to PWM control using a bias current Ibi that is different from one LD to another LD and stored in the RAM area of the memory 308, a common current Isw that is used in the initializing operation, and a correction value Dev. An arbitrary channel of the laser beam of the VCSEL 208 is referred to as "ch", where "ch" is an arbitrary integer from 1 to 40 in the first embodiment.

FIG. 10 is a block diagram of the driver 206. The driver 206 includes a correction-value setting unit 206*a*, a bias-current setting unit 206*b*, an LD-current supplying unit 206*c*, and a common-current supplying unit 206*d*. The correction-value setting unit 206*a*, the bias-current setting unit 206*b*, and the LD-current supplying unit 206*c* are provided to each of the LDs. The common current Isw is supplied from the common-current supplying unit 206*d* to the correction-value setting unit 206*a*. The LD-current supplying unit 206*c* adds the value of current set at the correction-value setting unit 206*a* and the value of current set at the bias-current setting unit 206*b* and sends the sum of the values to the LD. As described above, the LD has 40 channels; therefore, the corresponding channel number from 1 to 40 is appended with each reference number of the components shown in FIG. 10 so that the correction-value setting units 206*a*, the bias-current setting units 206*b*, and the LD-current supplying units 206*c* are distinguishable on the channel basis.

Upon receiving the digital value SW_D from the GAVD 200, the common-current supplying unit 206*d* supplies the common current Isw corresponding to the digital value SW_D. The common-current supplying unit 206*d* is, for example, a digital-to-analog converter (DAC) that can output from 0 mA to 5 mA as the common current Isw. The magnitude of the common current Isw is set depending on the 8-bit digital value SW_D [7:0].

Upon receiving the digital value DEV_D_ch from the GAVD 200, the correction-value setting unit 206*a* sets the correction value Dev_ch that is used to correct the common current Isw on the channel basis. The correction-value setting unit 206*a* is, for example, a DAC that can output from 68% to 132% as the correction value. The magnitude of the correction value Dev_ch is set depending on the 8-bit digital value DEV_D_ch [7:0]. The correction-value setting unit 206*a* multiplies the common current Isw_by the correction value Dev_ch and outputs the corrected common value (Isw× Dev_ch).

Upon receiving the digital value BI_D_ch from the GAVD 200, the bias-current setting unit 206*b* sets the bias current Ibi_ch on the channel basis. The bias-current setting unit 206*b* is, for example, a DAC that can output from 0 mA to 5 mA as the bias current Ibi_ch. The magnitude of the bias current Ibi_ch is set depending on the 8-bit digital value BI_D_ch [7:0].

The driver 206 including the above components supplies the driving current with Isw×Dev_ch+Ibi_ch to the LDch (where "ch" is an arbitrary integer from 1 to 40).

Figure 11:
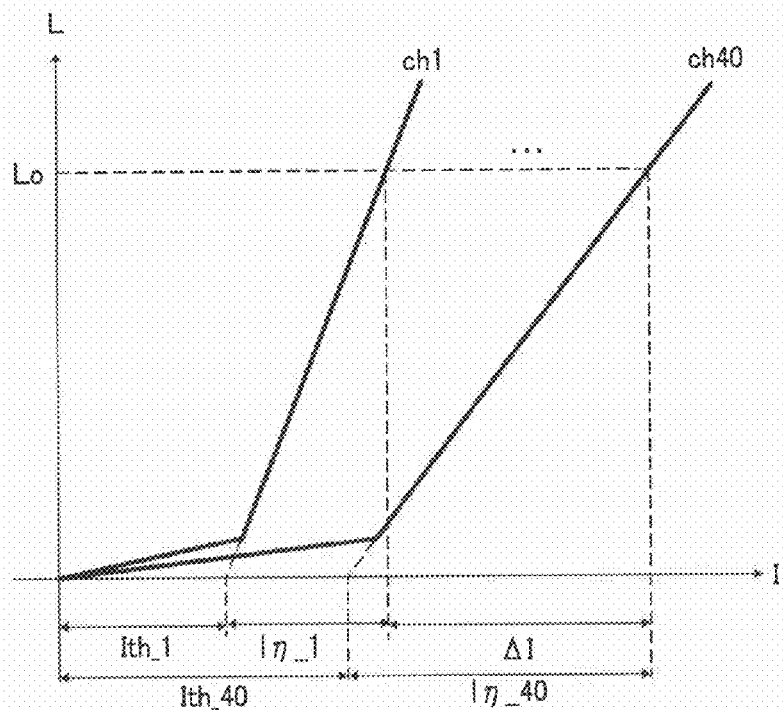
FIG. 11 is a graph of an output property of the laser beam according to the first embodiment.

FIG. 11 is a graph that explains output properties of the laser beam (hereinafter, "I-L properties") according to the first embodiment. The VCSEL 208 is composed of 40 channels of LDs in the following explanation. The LDs have their respective threshold currents Ith. The threshold current Ith represents the magnitude of current at which laser oscillation occurs in the LD. Moreover, a relation between an output L and a driving current level I is variable depending on LD properties. Therefore, even in the initializing operation, to emit the laser beams having the same intensity, different driving currents Iη are supplied to the LDs. The difference between the driving currents Iη is indicated by ΔI. Assume that the virtual axis of the graph shown in FIG. 11 is an intensity of the scanning beam on the photosensitive element. Because the beam divergence angles are various on the channel basis, a percentage of the laser beam that passes through the aperture mirror 212 in one channel is different from that in another channel. Even when the scanning beams that are emitted from the LDs of the VCSEL 208 have the same intensity, the intensities of the scanning beams on the photosensitive element can differ from one another. Therefore, to set the intensities of the scanning beams on the photosensitive element that are emitted from the LDs having the different channels to the same value, it is necessary to adjust difference among the channels in the LD properties and the percentage of the light passing through the aperture mirror 212.

Figure 12:
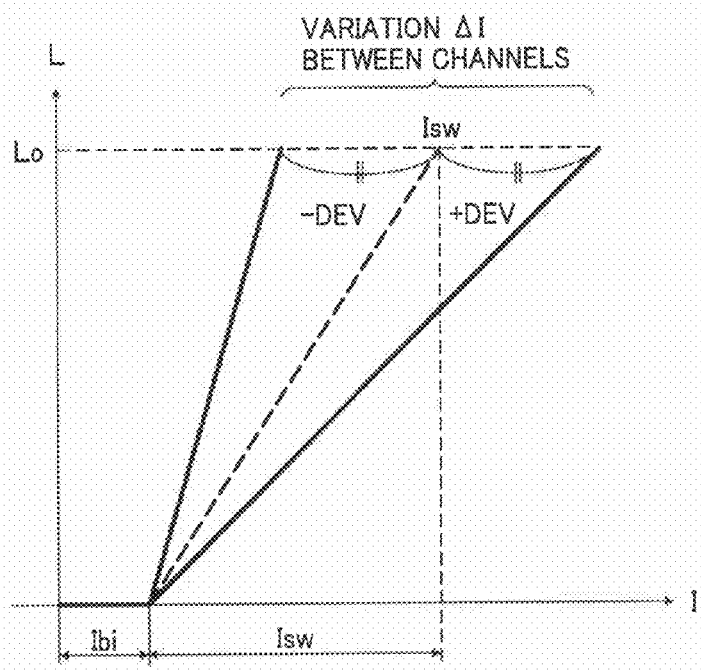
FIG. 12 is a graph that explains a common current after initialization and a correction value.

The driver 206 adjusts the differences in the first embodiment. The bias-current setting unit 206*b* that is provided to each channel sets the bias current Ibi_ch on the channel basis to reduce the differences among the intensities caused by differences among the threshold currents Ith. The values of currents appropriate for individual channels are set in the following manner to adjust the intensities of the scanning beams on the photosensitive element to the same value. AS shown in FIG. 12, the common current Isw that is common to every channel is set to the middle of the variation ΔI among the driving currents Iη of all the channels. The driving current, i.e., the current that is obtained by multiplying the common current Isw_by the channel-based correction value Dev_ch is applied to the corresponding channel to reduce the differences. The bias current Ibi shown in FIG. 12 is an example that is set to an arbitrary channel.

FIG. 13 is a table of control values 500 of the VCSEL 208 that are stored in the ROM area of the memory 308. The memory 308 is a part of the micro controller 302. As shown in FIG. 13, the control values 500 of the VCSEL 208 include the channel-based intensity monitor voltages Vpd or the like. In the split-beam exposure, each laser beam emitted from the single VCSEL is split into two scanning beams and two latent images for different colors are formed using the scanning beams. Therefore, the control values 500 for the two different colors are stored in the ROM area. If the two scanning beams that are emitted from the single VCSEL 208 travel along the same path, it is enough to store the control values 500 for only one color in the ROM area. However, after split by the beam-splitter prism 226 shown in FIG. 7, the scanning beams travel along different paths, passing along the different sections of the polygon mirror 102*c*, the different fθ lenses 102*b*, the different WTL 102*d*, and the different reflecting mirrors 102*a* and 102*e* shown in FIG. 1 in the first embodiment. Therefore, it is necessary to store the control values 500 for the two different colors in the ROM area. As shown in FIG. 13, the intensity monitor voltages of the photoelectric conversion element 218 that are set before shipment are stored as parts of the control values 500 in the form of intensity monitor voltages Vpd_1*a*(0) to Vpd_40*a*(0) and Vpd_1*b*(0) to Vpd_40*b*(0). The mark "(0)" means that the value is set before shipment. The letter "a" means that the value is related to a first color, i.e., the first scanning beam; the letter "b" means that the value is related to a second color, i.e., the second scanning beam. The common current Isw(0) is a default value of the common current Isw (hereinafter, "default common current"). The default common current Isw(0) includes Isw_a(0)

and Isw_b(0). The default common current Isw_a(0) is the average of the maximum value and the minimum value among various common currents Isw_1a(0) to Isw_40a(0). The default common current Isw_b(0) is the average of the maximum value and the minimum value among various common currents Isw_1b(0) to Isw_40b(0). The various common current Isw_are set on the channel basis before shipment in such a manner that the corresponding LD emits a reference intensity. The default common currents Isw_a(0) and Isw_b (0) are set before shipment and is used for obtaining the intensity of the monitor beam that is emitted in the initializing operation.

The RAM area of the memory 308 stores therein correction values Dev_1a(n) to Dev_40a(n) and Dev_1b(n) to Dev_40b(n), intensity adjustment values P_a(n) and P_b(n), common currents Isw_a(n) and Isw_b(n), bias currents Ibi_1(n) to Ibi_40(n), and calibration values C_1a(n) to C_40a(n) and C_1b(n) to C_40b(n). The correction values Dev_1a(n) to Dev_40a(n) and Dev_1b(n) to Dev_40b(n) are acquired in the image forming process performed by the image forming apparatus 100 and used to emit the laser beams having the reference intensity from the LDs. The intensity adjustment values P_a(n) and P_b(n) are rates of change in the intensity of the scanning beam. The intensity adjustment values P_a(n) and P_b(n) are output from the GAVD 200 in the process-control APC (second intensity correction) that will be described in detail later. The common currents Isw_a(n) and Isw_b(n) and the bias currents Ibi_1(n) to Ibi_40(n) are updated in the sheet-interval APC (third intensity correction) that will be described in detail later. The calibration values C_1a(n) to C_40a(n) and C_1b(n) to C_40b(n) are updated in the scanning APC (fourth intensity correction) that will be described in detail later. In the following description, the above correction values can be represented as, for example, the bias current Ibi_ch(n) or Ibi_ch, the correction value Dev_ch(n) or Dev_ch, the calibration value C_ch(n) or C_ch with the mark "a" or "b" being omitted. The marks "a" and "b" are appended only when it is necessary to distinguish the colors.

The mark "(n)" means that, if "n" is an integer larger than 0, the value is calculated in the image forming process after shipment. The mark "(n)" is used to explain various processes of calculating the correction value Dev_ch(n) or the like, such as the line APC (the first intensity correction), the sheet-interval APC, the process-control APC, and the scanning APC. The mark "(n)" does not indicate the number of times. In the example shown in FIG. 13, the different control values (e.g., the bias current Ibi and the calibration value C) are appended with the same mark "(n)". Although the same mark "(n)" is appended, the numbers of updates of the different control values can be different from each other.

Figures 13B, 14:
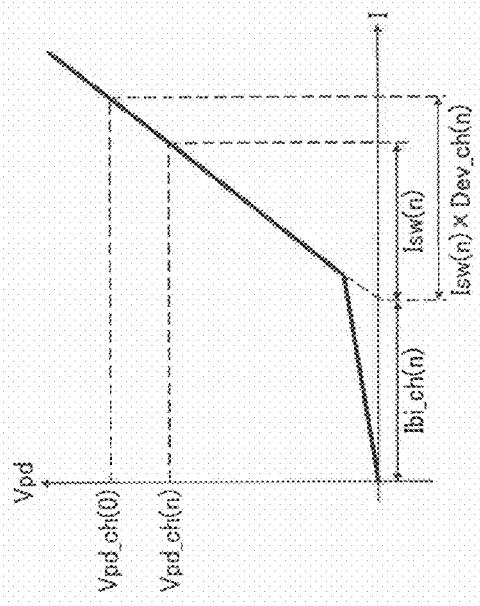
FIG. 14 is a graph that explains a relation that is used by a line APC or the like to set the correction value based on an I-L property (I-L curve)

The above-described relation is implemented only when the correction value Dev_ch(n) is in the relation shown in FIG. 14 from the viewpoint of the I-L property. As shown in FIG. 14, when the reference intensity is output, the intensity monitor voltage of the photoelectric conversion element 218 shown in FIG. 2 is Vpd_ch(0). When it is detected during the line APC control that the intensity monitor voltage of the photoelectric conversion element 218 is Vpd_ch(n), it is determined that the intensity of the laser beam is low. The correction value Dev_ch(n) that is set depending on the LD property in advance is calculated, and the calculated correction value Dev_ch(n) is sent to the GAVD 200. Upon receiving the correction value Dev_ch(n), the GAVD 200 sends the channel number and the correction value Dev_ch(n) corresponding to the channel number to the driver 206.

FIG. 15 is a timing chart that explaining switching between the common currents Isw_a and Isw_b and the correction values Dev_cha and Dev_chb in the split-beam exposure. A synchronization signal a is detected when the first scanning beam coming from the optical device 102 passes through the synchronization detecting device 220a. A synchronization signal b is detected when the second scanning beam coming from the optical device 102 passes through the synchronization detecting device 220b. The synchronization detecting devices 220a and 220b are arranged at the scanning start points of the photosensitive elements 104a and 106a, respectively. The synchronization detecting devices 220a and 220b output the synchronization signals a and b, respectively. The synchronization signals a and b indicate which scanning beam is to be used for next scanning of the photosensitive element, the first scanning beam that is deflected by the upper section 102c-1 of the polygon mirror 102c or the second scanning beam that is deflected by the lower section 102c-2. The GAVD 200 switches between the common currents Isw_a and Isw_b in response to the synchronization signals a and b. The timing to switch between the common currents Isw_a and Isw_b is controlled using a counter that is built in the GAVD 200. Assume that, the intensity of the scanning beam is controlled using the common current Isw_a and the correction value Dev_cha when the photosensitive element 104a is exposed, while the intensity of the scanning beam is controlled using the common current Isw_b and the correction value Dev_chb when the photosensitive element 106a is exposed. The built-in counter of the GAVD 200 starts running when the first synchronization signal b that is the left-most in the FIG. 15 is detected. When the built-in counter counts up to a predetermined count value Cnt_a, the GAVD 200 switches the common current Isw to the common current Isw_a and also switches the correction value to the correction value Dev_cha. The built-in counter is then reset and starts running, again. After that, the charging devices 104b and 106b charges the photosensitive element 104a with static electricity. The charged photosensitive element 104a is exposed to the light beam L and a latent image based on the image data is formed. When the formation of the latent image is finished and the built-in counter counts up to the value Cnt_a, the GAVD 200 switches the common current Isw to the common current Isw_b and also switches the correction value to the correction value Dev_chb. In this manner, the intensity of the scanning beam is controlled appropriately. After that, a latent image is formed on the photosensitive element 106a using the scanning beam with the controlled intensity. The switching operation is repeated until the printing operation is finished.

In a typical switching, the APC over the first scanning beam starts when the synchronization signal corresponding to the first scanning beam is detected. In contrast, the APC over the second scanning beam starts when a predetermined period has passed since the synchronization signal corresponding to the first scanning beam is detected in the first embodiment. For example, the common current is switched to Isw_a, not when the synchronization signal a is detected, but when the counter counts up to Cnt_a after the synchronization signal b is detected. Therefore, it is possible to start the APC at timing earlier than that in the typical switching. This increases a period allowed to be take for the APC. Although the counter is used in the above-described timing control according to the first embodiment, some other timing control can be used as long as the APC over the second scanning beam starts when a predetermined period has passed since the synchronization signal corresponding to the first scanning signal is detected.

The GAVD 200 sends a section signal to the micro controller 302 that calculates the correction values Dev_cha and Dev_chb. The section signal indicates which scanning beam is used for the current scanning, the first scanning beam that is deflected by the upper section 102c-1 of the optical device 102 or the second scanning beam that is deflected by the lower section 102c-2. Upon receiving the section signal, the micro controller 302 determines which correction value Dev_cha or Dev_chb is to be calculated. The section signal can be sent to the micro controller 302, for example, through a serial communication or in a state of ON/OFF of a signal line. The manner of sending the section signal is not limited thereto as long as it is identified which photosensitive element is currently being exposed, i.e., which scanning beam is used for the current scanning. In the following description, the synchronization signals a and b are collectively represented as a single synchronization signal.

Upon receiving the channel number and the digital value DEV_D_ch indicative of the channel-based correction value from the GAVD 200, the driver 206 generates the PWM signal using the channel number and the digital value DEV_D_ch and applies the driving current to the LD indicated by the channel number.

The bias current Ibi_ch(n) shown in FIG. 14 increases/decreases due to change in the temperature surrounding the VCSEL 208 deterioration. Therefore, if the bias current is fixed, the correction using the correction value Dev_ch(n) cannot be performed correctly. To solve the problem, the micro controller 302 calculates the value of the bias current at the initializing operation and the line APC and sends the calculated value to the GAVD 200. Upon receiving the value of the bias current, the GAVD 200 sends the channel number and the value of the bias current to the driver 206. In the first embodiment, the value of the bias current that is sent from the GAVD 200 is the digital value BI_D_ch corresponding to an 8-bit resolution and variable from, for example, 0 mA to 5 mA.

A value Isw(n)×Dev_ch(n) that is obtained by correcting the common current shown in FIG. 14 also increases/decreases due to change in the temperature surrounding the VCSEL 208 or deterioration. Values that the correction value Dev_ch(n) can take are limited within a range. Therefore, if the common current is fixed, the correction cannot be performed properly using the correction value Dev_ch(n) that is any value of the range in some cases. The micro controller 302 calculates the corrected value at the initializing operation and the line APC and sends the calculated corrected value to the GAVD 200. If the correction value is out of the range, the micro controller 302 changes the value of the common current by the sheet-interval APC and sends the changed value to the GAVD 200. Upon receiving the changed value of the common current, the GAVD 200 sends the changed value to the driver 206. In the first embodiment, the value of the common current that is sent from the GAVD 200 is the digital value SW_D corresponding to an 8-bit resolution and variable from, for example, 0 mA to 5 mA.

The intensity control according to the first embodiment is described below.

Before shipment, the micro controller 302 measures the intensity monitor voltage that is observed when each channel of the VCSEL 208 irradiates the photosensitive element with the scanning beam having the reference intensity and stores the measured intensity monitor voltage in the ROM area of the memory 308. The intensity monitor voltage is obtained by converting the monitor beam by the photoelectric conversion element 218. An optical sensor that is arranged at a position corresponding to the surface of the photosensitive element (not shown) is used to measure the intensity monitor voltage. Using the optical sensor, data representing a relation between the intensity monitor voltage and the intensity of the scanning beam at the surface of the photosensitive element is obtained. The optical sensor is connected to a personal computer (PC). The PC controls the GAVD 200 and sends the factory setting signal to the computing unit 306 via the GAVD 200.

In the setting before shipment, the micro controller 302 sends an ON signal to the GAVD 200 to turn on an enable signal of a target channel (e.g., ch1). Upon receiving the ON signal, the GAVD 200 sends the ON signal to the driver 206. Upon receiving the ON signal, the driver 206 gradually increases the common current Isw. When the optical sensor detects that the intensity of the monitor beam of ch1 increases to the reference intensity, the optical sensor sends a notification to the PC. Upon receiving the notification, the PC sends the notification to the GAVD 200. The GAVD 200 notifies the micro controller 302 that the intensity of the monitor beam of ch1 increases to the reference intensity. Upon receiving the notification, the micro controller 302 stores the intensity monitor voltage Vpd_1a(0), which is the voltage output from the photoelectric conversion element 218, in the ROM area of the memory 308. Moreover, the micro controller 302 stores the current common current Isw in the ROM area as the common current Isw_1a(0). Furthermore, the micro controller 302 stores in the ROM area of the memory 308 a voltage that is obtained by converting the intensity of the scanning beam that is measured by the scanning PD 222a shown in FIG. 2 (hereinafter, "scanning monitor voltage") observed when the monitor beam increases to the reference intensity as a scanning monitor voltage Vsc_1a. The above-described process is repeated until the data about ch40 is stored. After the data about ch40 is stored, the PC calculates the average of the maximum value and the minimum value among the values of Isw_1a to Isw_40a and writes the average to the ROM area of the memory 308 as Isw_a(0). The PC calculates the average from the scanning monitor voltages Vsc_1 to Vsc_40 and writes the average to the ROM of the memory 308 as Vsc_a (0).

In the split-beam exposure, after the setting for the first photosensitive element is finished, the optical sensor is moved to a position corresponding to the surface of the second photosensitive element. The voltages output from the photoelectric conversion element 218, i.e., the intensity monitor voltages Vpd_1b(0) to Vpd_40b(0) are stored in the ROM area of the memory 308 using the same VCSEL 208 in the same manner. The average of the maximum value and the minimum value among the values of Isw_1b to Isw_40b is calculated as the common current Isw_b(0). An average of the voltages output from the scanning PD 222b, i.e., the scanning monitor voltages Vsc_1 to Vsc_40 is calculated as a scanning monitor voltage Vsc_1b. The common current Isw_b(0) and the scanning monitor voltage Vsc_1b are stored in the ROM area of the memory 308 included in the same micro controller 302. In this manner, the intensity monitor voltages, the common currents, and the scanning monitor voltages are stored on the channel basis in the ROM area of the memory 308. The setting of the image forming apparatus 100 before shipment is then finished.

A user uses the image forming apparatus 100 including the photosensitive elements after shipment. When the image forming apparatus 100 activates or when an operation starts, the intensity control over the VCSEL 208 is performed. FIG. 16 is a flowchart of an image forming process performed by the image forming apparatus 100. The image forming apparatus 100 forms an image on, for example, a paper sheet or a plastic-film sheet with a specified size, such as B5, A4, B4, or A3. It is assumed that the user turns on the image forming apparatus 100 or the image forming apparatus 100 is ready to start the image forming process in response to a print command received from the user. The initialization of the VCSEL 208 is performed (Step S701). After the initialization, the line APC is performed (Step S702), and the sheet-interval APC is performed during a sheet interval (Step S703). If it is determined that a change in the temperature surrounding the VCSEL 208 is large (Yes at Step S704), the scanning APC is performed (Step S705). After that, the line APC, the sheet-interval APC, and the scanning APC are repeated until it is confirmed that the image formation is finished (Yes at Step S706).

The initialization of the VCSEL 208 that is performed at Step S701 of FIG. 16 is described in detail below with reference to FIG. 17. Before the start of the initialization, the main CPU 300 sends the initialization signal to the GAVD 200, and then the GAVD 200 sends the initialization signal to the micro controller 302. In other words, the VCSEL 208 is ready to be subjected to the initialization. The micro controller 302 detects the bias current Ibi_ch(1) of each of the 40 channels of the VCSEL 208 (Step S801). The micro controller 302 calculates the correction value Dev_ch(1) of each of the 40 channels (Step S802). The micro controller 302 updates the common current (Step 5803) and calculates the calibration value (Step S804). The processes from Step S801 to S804 are described in detail below.

Figure 18:
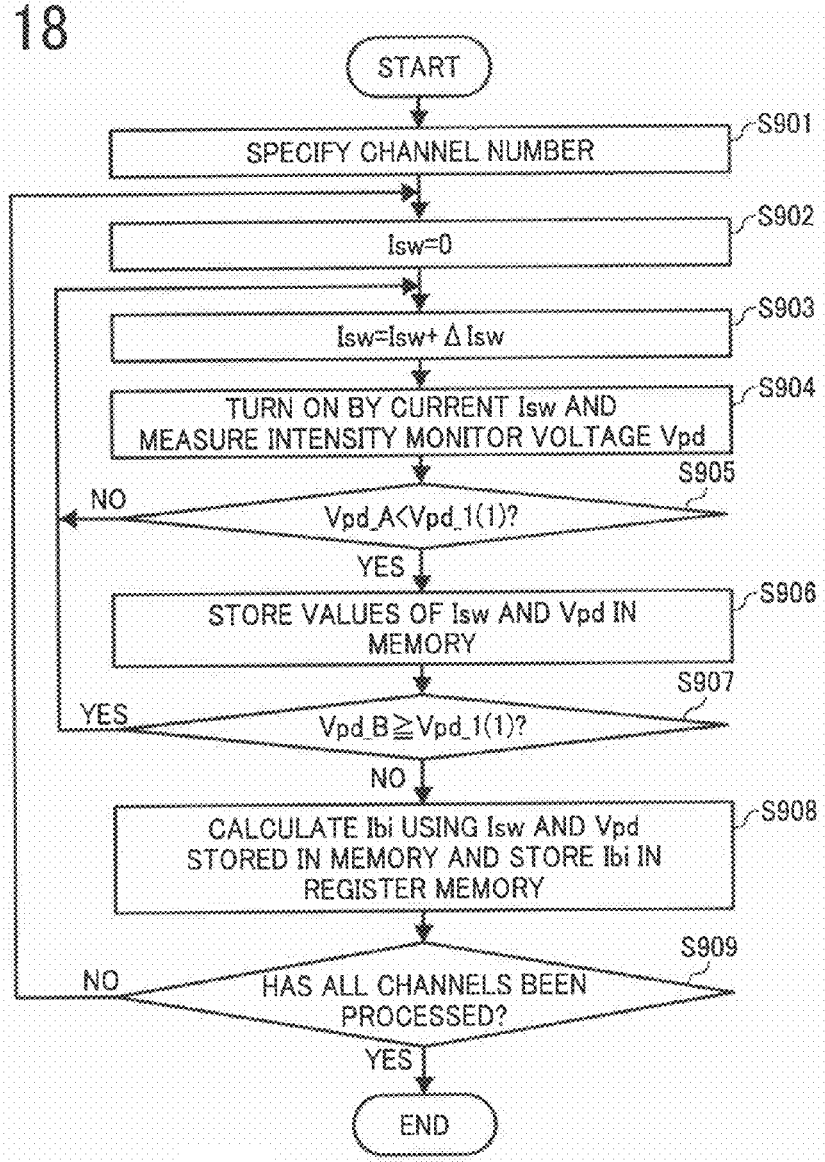
FIG. 18 is a flowchart of a bias-current detecting/setting process performed by the micro controller.

FIG. 18 is a detailed flowchart of the bias-current detecting process shown in Step S801 of FIG. 17. Before the bias-current detecting process, the micro controller 302 receives the initialization signal from the GAVD 200. The micro controller 302 specifies a target channel number (e.g., ch1) to specify the bias current to be detected (Step S901). The micro controller 302 sets the common current Isw of the driver 206 to zero (Step S902).

The micro controller 302 adds a variation ΔIsw to the common current Isw_and sets the calculated value to the common current Isw of the driver 206 (Step S903). The micro controller 302 then turns on a first LD that is allocated to ch1, which is the channel number specified at Step S901, by the current equivalent to the common current Isw set at Step S903 and measures the intensity monitor voltage as Vpd_1(1) (Step S904).

The micro controller 302 compares the intensity monitor voltage Vpd_1(1) with a threshold voltage Vpd_A (Step S905). The threshold voltage Vpd_A is a lower limit that is used to calculate the intensity monitor voltage on the channel basis. If the intensity monitor voltage Vpd_1(1) is equal to or lower than the threshold voltage Vpd_A (No at Step S905), the process control returns to Step S903 and the variation ΔIsw is added to the common current Isw. If the intensity monitor voltage Vpd_1(1) is larger than the threshold voltage Vpd_A (Yes at Step S905), the common current Isw_and the intensity monitor voltage Vpd_1(1) are stored in the ROM area of the memory 308 (Step S906). The micro controller 302 then compares the intensity monitor voltage Vpd_1(1) with a threshold voltage Vpd_B (Step S907). The threshold voltage Vpd_B is an upper limit that is used to calculate the intensity monitor voltage on the channel basis. If the intensity monitor voltage Vpd_1(1) is equal to or smaller than the threshold voltage Vpd_B (Yes at Step S907), the process control returns to Step S903. If the intensity monitor voltage Vpd_1(1) is larger than the threshold voltage Vpd_B (No at Step S907), the process control finishes the measurement of the intensity monitor voltage.

Figure 19:
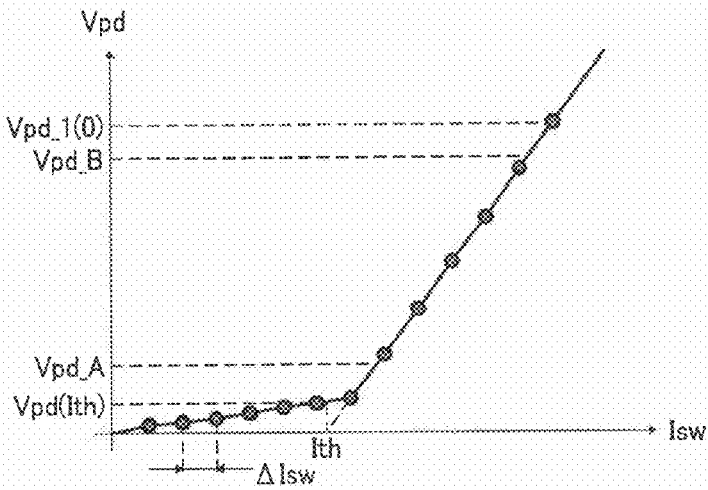
FIG. 19 is a graph that explains a relation between threshold voltages Vpd_A and Vpd_B.

The magnitudes of the threshold voltage Vpd_A and the threshold voltage Vpd_B are described with reference to FIG. 19. The threshold voltage Vpd_A is set slightly larger than an intensity monitor voltage Vpd(Ith) corresponding to the threshold current Ith. The threshold voltage Vpd_B is set slightly smaller the values from Vpd_1(0) to Vpd_40(0) that are stored in the ROM area of the memory 308 before shipment. The variation ΔIsw is set in such a manner that the intensity monitor voltage Vpd_1(1) that is calculated at the second time is in the range from the threshold voltage Vpd_A to the threshold voltage Vpd_B.

The adding of the variation ΔIsw to the common current Isw is repeated until the intensity monitor voltage Vpd_1(1) exceeds the threshold voltage Vpd_B. The channel-based intensity monitor voltages Vpd_1(1) are stored in the ROM area of the memory 308. After that, the micro controller 302 calculates Ibi_1(1) (Step S908). More particularly, the micro controller 302 calculates Ibi_1(1) using the intensity monitor voltages Vpd_1(1), which are any value from the threshold voltage Vpd_A to the threshold voltage Vpd_B and stored in the ROM area of the memory 308, and the value of the common current Isw that is stored in the RAM area.

A threshold current Ith_1 of the first channel is calculated using $$\text{Ith}\_1(1) = \frac{i \sum \text{Vpd}\_1 \cdot Isw - (\sum \text{Vpd}\_1) \cdot (\sum Isw)}{i \sum (\text{Vpd}\_1)^2 - (\sum \text{Vpd}\_1)^2} \quad (1)$$

where i is the number of pairs of the intensity monitor voltage Vpd_1(1), which is any value from the threshold voltage Vpd_A to the threshold voltage Vpd_B, and the common current Isw that are stored in the RAM area of the memory 308.

The calculated threshold current Ith_1 is stored in the RAM area of the memory 308 as the bias current Ibi_1(1). The micro controller 302 checks whether the detection and setting of the threshold current Ibi is finished in every channel (Step S909). If the detection and setting of the threshold current Ibi is finished in every channel (Yes at Step S909), the process control finishes the bias-current detecting process.

Figure 20B:
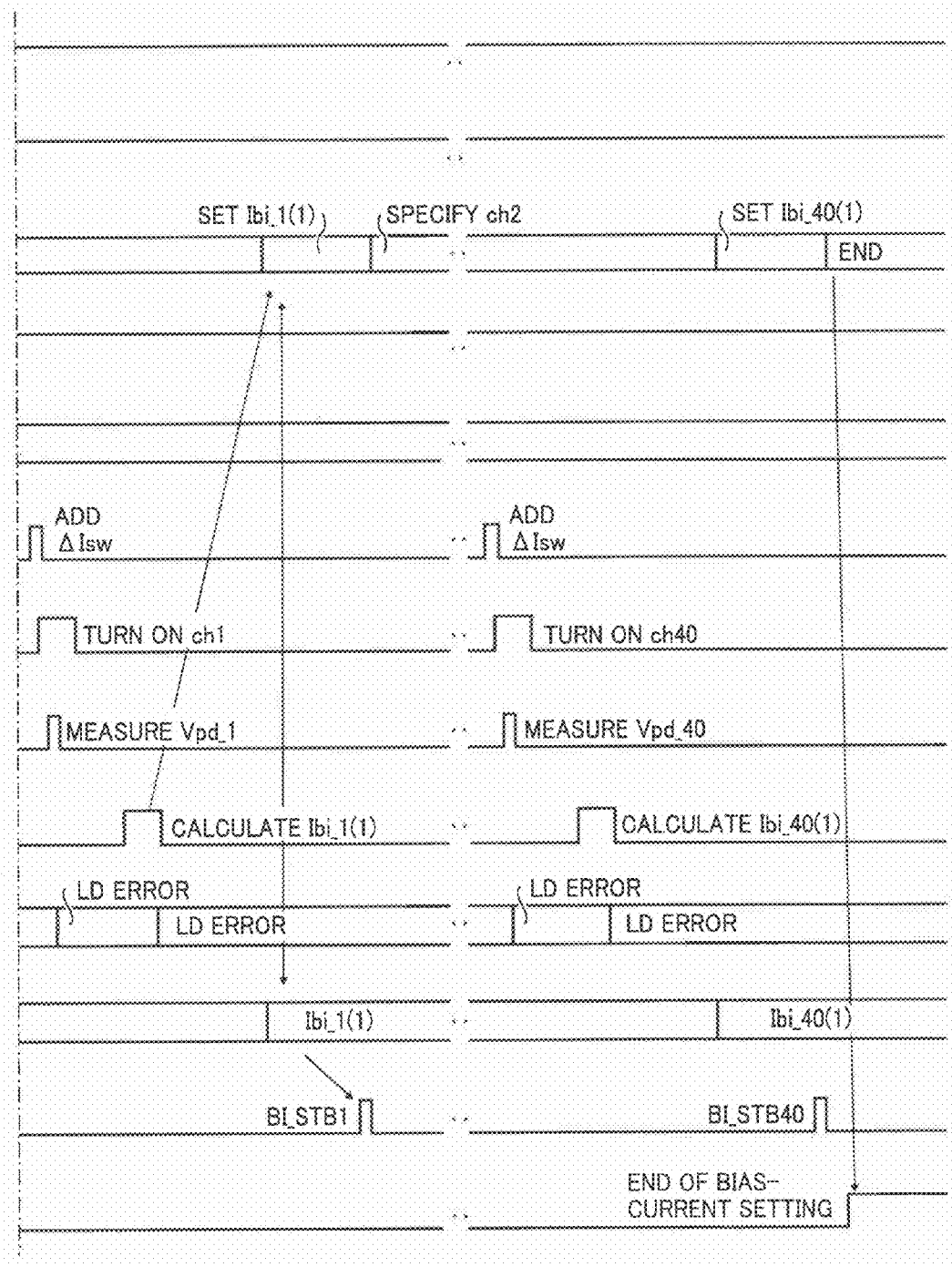
FIG. 20 is a timing chart that explains the bias-current detecting/setting process performed by the micro controller.

FIGS. 20A and 20B are timing charts that explain the bias-current detecting process performed by the micro controller 302. The main CPU 300 asserts an apcsttrig_r signal to start the detection, more particularly, sets the apcsttrig_r signal high in the first embodiment. Upon notifying that the apcsttrig_r signal is asserted, the GAVD 200 asserts an APC-START signal to start the line APC. This starts the bias-current detecting process. Upon receiving the APCSTART signal from the GAVD 200, the micro controller 302 outputs a sleep-cancel command to the GAVD 200 so that the enable signal of the LD is asserted. Upon receiving the sleep-cancel command, the GAVD 200 instructs the driver 206 to cancel the sleep state of all the channels. This makes the image forming apparatus 100 ready to start the bias-current detecting process.

The micro controller 302 specifies the target channel number (e.g., ch1) to specify the bias current to be set. The value of the common current Isw is set to the default value, i.e., zero. The micro controller 302 outputs the value of the common current Isw to the GAVD 200. The GAVD 200 outputs the received value of the common current Isw to the driver 206. After that, the GAVD 200 sets an SW_STB signal ON to set the common current Isw fixed to the specified channel and outputs the value of the fixed common current Isw to the driver 206. The micro controller 302 outputs the calculated values that are obtained by sequentially adding the variation ΔIsw to the common current Isw. Upon receiving the calculated values, the GAVD 200 sends the calculated values to the driver 206. After the fixation using the SW_STB signal, the micro controller 302 measures Vpd_1 at Step S904 of FIG. 18.

When the value of Vpd_1 exceeds the threshold voltage Vpd_B, the micro controller 302 calculates the bias current Ibi_1(1) and sends the calculated bias current Ibi_1(1) to the GAVD 200. The GAVD 200 then sends the received bias current Ibi_1(1) to the driver 206 and sets the bias current Ibi_1(1) fixed by setting a BI_STB signal ON. The above-described process is repeated until the last channel, i.e., the fortieth channel that is allocated to ch40 has been subjected to the process. When the process of the fortieth channel is finished, the micro controller 302 sets an ibiend_r signal ON to notify the GAVD 200 of the end of the bias-current setting. Thus, the detection of the bias current of every channel is finished. In the event of an error of an LD, the micro controller 302 issues an error signal "LDERR". The error signal "LDERR" will be described in detail later.

Figure 21:
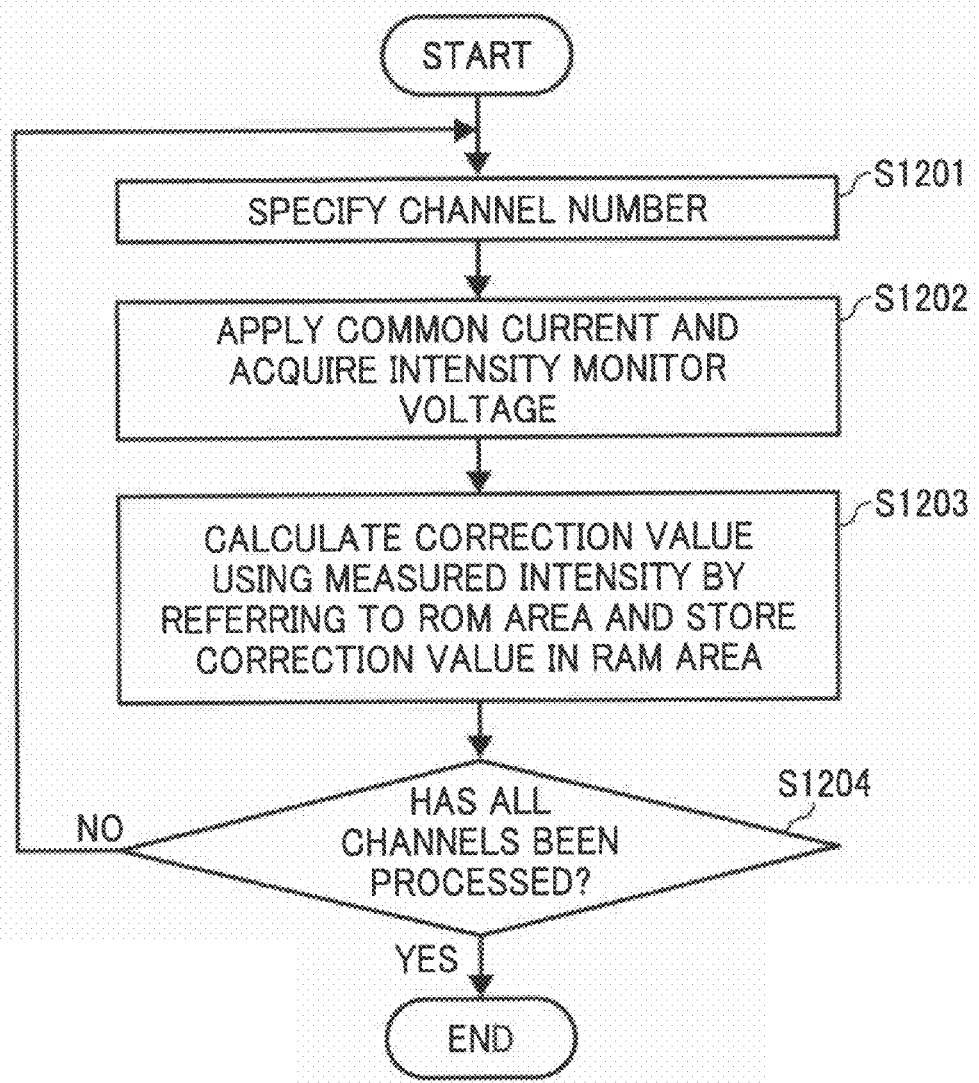
FIG. 21 is a flowchart of a correction-value calculating/setting process.

FIG. 21 is a detailed flowchart of the correction-value calculating process shown in Step S802 of FIG. 17. It is assumed that the detection of the bias current is finished and the GAVD 200 receives the signal indicative of the end of the bias-current detection. The GAVD 200 specifies the target channel number (e.g., ch1) of the VCSEL 208 to specify the correction value to be calculated (Step S1201). The GAVD 200 turns on the first LD that is allocated to ch1 in synchronized with the synchronization signal received from the synchronization detecting device 220 (hereinafter, "DETP signal") and maintains the first LD ON for a predetermined period by the common current Isw(0)×P(0) (Step S1202). The value P(t) is an adjustment value that is set in a process control and used to adjust the intensity of the scanning beam (hereinafter, "intensity adjustment value"). The single VCSEL 208, specifically, has two intensity adjustment values for the different two colors: P_a(t) and P_b(t). The value P(t) can be any of P_a(t) and P_b(t). The value of (t) increments each time the process-control APC is performed. The intensity adjustment value P(0) is used in the initializing operation, and P(0) is 1. The process control is described in detail in the later-described process-control APC. When the first LD is ON for the predetermined period, the A/D converting unit 304 in the micro controller 302 acquires the intensity monitor voltage Vpd_1(1). After that, the micro controller 302 calculates the correction value Dev_1(1) of ch1 using the acquired intensity monitor voltage Vpd_1(1) and the output value Vpd_1(0) (Step S1203). The output value Vpd_1(0) is output from the photoelectric conversion element 218 at the initializing operation and is stored in the ROM area. The correction value Dev_1(1) is calculated using $$\text{Dev\_1}(1) = \frac{\text{Vpd\_1}(0)}{\text{Vpd\_1}(1)} \times C\_1(0) \times P(0) \qquad (2)$$

where C_1(0) is a default value of a calibration value C_1(m). The calibration value C_1(0) is zero. In the calibration value C_1(m), m is the number of times the scanning APC is performed. The intensity monitor voltage Vpd_1(0) of ch1 is set before shipment of the image forming apparatus 100. When the user uses the image forming apparatus 100, the micro controller 302 reads the intensity monitor voltage Vpd_1(0) from the ROM area of the memory 308 and calculates, for example, the bias current using the acquired intensity monitor voltage Vpd_1(0).

The micro controller 302 determines whether the correction values of all the channels are calculated (Step S1204). If the correction values Dev_1(1) to Dev_40(40) of all the channels are calculated (Yes at Step S1204), the process control finishes the correction-value calculating process.

Figure 22B:
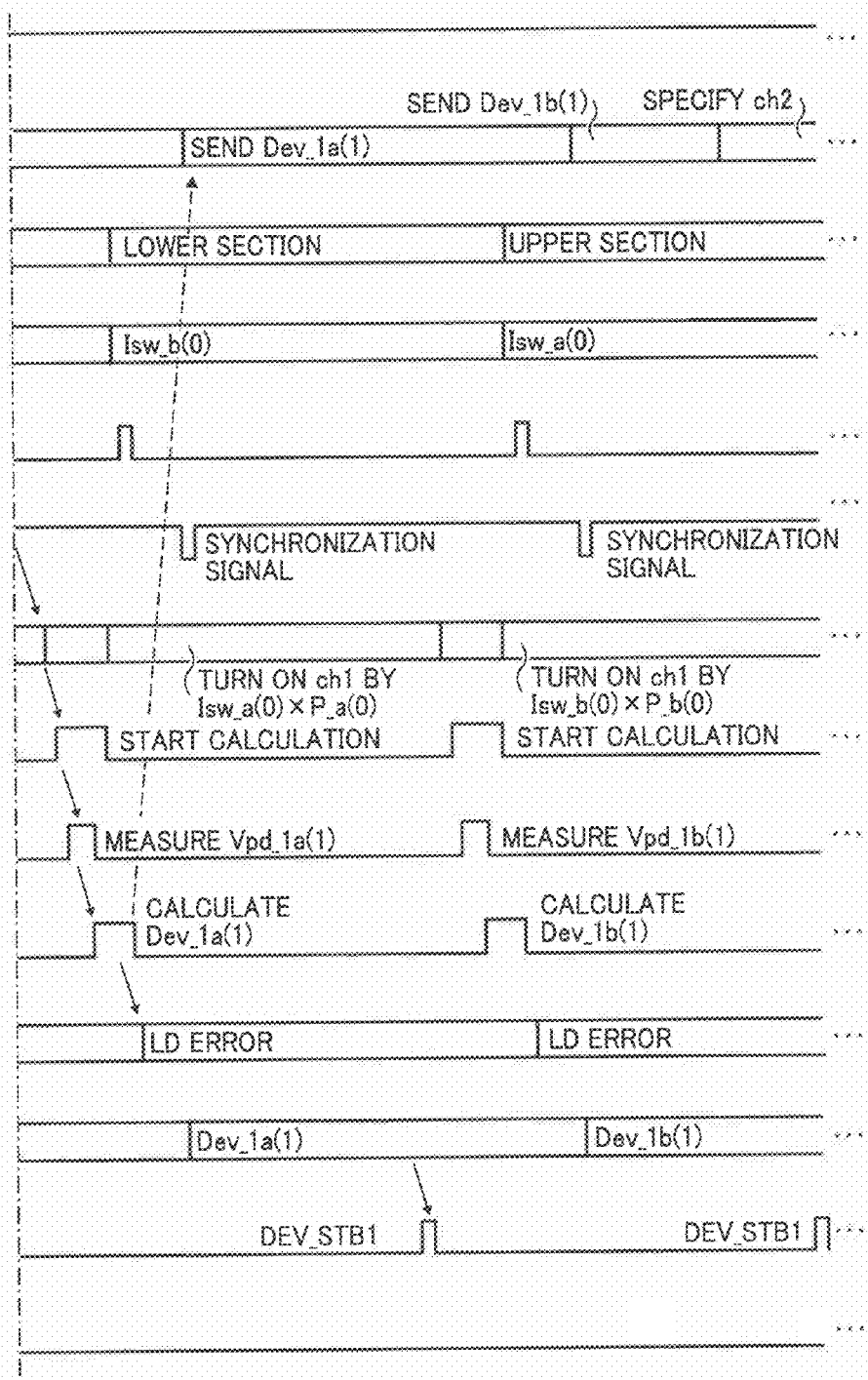
FIG. 22 is a timing chart for explaining the correction-value calculating/setting process performed by the micro controller.
Figure 22C:
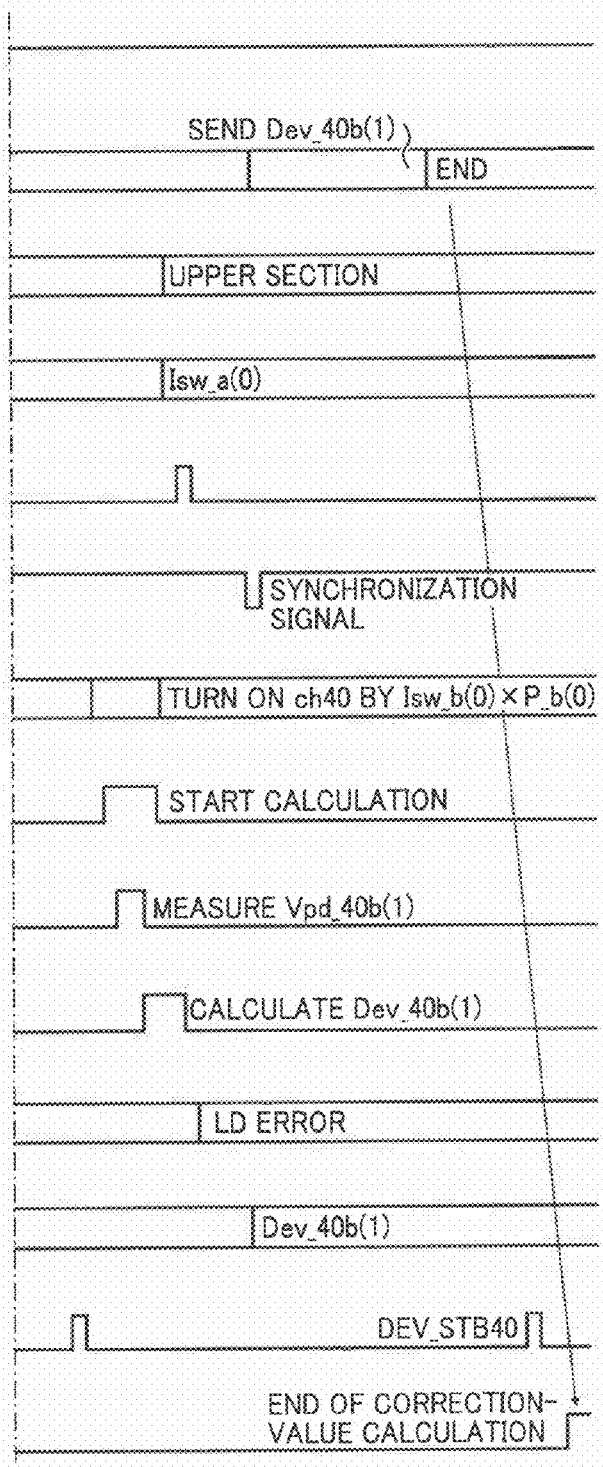

FIG. 22 is a timing chart for explaining the correction-value calculating process performed by the micro controller 302. After the main CPU 300 sets on the ibiend_r signal indicative of the end of bias-current setting, the micro controller 302 starts the correction-value calculating process.

In the split-beam exposure, it is necessary to calculate the correction values Dev_1a to Dev_40a for the first color and the correction values Dev_1b to Dev_40b for the second color. The micro controller 302 sends the value of the common current Isw_a(0) and the value of the common current Isw_b(0) that are stored in the ROM area of the memory 308 to the driver 206. The GAVD 200 outputs the SW_STB signal to set the value of the common current Isw_a(0) fixed. After that, the GAVD 200 generates an APCEN signal in synchronized with the DETP signal to set the APC enable. Upon receiving the APCEN signal, the micro controller 302 specifies the target channel (e.g., ch1) to specify the correction value to be calculated.

Before outputting the next APCEN signal, the GAVD 200 sends a PWMON signal to the driver 206 to start the PWM control. In response to the PWMON signal, the first LD, which is allocated to ch1, turns on and maintains the ON state for the predetermined period by the current Isw_a(0)×P_a(0). After that, upon receiving the APCEN signal, the micro controller 302 acquires Vpd_1a that is detected by the scanning PD 222a and calculates a correction value Dev_1a(1) using Equation (2). The micro controller 302 sends the calculated correction value Dev_1a(1) to the GAVD 200. Upon receiving the correction value, the GAVD 200 outputs a DEV_STB1 signal, thereby setting the received correction value fixed to ch1.

The GAVD 200 sets Isw_b(0) to the driver 206 using the SW_STB signal before receiving the next synchronization signal and after the correction value is fixed to the first channel. The GAVD 200 sends the PWMON signal to the driver 206 before outputting the next APCEN signal, thereby turning on the first LD, which is allocated to ch1. The first LD is in the ON state for the predetermined period by the current Isw_b(0)×P_b(0). After that, Dev_1b(1) is calculated in the same manner as Dev_1a(1) is calculated. The GAVD 200 then outputs the DEV_STB1 signal, thereby fixing the calculated correction value to ch1.

The above-described process is repeated until Dev_40a(1) and Dev_40b(1) for ch40 are sent. After Dev_40a(1) and Dev_40b(1) are sent, the micro controller 302 issues a devend_r signal indicative of the end of the correction-value calculating process and sends the devend_r signal to the GAVD 200. In the event of an error of an LD, the micro controller 302 issues the error signal "LDERR". The error signal "LDERR" will be described in detail later.

Although it has been mentioned with reference to FIG. 22 that the first LD, which is allocated to ch1, turns on by the current Isw_a(0)×P_a(0), the current, actually, includes the bias current Ibi_1(1), i.e., Isw_a(0)×P_a(0)+Ibi_1(1). Since the bias current is set in the initializing operation, the bias current is applied constantly until the end of the printing operation. Even when the drawings and the following description are not mentioned about the bias current, the bias current is included in the driving current.

The common current that is applied to the VCSEL 208 is variable depending on changes of the surrounding environment or time degradation of the VCSEL 208. To cope with these changes, the common current is updated in the initializing operation. FIG. 23 is a detailed flowchart of the common-current updating process shown in Step S803 of FIG. 17. The correction value is calculated in the above manner before the start of the common-current updating process. The GAVD 200 calculates the common current (Step S1401). More particularly, the GAVD 200 reads the default common current Isw(0), the maximum value Dev_chMax of the correction values Dev_ch and the minimum value Dev_chMin of the correction values Dev_ch from the ROM area of the memory 308 and calculates the common current using $$Isw(1) = Isw(0) \times \left( \frac{Dev\_chMax + Dev\_chMin}{2} \right) \quad (3)$$

The GAVD 200 updates the common current Isw to the calculated value (Step S1402). After that, the GAVD 200 calculates the correction value Dev_ch of each channel using the updated common current Isw (Step S1403). The process of calculating the correction values Dev_ch is the same as the process shown in FIG. 21. After the correction values Dev_ch is calculated, the process control finishes the common-current updating process.

Figure 24B:
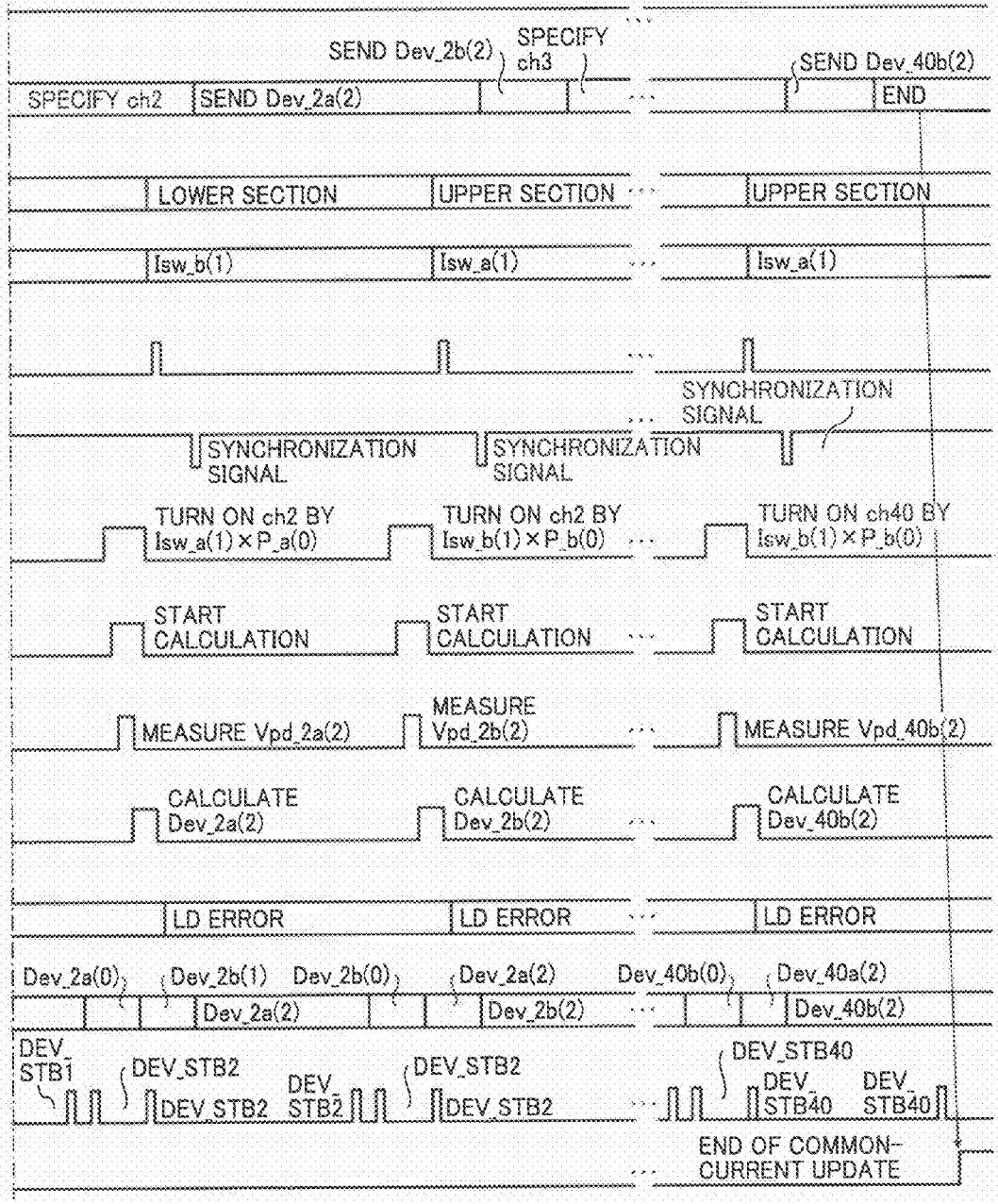
FIG. 24 is a timing chart for explaining the common-current updating process performed by the micro controller.

FIG. 24 is a timing chart for explaining the common-current updating process performed by the micro controller 302. When the devend_r signal indicative of the end of the correction-value calculating process is turned on, the micro controller 302 calculates the common currents Isw_a(1) for the first color and Isw_b(1) for the second color and outputs the calculated common currents to the GAVD 200. The GAVD 200 then sends the received common currents to the driver 206. The GAVD 200 outputs the SW_STB signal at the cycle the same as that of the DETP signal in such a manner that Isw_a(1) and Isw_b(1) are set to the driver 206, alternately. After that, the GAVD 200 calculates the correction values Dev_cha(2) and Dev_chb(2) of each channel in synchronized with the DETP signal in the same manner as the correction-value calculating process that is described with the timing chart shown in FIG. 22, sends the calculated correction values to the driver 206, and outputs the DEV_STB signal, thereby setting the calculated correction values fixed. It is necessary to set the correction value invalid when the LD allocated to the specified channel is in the ON state for the predetermined period for the measurement of the intensity monitor voltage Vpd. In other words, the correction value is reset to 100%, i.e., the default value Dev_ch(0). The process is repeated until the update of the last channel, i.e., ch40 channel is finished. When the update for the ch40 is finished, the micro controller 302 instructs the GAVD 200 to finish the update of the common current. The GAVD 200 then sets an iswend_r signal ON, thereby finishing the common-current updating process.

After the common-current updating process, the calculation of the calibration value is performed (Step S804 of FIG. 17). In the calibration-value calculating process, the intensity monitor voltage that is set before shipment and stored in the ROM area of the memory 308 is corrected, and the correction value Dev is re-calculated using the corrected intensity monitor voltage. This process is required because the relation between the intensity monitor voltage and the intensity of the scanning beam is variable depending on changes in the environment or time degradation of the VCSEL 208. The temperature surrounding the optical device 102 is maintained at, for example, 25° C. using an air conditioner when the intensity monitor voltage is stored in the memory before shipment. When the optical device 102 is attached to the image forming apparatus 100 and the initialization of the VCSEL 208 is performed, the temperature surrounding the optical device 102 and the temperature surrounding the VCSEL 208 are variable depending on season, time, and usage of the image forming apparatus 100. If the beam divergence angle of the VCSEL 208 changes by the effect of change in the temperature, the ratio between the light that passes through the aperture mirror 212 and the light that is reflected by the aperture mirror 212 also changes. As a result, the relation between the intensity of the scanning beam on the surface of the photosensitive element and the value of the intensity monitor voltage that is obtained, when the scanning beam irradiates the photosensitive element, by converting the monitor beam by the photoelectric conversion element 218 is changed from the relation before shipment. Therefore, when the common current Isw_and the correction value Dev are set using the intensity monitor voltage based on the relation before shipment, it is impossible to set the intensity of the scanning beam on the photosensitive element to a desired value.

Figure 25:
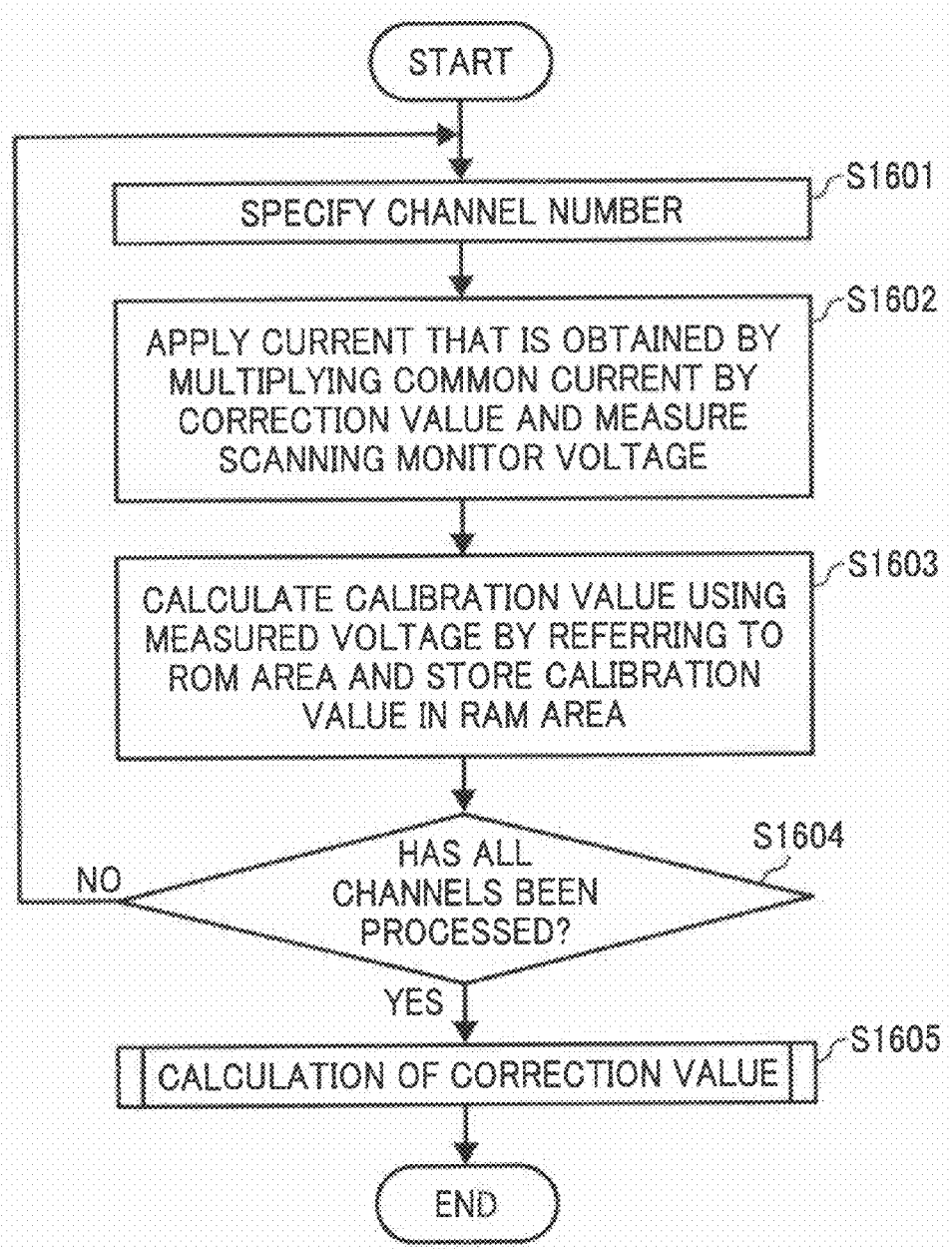
FIG. 25 is a flowchart of a process of correcting an intensity monitor voltage.

FIG. 25 is a detailed flowchart of the calibration-value calculating process shown in Step S804 of FIG. 17. When the common-current updating process is finished, the GAVD 200 starts the calibration-value calculating process. The GAVD 200 specifies the target channel number (e.g., ch1) of the VCSEL 208 (Step S1601) to specify the intensity monitor voltage to be calculated. The GAVD 200 turns on the first LD, which is allocated to ch1, for the predetermined period by the current equivalent to a value that is obtained by multiplying the common current Isw(l), which is calculated by the common-current updating process, by the correction value Dev_1 (2) and the intensity adjustment value P(0), which is the default value set by the process control, (Step S1602). The first LD is turned on in synchronized with the DETP signal when the scanning beam passes on the scanning PD 222a or 222b shown in FIG. 2. When the first LD is in the ON state for the predetermined period, irradiating the scanning PD 222a or 222b, the A/D converting unit 304 of the micro controller 302 obtains a scanning monitor voltage Vsc_1(1).

After that, the A/D converting unit 304 of the micro controller 302 calculates a calibration value C_1(1), which is a calibration value for correcting the intensity of the first LD, using the obtained scanning monitor voltage Vsc_1(1) and a scanning monitor voltage Vsc(0) (Step S1603). The scanning monitor voltage Vsc(0) is output from the scanning PDs 222a and 222b when the LD emits the reference intensity and stored in the ROM area as the default value. The calibration value C_1(1) is calculated using $$C\_1(1) = \frac{Vsc(0)}{Vsc\_1(1)} \times P(0) \quad (4)$$

where Vsc(0) is the scanning monitor voltage that is set before shipment. The scanning monitor voltage Vsc(0) is stored in the ROM area of the memory 308.

The GAVD 200 determines whether the calibration values of all the channels are calculated (Step S1604). If the calibration value of any of the channels is not calculated (No at Step S1604), the process control returns to Step S1601. The initialization for ch2, ch3, ... , ch40 is performed, and a calibration value C_40(1) is calculated. If the calibration values of all the channels are calculated (Yes at Step S1604), a correction value Dev_ch(3) is calculated using Equation (5) (Step S1605).

$$\text{Dev\_1(3)} = \text{C\_1(1)} \times \left(\frac{\text{Vpd\_1(0)}}{\text{Vpd\_1(3)}}\right) \times P(0) \qquad (5)$$

The process at Step S1605 is the same as the process that is described with reference to FIG. 21.

When the correction value of ch40 is calculated, the GAVD 200 finishes the calibration-value calculating process. The VCSEL initializing process shown in FIG. 16 is thus finished.

In the VCSEL initializing process, the micro controller 302 sends the calculated correction value Dev_1(3), the calculated common current Isw(l), and the calculated bias current Ibi_1(1) to the GAVD 200. Upon receiving Dev_1(3), Isw(l), and Ibi_1(1), the driver 206 sets the value of the intensity monitor voltage and the value of the scanning monitor voltage and sets the common current to be applied to ch1 to Isw(l)× Dev_1(3)×P(0)+Ibi_1(1). The first LD, which is allocated to ch1, then emits under the PWM control or the like light having the intensity equal to the reference intensity that is set before shipment.

Figure 26A:
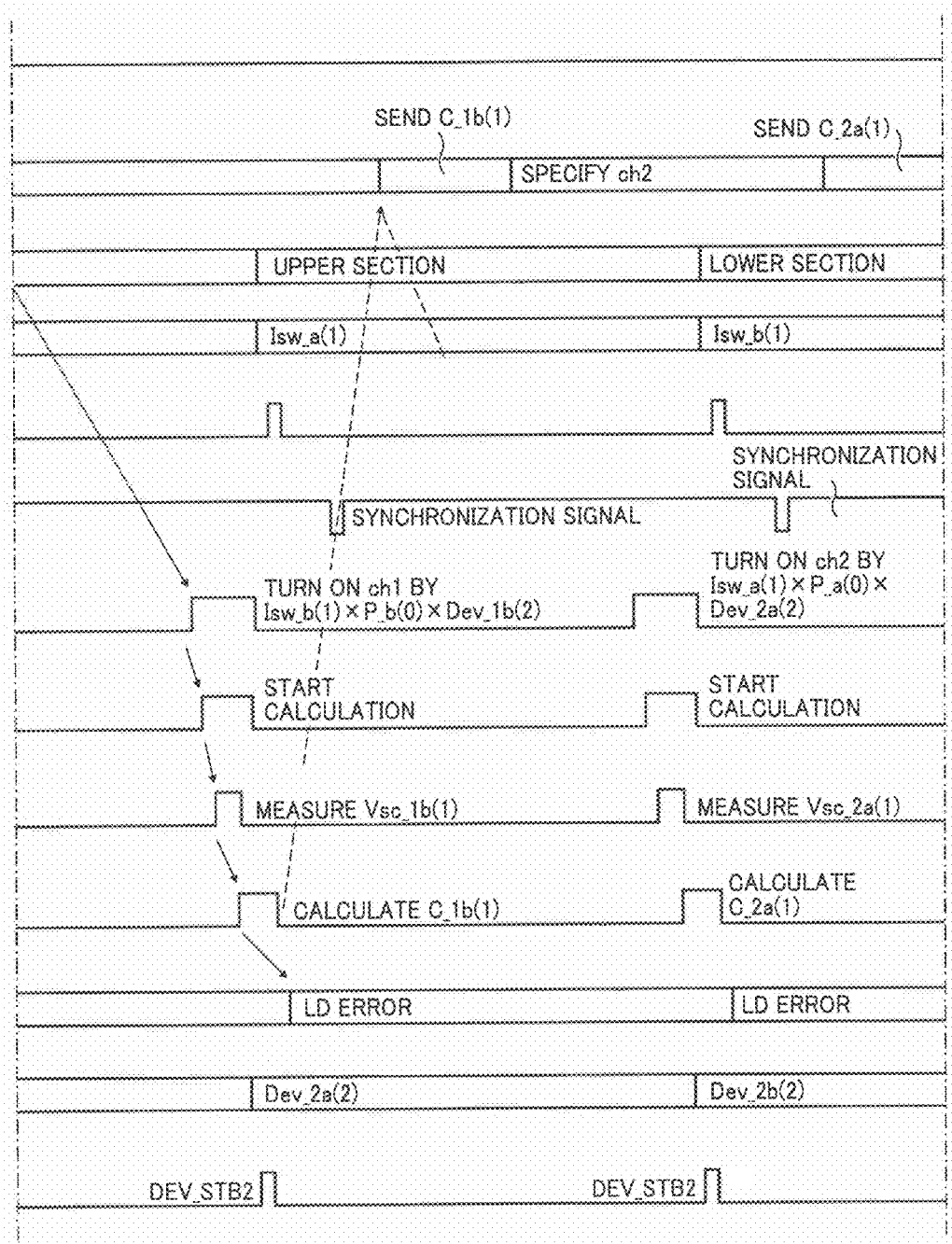
FIGS. 26A and 26B are timing charts that explain a calibration-value calculating process performed by the micro controller.
Figure 26A:
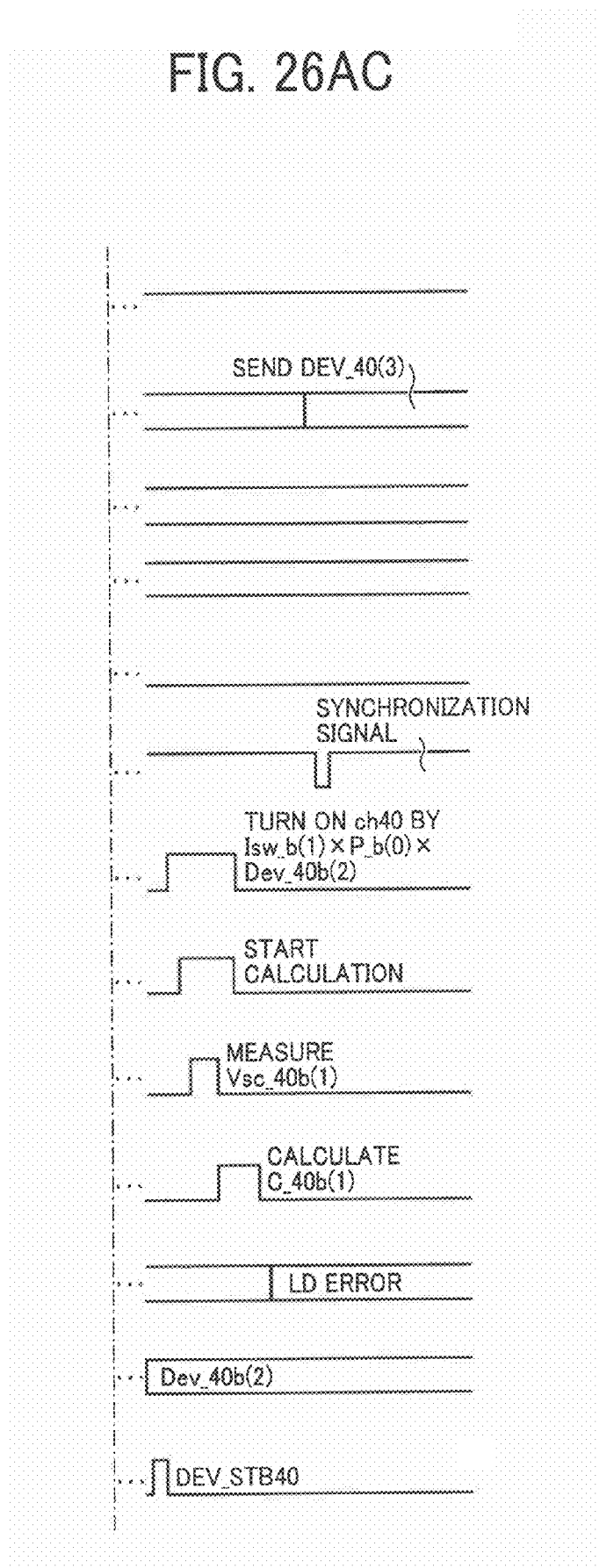
Figure 26B:
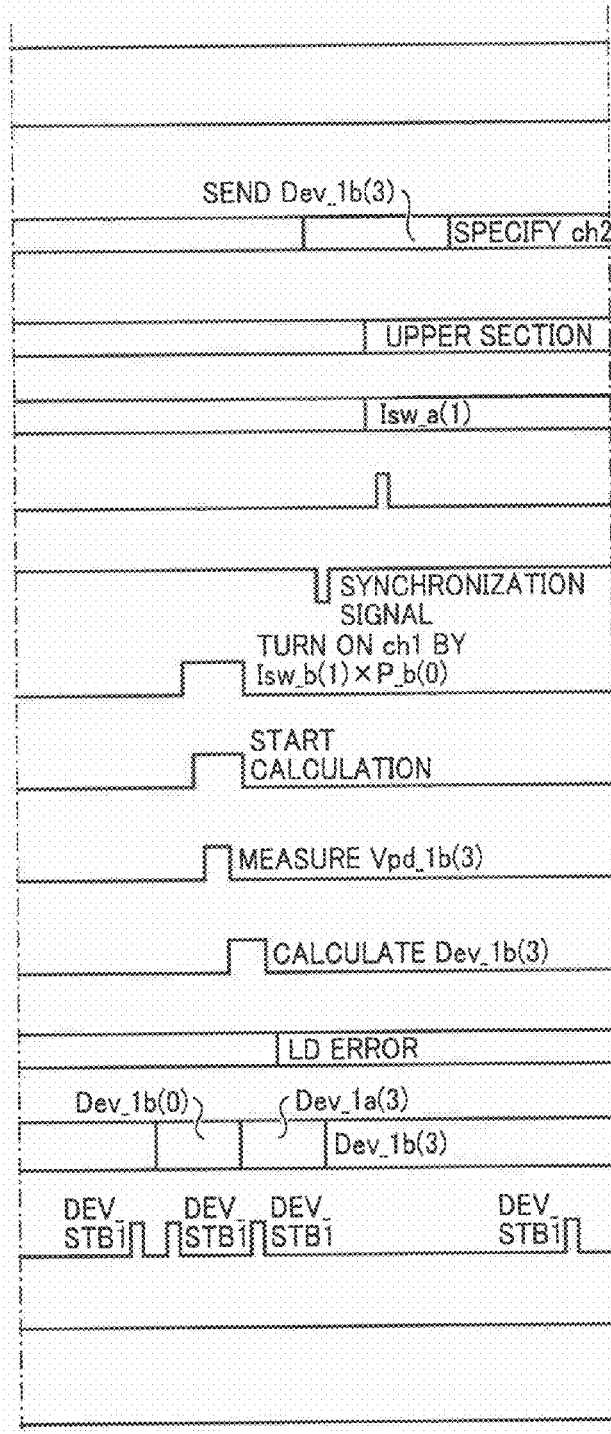
Figure 26B:
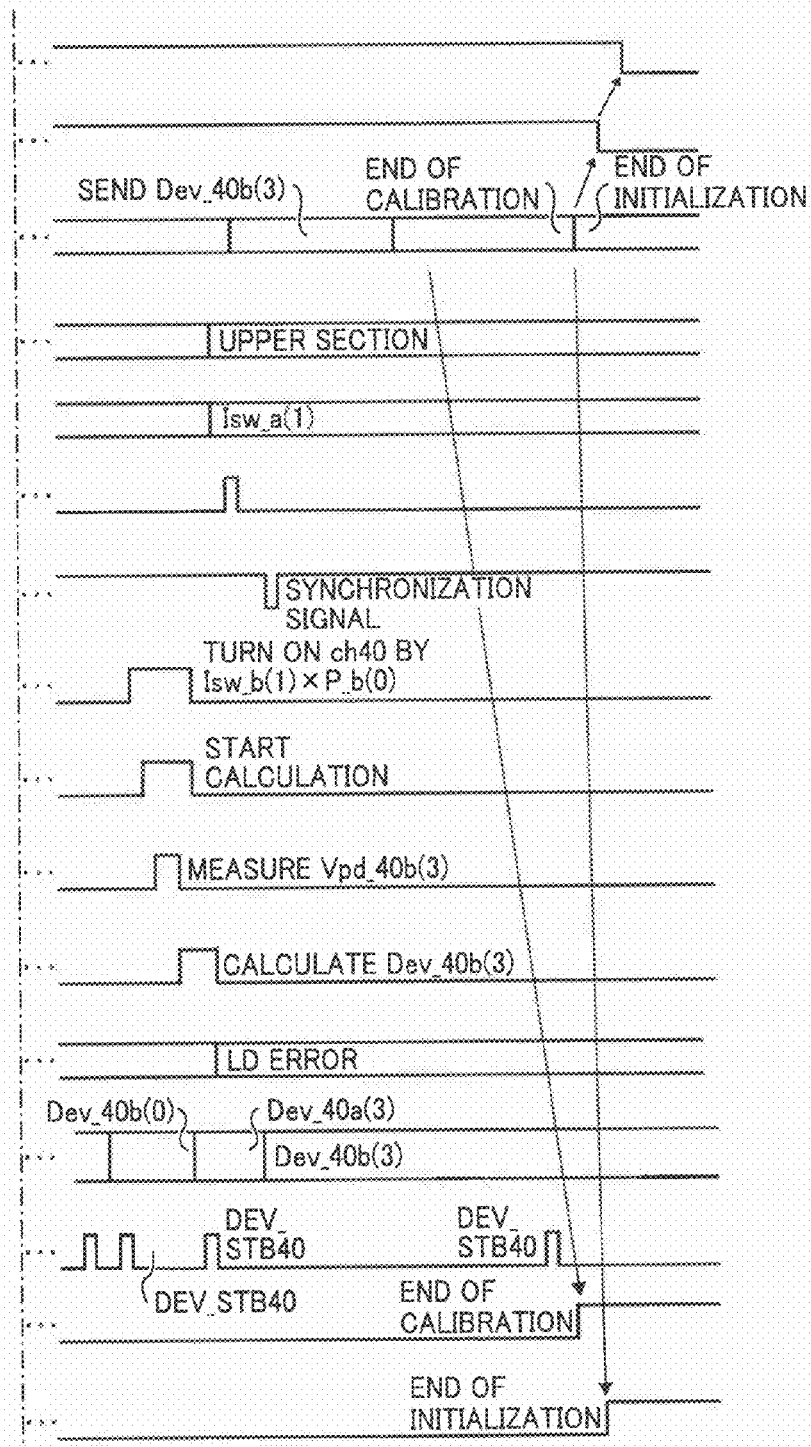

FIGS. 26A and 26B are timing charts that explain the calibration-value calculating process performed by the micro controller 302. The calibration-value calculating process starts when the common-current updating process is finished, more particularly, when the micro controller 302 asserts the iswend_r signal indicative of the end of the common-current updating process (sets the iswend_r signal high in the first embodiment) and the GAVD 200 receives the iswend_r signal. Upon receiving the DETP signal from the synchronization detecting device 220, the GAVD 200 sends the APCEN signal to the micro controller 302 to set the APC enable.

Upon receiving the APCEN signal, the micro controller 302 reads, while the first LD is in the ON state by the common current Isw_a(1)×Dev_1a(2)×P_a(0), a scanning monitor voltage Vsc_1a(1) of ch1 and calculates a calibration value C_1a(1) using Equation (4). The micro controller 302 sends the calculated calibration value C_1a(1) to the GAVD 200. When the common current is switched to Isw_b(1) in synchronized with the DETP signal received from the synchronization detecting device 220a, the first LD, which is allocated to ch1, turns on by the common current Isw_b(1)× Dev_1b(2)×P_b(0). After that, the micro controller 302 reads a scanning monitor voltage Vsc_1b(1) and calculates a calibration value C_1b(1) using Equation (4). The micro controller 302 sends the calculated calibration value C_1b(1) to the GAVD 200. The above-described process is repeated until a calibration value C_40b(1) of ch40 is sent to the GAVD 200. When the calibration value C_40b(1) is sent to the GAVD 200, the correction value is calculated in the manner described with reference to FIG. 24. When the correction values f all the channels are updated, a cend_r signal indicative of the end of the calibration-value calculating process is output to the GAVD 200. This is also the end of the initializing process. The micro controller 302 sets a shokiend_r signal ON in response to a command to finish the initialization (not shown) and negates the APCSTART signal, thereby notifying the GAVD 200 of the end of the initializing process. The micro controller 302 notifies the main CPU 300 of the end of the initializing process by negating the apcsttrig_r signal. In the event of an error of an LD, the micro controller 302 issues the error signal "LDERR". The error signal "LDERR" will be described in detail later.

The image forming apparatus 100 starts the process control, when the process of initializing the VCSEL 208 is finished. Optimum conditions to form an image with a target density (hereinafter, "optimum image-formation conditions") are variable depending on changes in the temperature surrounding or inside the image forming apparatus 100, time degradation of a supply system, and long-period unused state of the image forming apparatus 100. The process control is performed at certain timing after irradiation of the laser beam and before the end of the image formation to detect a developing performance of the image forming apparatus 100 and decide the optimum image-formation conditions.

Figure 27:
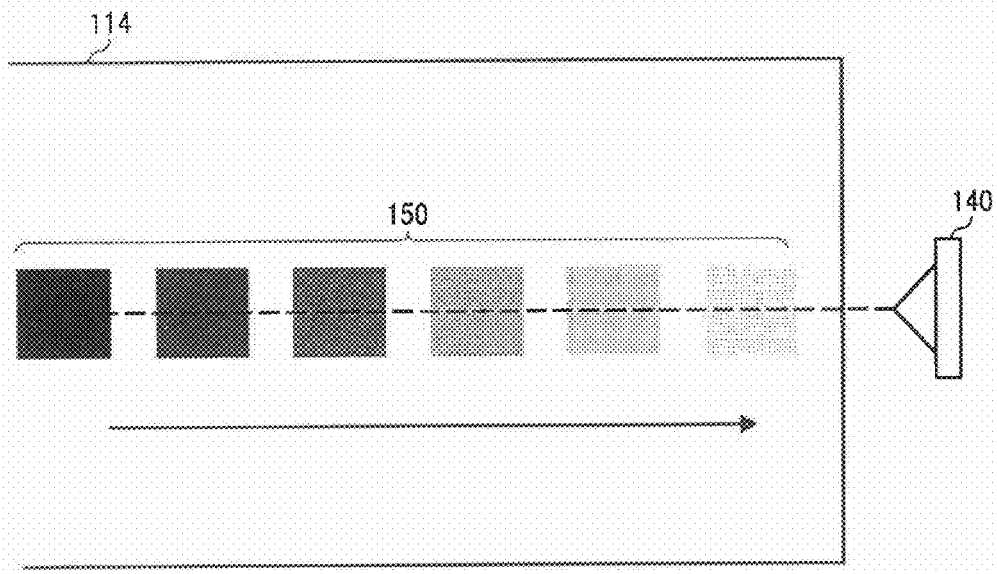
FIG. 27 is a schematic diagram of toner patterns that are formed on an intermediate transfer belt by changing a power of an LD step by step.

In the process control, the image forming apparatus 100 calculates the optimum intensity of the laser beam. As shown in FIG. 27, for example, the image forming apparatus 100 changes the intensity of the scanning beam step by step and forms a plurality of toner patterns 150 each having different densities on the intermediate transfer belt 114 in such a manner that the toner patterns 150 are arranged at regular intervals. A toner-density sensor 140 of the image forming apparatus 100 measures the density of each toner pattern. The intensity of the scanning beam that forms the optimum density is selected as the optimum intensity.

In the VCSEL 208, the multiple laser beams are emitted from the multiple LDs on the channel basis. Therefore, in the process of increasing the intensity of the scanning beam step by step, the intensities of the laser beams of all the channels are required to increase at the same percentage so that the intensities of the laser beams cannot vary from each other. If the percentage at which the intensity of the scanning beam increases is, for example, 10%, the percentage at which the intensity of the laser beam emitted from every channel of the VCSEL 208 increases is also 10%. The common current Isw, which is used in every channel, is used to increase the intensity of every channel at the same percentage. To increase the intensity of every channel at the same percentage, e.g., 10%, the common current Isw increases by 10%.

Figure 28:
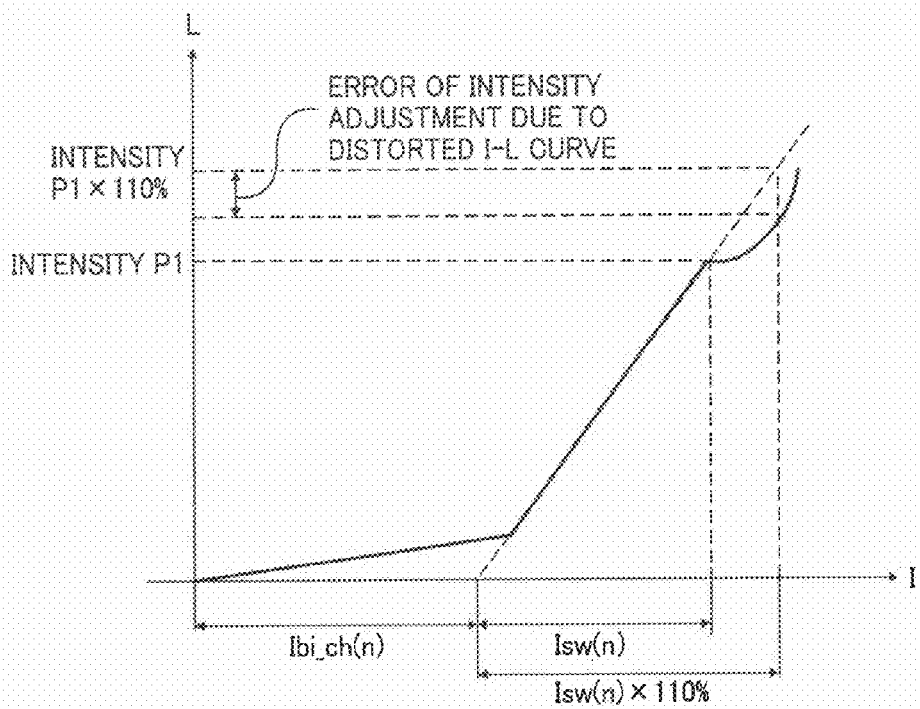
FIG. 28 is an I-L curve that is obtained by distorting a section corresponding to Isw in the I-L curve shown in FIG. 13.

However, the increase of the common current Isw is not enough to increase the intensity of every channel at the same percentage. There are two reasons. One reason is that the slope of the I-L curve in the range of the common current Isw shown in FIG. 14 can be distorted as shown in FIG. 28. The manner of the distortion is variable on the channel basis. Therefore, if the I-L curve is distorted, it is impossible to increase the intensity of every channel at the same percentage by changing the common current Isw. The other reason is that even when the common current Isw is changed, because of differences in the internal resistance among the channels of the VCSEL 208, the percentage at which the current increases in one channel is different from the percentage in another channel.

To solve the problem, when the common current Isw is changed in the process control, the channel-based correction value Dev_ch is re-calculated using the changed common current Isw. The correction value Dev_ch can be re-calculated in the same manner as the initializing process shown in FIG. 21. In the APC of the process control (hereinafter, "process-control APC"), the correction value is re-calculated at the interval between each adjacent ones of the toner patterns 150 shown in FIG. 27. In other words, the re-calculation is performed several times. Therefore, if the calculation and setting of the single correction value Dev is performed in response to the single DETP signal in the manner that is described with reference to the timing chart shown in FIG. 22, it takes a considerable time for the process control.

In the process-control APC according to the first embodiment, in contrast to the other APCs, when the GAVD 200 receives the DETP signal, the calculation and setting of the correction values Dev of some channels are performed before the GAVD 200 receives the next DETP signal. With this configuration, the calculation and setting of the correction values Dev of all the channels is performed in a short time, which reduces the time that it takes for the process control as much as possible.

Figure 29A:
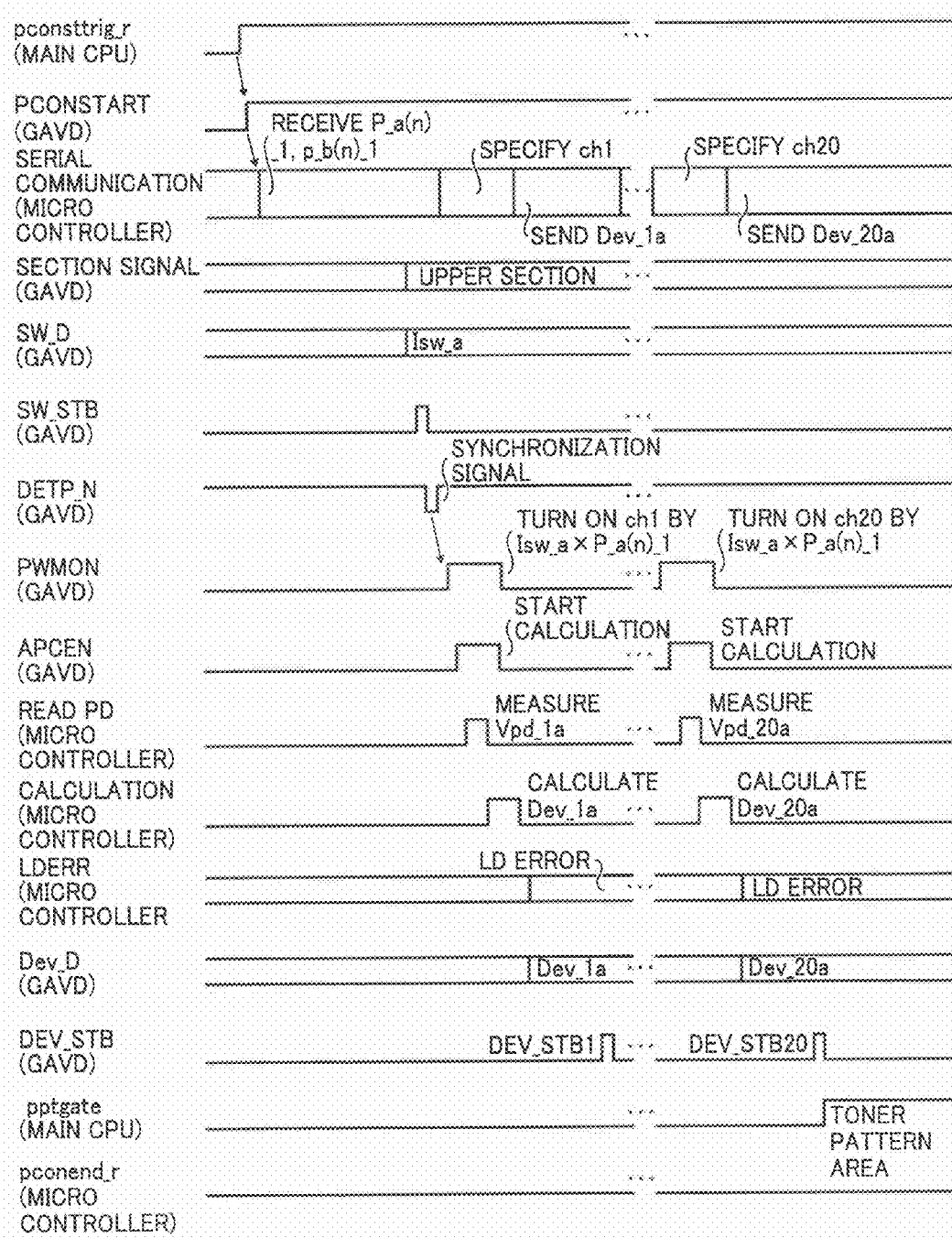
Figure 29A:
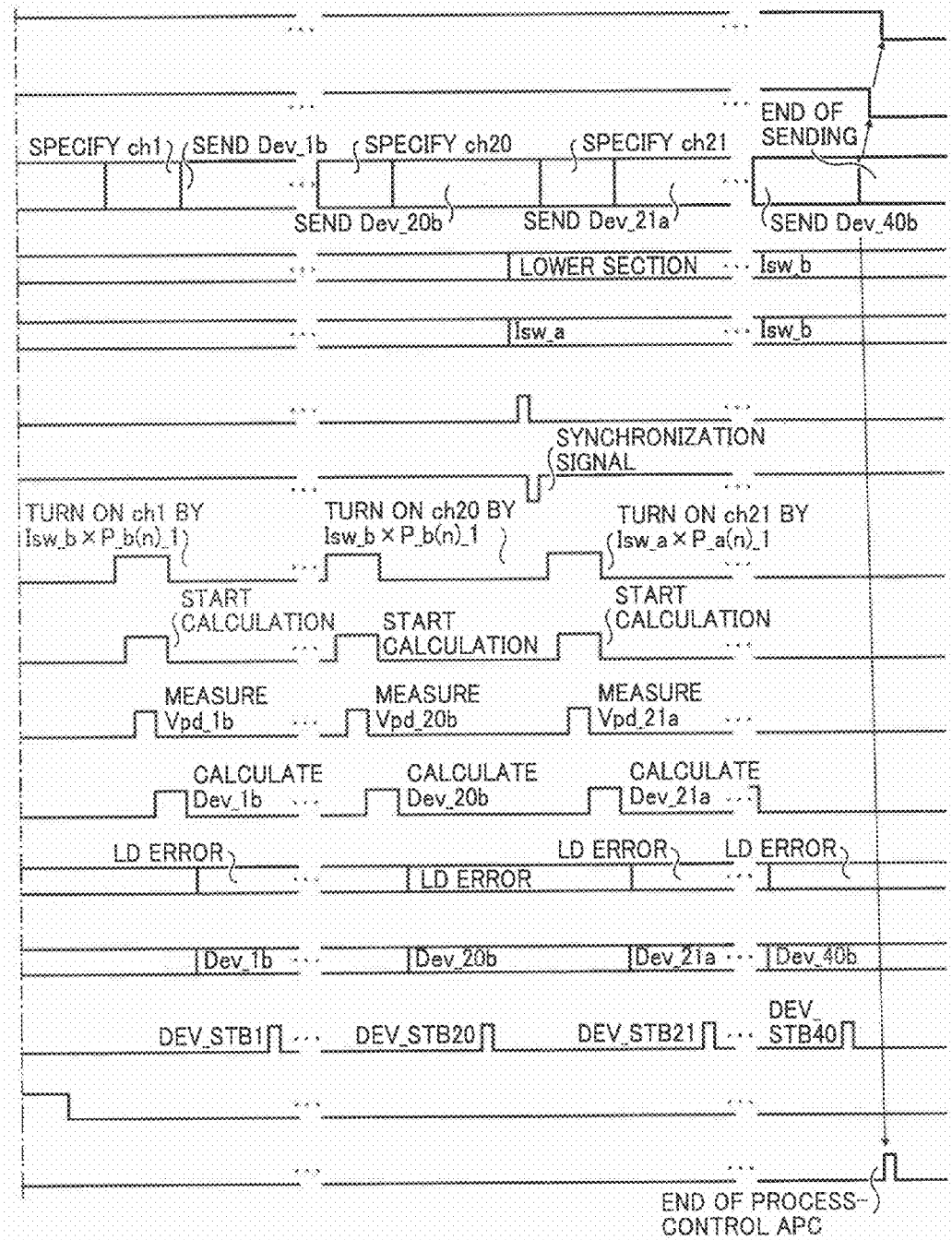

The timing to perform the calculation and setting of the correction value Dev_ch in the process control is described below. FIGS. 29A and 29B are timing charts that explain the process-control APC. The main CPU 300 asserts a pconsttrig_r signal indicative of the start of the process control. Upon receiving the pconsttrig_r signal, the GAVD 200 asserts a PCONSTART signal that functions as a control signal of the process-control APC. The process-control APC then starts. The GAVD 200 sends intensity adjustment values P_a(1)_1 and P_b(1)_1 of the scanning beam to be adjusted in the process control to the micro controller 302. The intensity adjustment values P_a(1)_x and P_b(1)_x are the intensity adjustment values of an x-th toner pattern that is selected from the toner patterns 150 shown in FIG. 27. Upon receiving the DETP signal, the GAVD 200 turns on the first LD, which is allocated to ch1, by the common current P_a(1)_1×Isw_a(1). Upon receiving the APCEN signal from the GAVD 200, the micro controller 302 obtains an intensity monitor voltage Vpd_1a(4), calculates the correction value Dev_1a(4) using Equation (6) for the line APC, which will be described later, and sends the calculated correction value to the GAVD 200. The GAVD 200 sets the received correction value Dev_1a(4) to the driver 206 and then turns on, before receiving the next synchronization signal, a second LD that is allocated to ch2 by the common current P_a(1)_1×Isw_a(1). After that, the micro controller 302 calculates a correction value Dev_2a(4). In this manner, the GAVD 200 and the micro controller 302 perform the calculation and setting of the correction values Dev_ch of several channels sequentially until the GAVD 200 receives the next synchronization signal.

If the calculation of the correction values Dev_ch is performed within an area where the toner patterns 150 shown in FIG. 27 are formed in the main-scanning direction, because the VCSEL 208 is in the ON state, an undesired image is formed on the area where the toner-density sensor 140 scans. This causes a miss-detection of the toner-density sensor 140. To solve the problem, a toner-pattern gate signal (hereinafter, "pptgate signal") is used in the first embodiment to calculate the correction value Dev_ch using an area other than the area where the toner patterns 150 are formed. When the pptgate signal is asserted, the calculation of the correction value DEV_D is suspended. In the example shown in FIG. 27, the calculation is suspended at the end of the calculation of the correction value DEV_D of ch20. After the pptgate signal is negated, the calculation is resumed from the correction value DEV_D of ch21.

When the calculation and setting of the 40 channel-based correction values Dev a using the intensity adjustment value P_a(1)_1 and the calculation and setting of the 40 channel-based correction values Dev b using the intensity adjustment value P_b(1)_1 are finished, a process-control APC end command sets a pconend_r signal ON, thereby negating a PCONAPC signal. This notifies the GAVD 200 of the end of the process-control APC. The GAVD 200 negates the pconsttrig_r signal, thereby notifying the main CPU 300 of the end of the process control. After checking that the PCONAPC signal is negated, the GAVD 200 forms a first one of the toner patterns 150. After the toner pattern is formed, the PCONAPC signal is asserted, again. An intensity adjustment value P_a(1)_2 for the second toner pattern is set. The process control APC for the second toner pattern is then performed.

If the intensity of the VCSEL 208 increases by 10% each time the next one of the toner patterns 150 is to be formed, the value of the intensity adjustment value increases in such a manner that P(1)_1=1.1, P(1)_2=1.2, and so on, and the correction value Dev_ch is calculated using the intensity adjustment value.

When all the toner patterns 150 are scanned, the main CPU 300 determines the optimum intensity adjustment values P_a(1)_m and P_b(1)_m. After that, the main CPU 300 asserts the pconsttrig_r signal. Upon receiving the pconsttrig_r signal, the GAVD 200 asserts the PCONSTART signal and sends the optimum intensity adjustment values P_a(1)_m and P_b(1)_m that is determined by the main CPU 300 to the micro controller 302. The micro controller 302 calculates and sets the 40 correction values Dev_ch on the channel basis using the received optimum intensity adjustment values P_a(1)_m and P_b(1)_m. After that, the pconend_r signal is set ON and the PCONAPC signal is negated in response to the command. This notifies the GAVD 200 of the end of the setting of the common current Isw_and the correction value Dev. The GAVD 200 negates the pconsttrig_r signal, thereby notifying the main CPU 300 of the end of the setting of the common current Isw_and the correction value Dev. The number "1" in the intensity adjustment value P(1) means that the intensity adjustment value is calculated in the first process-control APC after the initializing process is performed. The number increments by one each time the process-control APC is performed (e.g., P(2), P(3), . . . ). The process-control APC is thus repeated.

The image forming apparatus 100 starts the image forming process using the correction value Dev_ch(4) that is set by the initializing operation or the process-control APC. The image forming apparatus 100 performs a typical image forming process, i.e., charges the photosensitive element with the static electric charge, forms a latent image by the exposure by the LD, develops the latent image into the toner image, transfers the toner image onto a recording medium, fixes the toner image onto the recording medium, and discharges the recording medium.

In the copying operation, the image forming apparatus 100 performs the image forming process while controlling the intensity of the laser beam by the line APC in accordance with changes in the environment. The line APC includes the calculation of the correction value Dev_ch and the bias current Ibi_ch and the control over the intensity of the scanning beam that are performed after the initializing operation.

Figure 30:
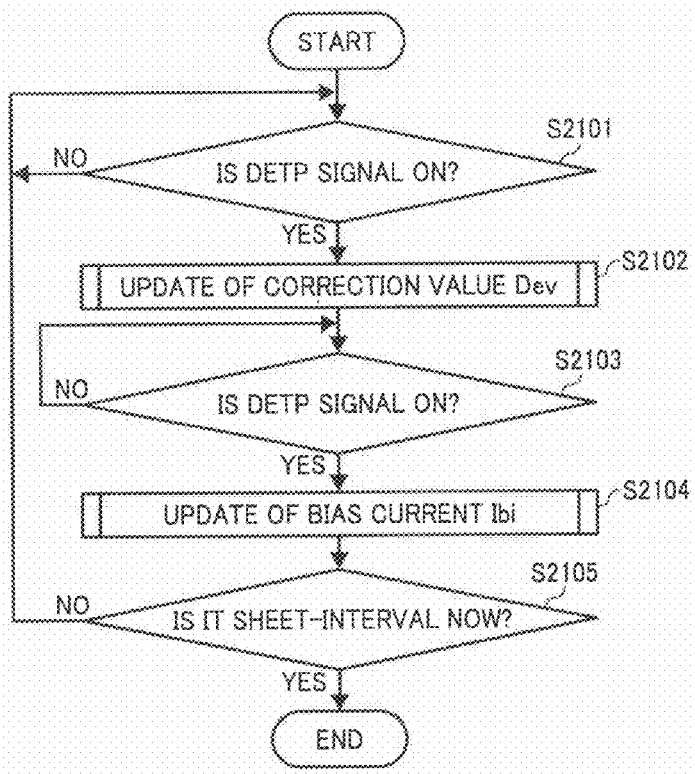
FIG. 30 is a flowchart of a process of updating the correction value Dev and a bias current Ibi by the line APC.

FIG. 30 is a detailed flowchart of the line APC shown in Step S702 of FIG. 16. The line APC is performed in synchronized with the DETP signal one main-scanning line after another after the initializing process is finished. Upon receiving the DETP signal from the synchronization detecting device 220, the GAVD 200 sends the line APC signal to the micro controller 302 (Step S2101). Upon receiving the line APC signal, the micro controller 302 updates the correction value Dev of the specified channel (Step S2102).

Upon receiving the next DETP signal (Step S2103), the micro controller 302, the micro controller 302 updates the bias current Ibi of the specified channel using the correction value that is updated at Step S2102 (Step S2104). The line APC for one channel is performed by a pair of DETP signals. After that, the micro controller 302 checks whether it is the sheet interval now (Step S2105). If it is not the sheet interval now (No at Step S2105), the line APC for the next channel is performed. If it is the sheet interval now (Yes at Step S2105), the sheet-interval APC process is performed.

Figure 31:
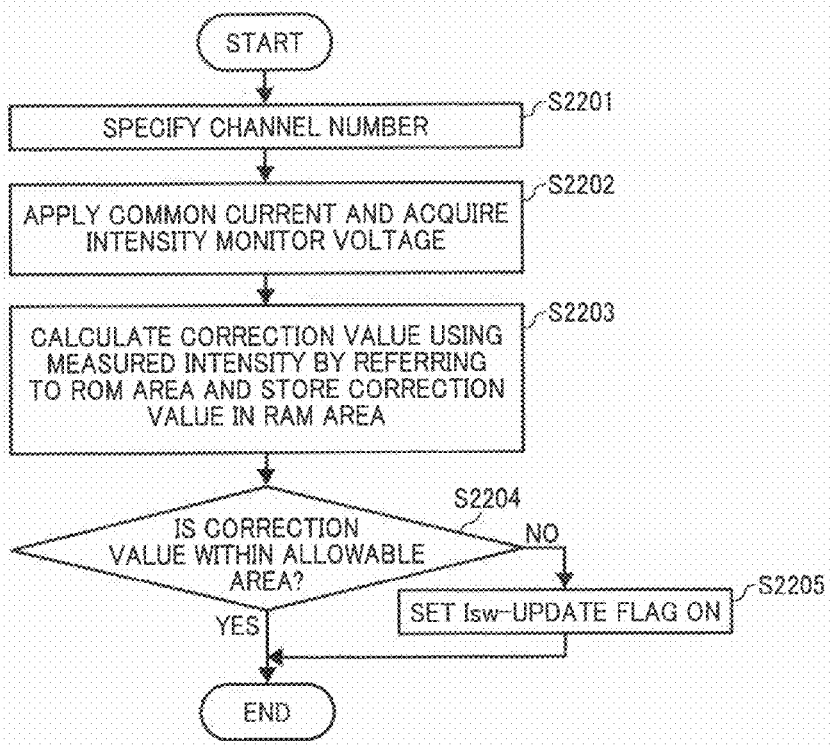
FIG. 31 is a flowchart of a process of updating the correction value Dev.

FIG. 31 is a detailed flowchart of the process of updating the correction value Dev shown in Step S2102 of FIG. 30. Upon receiving the line APC signal from the GAVD 200, the micro controller 302 sends the target channel number (e.g., ch1) of the VCSEL 208 to the GAVD 200 to specify the channel that is subjected to the line APC (Step S2201).

The GAVD 200 turns on the first LD, which is allocated to ch1, for the predetermined period by the common current Isw(1)×P(1) (Step S2202). When the first LD is in the ON state, the micro controller 302 acquires the intensity monitor voltage Vpd_1(k) using the A/D converting unit 304. The letter k in Vpd_1(k) is the number of times at which the intensity monitor voltage Vpd_1 is updated. The micro controller 302 calculates a correction value Dev_1(j) of ch1 using the acquired intensity monitor voltage Vpd_1(k) and the intensity monitor voltage Vpd_1(0) and stores the calculated correction value Dev_1(j) in the ROM area of the memory 308 (Step S2203). The intensity monitor voltage Vpd_1(0) is stores in the ROM area of the memory 308 and is output from the photoelectric conversion element 218 in the initializing operation. The letter j in Dev_1(j) is the number of times at which the correction value Dev_1 is updated. The correction value Dev_1(j) is calculated using $$\text{Dev\_1}(j) = C\_1(m) \times \left(\frac{\text{Vpd\_1}(0)}{\text{Vpd\_1}(k)}\right) \times P(t) \tag{6}$$

The intensity monitor voltage Vpd_1(0) is set before shipment for ch1 and stored in the ROM area of the memory 308. Although Equation (6) is used to calculate the correction value of ch1, the correction value of any channel number can be calculated using Equation almost the same as Equation (6) except that "1" is replaced with "ch".

The number "j" increments by one each time the line APC is performed. The number "t" in the intensity adjustment value P(t) increments by one each time the process-control APC is performed. The value of the intensity adjustment value P(t) changes, as "t" increases. The number "m" in the calibration C_ch(m) increments by one each time the scanning APC is performed. The scanning APC will be described later.

It is determined whether the value of the calculated correction value Dev is within the allowable range (Step S2204). If the value of the calculated correction value Dev is out of the allowable range (No at Step S2204), an Isw-updating flag is set ON to update the common current Isw_by the sheet-interval APC (Step S2205).

Figure 32:
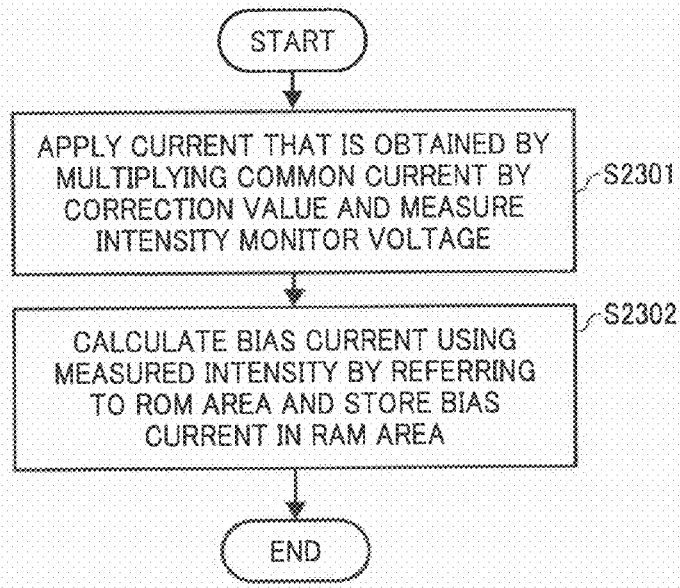
FIG. 32 is a flowchart of a process of updating the bias current Ibi.

FIG. 32 is a detailed flowchart of the process of updating the bias current Ibi shown in Step S2104 of FIG. 30. After the correction value Dev is updated, the GAVD 200 turns on, in synchronized with the next synchronization signal, the LD that is allocated to the specified channel for the predetermined period by the current Isw(l)×Dev_1(n)×P(1) (Step S2301). The letter "l" in Isw(l) is the number of times at which the common current is updated. When the LD is in the ON state, the micro controller 302 acquires an intensity monitor voltage Vpd_1(n+1). After that, the micro controller 302 calculates a bias-current correction value ΔIbi_1 of ch1 using the acquired intensity monitor voltage Vpd_1(n+1), the intensity monitor voltage Vpd_1(n) that is acquired immediately before, and the intensity monitor voltage Vpd_1(0) and stores Ibi_1(h)+ΔIbi_1 as the bias current Ibi_1(h+1) in the RAM area of the memory 308 (Step S2302). The intensity monitor voltage Vpd_1(0) is stored in the ROM area of the memory 308, and is output from the photoelectric conversion element 218 in the initializing operation. The letter "h" in Ibi_1(h) is the number of times at which the bias current Ibi_1 is updated.

Figure 33:
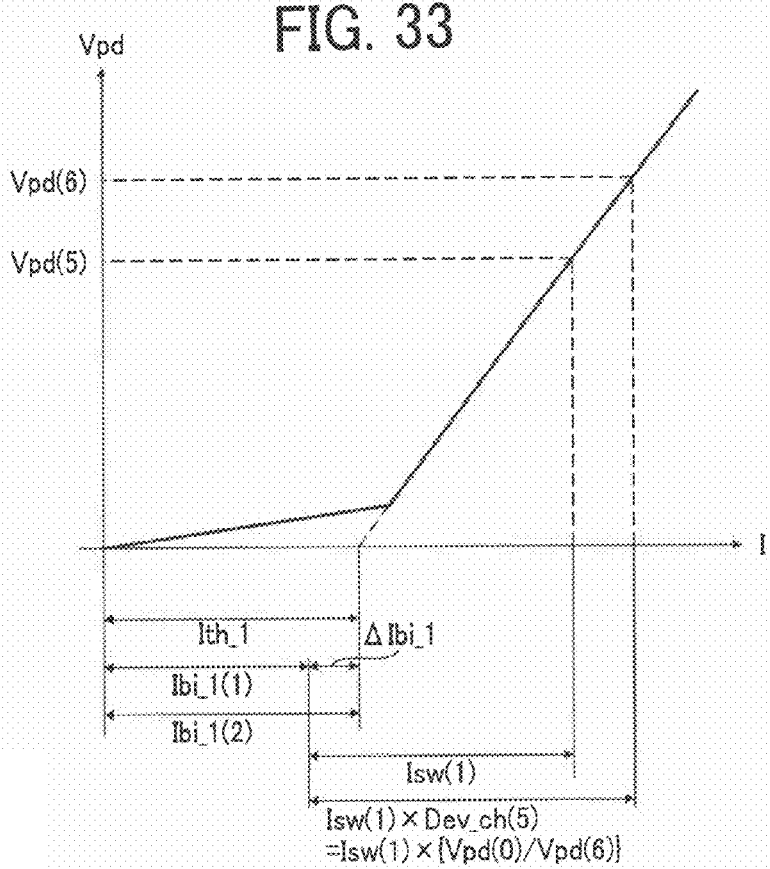
FIG. 33 is a graph that explains a relation among Vpd(5), Vpd(6), Isw(l), and ΔIbi_1.

FIG. 33 is a graph that explains a relation among the intensity monitor voltages Vpd(k) and Vpd(k+1), the common current Isw(l), and the bias-current correction value ΔIbi_1. In the example shown in FIG. 33, k=5, l=1, and h=1. The bias current Ibi_1(h) is calculated using the intensity monitor voltage Vpd_1(0), which is used in the initializing operation, and Equation (7) that is based on the relation shown in FIG. 33.

$$\Delta\text{Ibi\_1}(h) = \left(\frac{\text{Vpd\_1}(k+1) - \text{Vpd\_1}(0)}{\text{Vpd\_1}(k+1) - \text{Vpd\_1}(k)}\right) \times \text{Isw}(l) \tag{7}$$

The intensity monitor voltage Vpd_1(0) is set for ch1 before shipment and is stored in the ROM area of the memory 308.

In the above-described bias-current updating process, Equation (7) is used where h=2, k=5, and l=1. The number of h increments by one each time the line APC is performed.

Figure 34A:
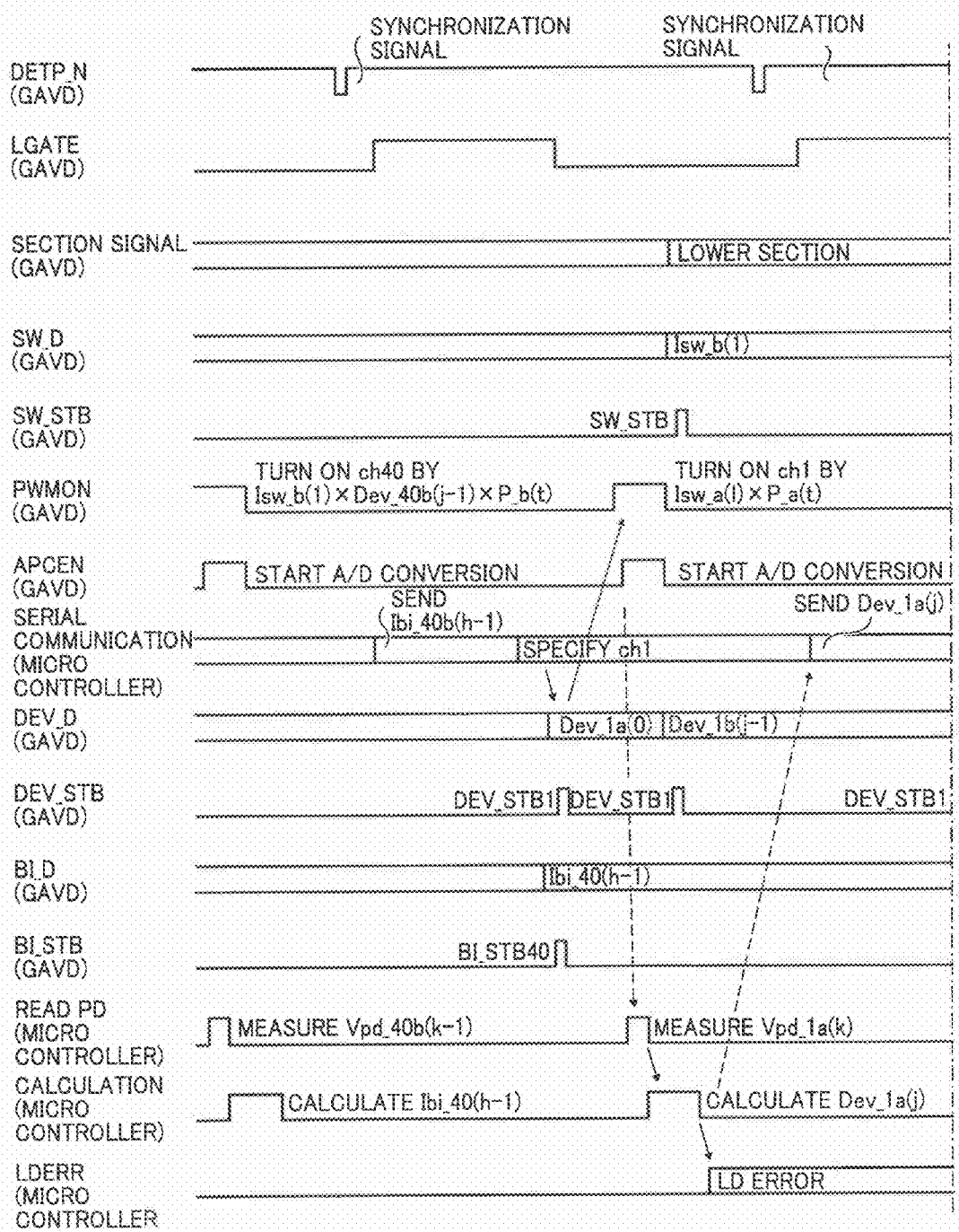
FIG. 34 is a timing chart for explaining the line APC performed by a GAVD and the micro controller.
Figure 34B:
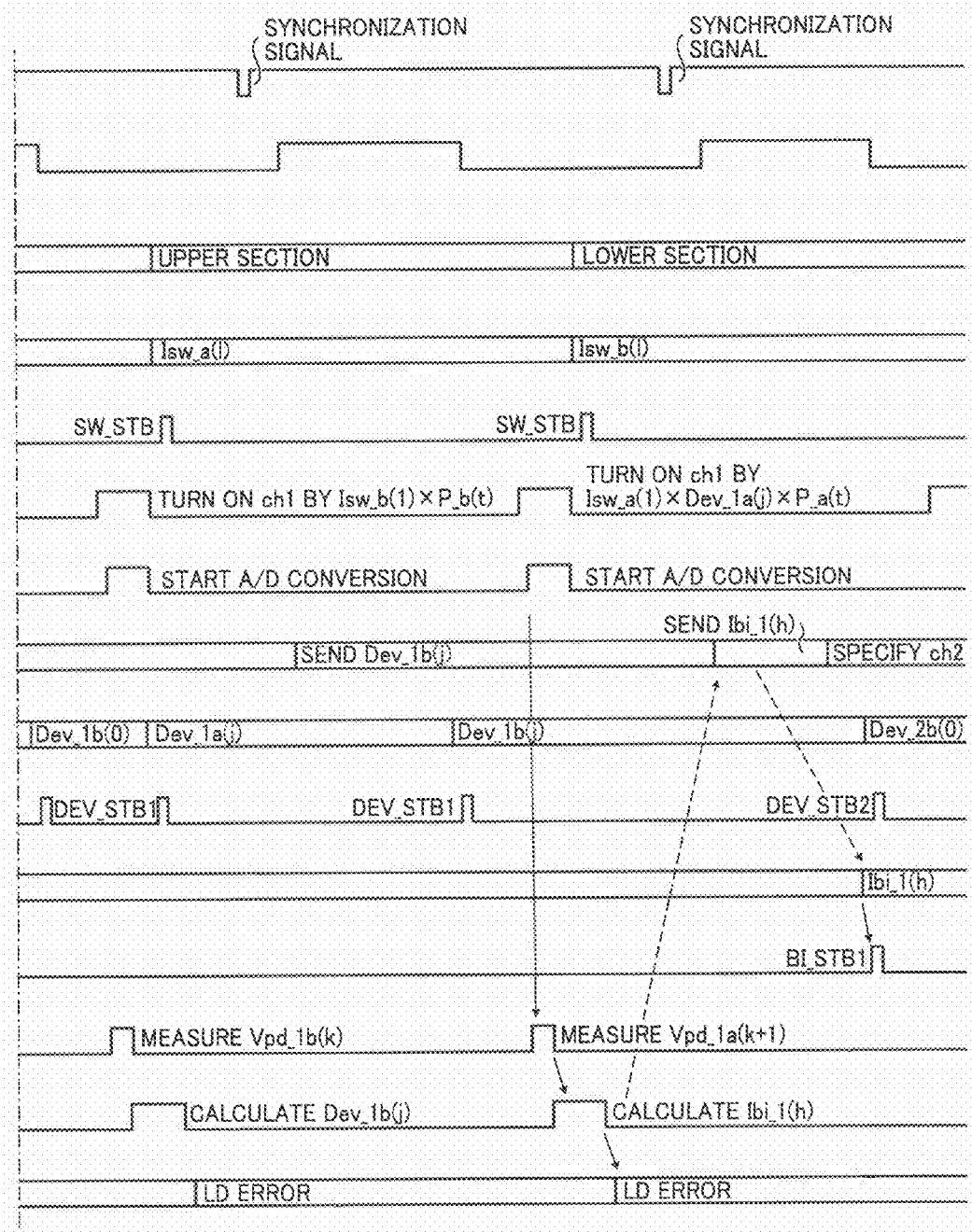

FIG. 34 is a timing chart for explaining the line APC performed by the GAVD 200 and the micro controller 302. The timing chart shown in FIG. 34 begins with the line APC for ch40 to make it clear that the line APC is sequential. As shown in FIG. 34, upon receiving a synchronization signal DETP_N from the synchronization detecting device 220a, the GAVD 200 sets an LGATE signal to write the image data to the photosensitive element. After that, the GAVD 200 issues, when the LGATE signal is negated, the PWMON signal in a no-image area and causes the first LD, which allocated to ch1, to emit the monitor beam by Isw_a(l)×P_a (t). The GAVD 200 then outputs the APCEN signal, thereby commanding the micro controller 302 to start the A/D conversion.

When the first LD is in the ON state, the micro controller 302 acquires the intensity monitor voltage Vpd_1a(k) and calculates the correction value Dev_1a(j). When the correction value Dev_1a(j) is calculated, the micro controller 302 sends the calculated correction value Dev_1a(j) to the GAVD 200. Upon receiving the correction value Dev_1a(j), the GAVD 200 outputs the DEV_STB1 signal, thereby setting the received correction value fixed. The GAVD 200 then performs the calculation of the correction value Dev_1b(j) in response to the next synchronization signal. If the intensity monitor voltage Vpd_1(k) cannot be detected, the micro controller 302 outputs the error signal "LDERR", thereby notifying that the first LD, which is allocated to ch1, is in failure.

Upon receiving the next synchronization signal DETP_N, the GAVD 200 turns on the first LD, which is allocated to ch1, by the common current Dev_1a(j)×Isw_a(1)×P_a(t). The micro controller 302 then reads the intensity monitor voltage Vpd_1a(k+1) and calculates the bias current Ibi_1(h). The micro controller 302 sends the calculated bias current Ibi_1 (h) to the GAVD 200. Upon receiving the bias current Ibi_1 (h), the GAVD 200 outputs an IB_STB1 signal, thereby setting the bias current fixed. If the intensity monitor voltage Vpd_1(k+1) cannot be detected, the micro controller 302 outputs the error signal "LDERR", thereby notifying that the first LD, which is allocated to ch1, is in failure.

After that, the GAVD 200 specifies the next channel, i.e., ch2. The correction values Dev_2b(j) and Dev_2a(j) and the bias current Ibi_2(h) are calculated in this order. The above-described process is performed repeatedly for ch3, ch4, . . . , ch40, ch1, . . . , until the printing operation is finished.

When the line APC is being performed, the intensity of the scanning beam cannot be corrected using the correction value Dev that is any value of the allowable range in some cases due to some reasons. In this case, the intensity of the scanning beam is corrected by correcting the value of the common current Isw. If such a fundamental correction of the intensity of the scanning beam is performed during the image formation, a defect image may be formed. To avoid the formation of the defect image, if it is detected in the feedback process by the line APC that the correction value of an arbitrary channel is out of the allowable range, the image forming apparatus 100 forcibly sets the correction value of the channel to the upper limit or the lower limit and continues the image formation until the next sheet-interval timing comes. When the sheet-interval timing comes, the image forming apparatus 100 corrects the common current Isw_and updates the correction value Dev_ch. This intensity correction is called "third intensity correction". Alternatively, it is allowable to correct the common current Isw_and updates the correction value Dev_ch when the correction value Dev_ch is still in the allowable range. In the later case, the correction value is not forcibly set to the upper limit or the lower limit.

Figure 35:
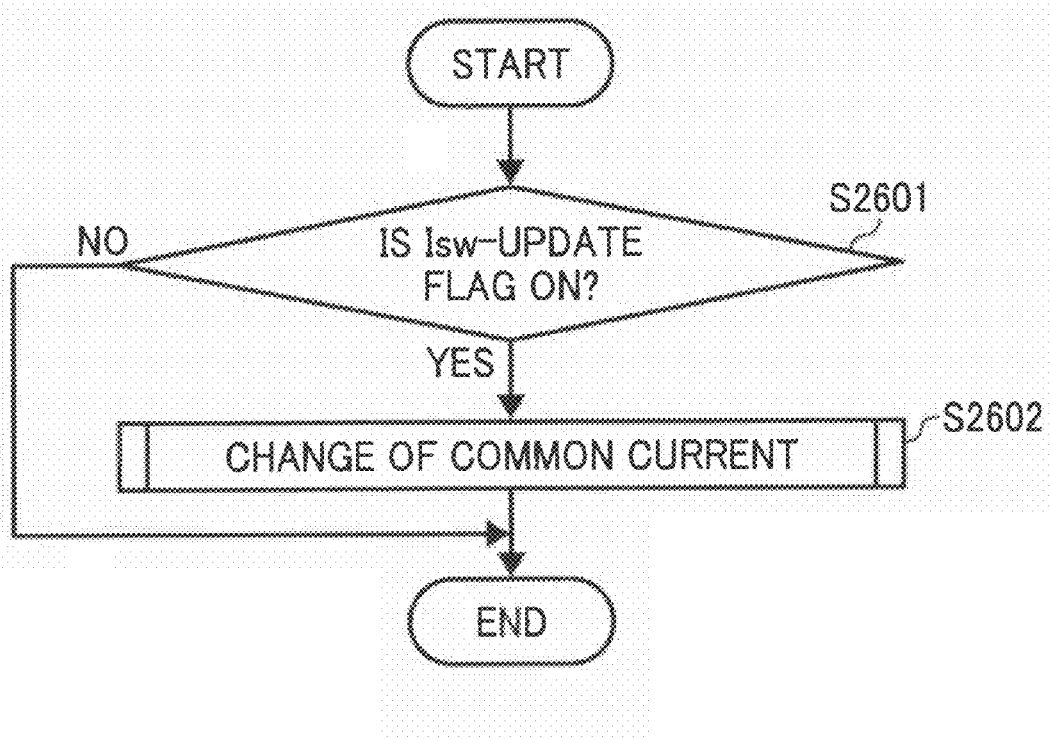
FIG. 35 is a flowchart of a process of updating the common driving current by the sheet-interval APC.

FIG. 35 is a detailed flowchart of the sheet-interval APC shown in Step S703 of FIG. 16. It is determined whether the Isw-updating flag is ON, i.e., whether the common current Isw is to be updated because the scanning beam cannot be corrected using the correction value that is any value of the allowable range (Step S2601). If the Isw-updating flag is OFF (No at Step S2601), the process control finishes the sheet-interval APC.

If the Isw-updating flag is ON (Yes at Step S2601), update of the common current is performed (Step S2602). More particularly, the common current Isw(l) is calculated using $$Isw(l) = Isw(l-1) \times \left( \frac{Dev\_chMax + Dev\_chMin}{2} \right) \quad (8)$$

where Isw(l−1) is the common current that is set immediately before, Dev_chMax is the maximum value of the correction values Dev_ch corresponding to the value of the common current Isw(l), and Dev_chMin is the minimum value of the correction values Dev_ch corresponding to the value of the common current Isw(l). The common current is updated in the same manner as in the common-current updating process shown in FIG. 23. The number "l" increments by one each time the sheet-interval APC is performed.

The common current Isw is updated to Isw(l) each time the sheet-interval APC is performed until the memory 308 is reset. With this configuration, the image forming apparatus 100 can always output the intensity of the laser beam appropriate for the image-formation conditions. The value of the common current Isw(l) is stored in the RAM area and then deleted in response to various events, such as "reset", "automatic power off", and "power off". The default value of the common current is set again when the image forming apparatus 100 is activated or powered ON.

Figure 36A:
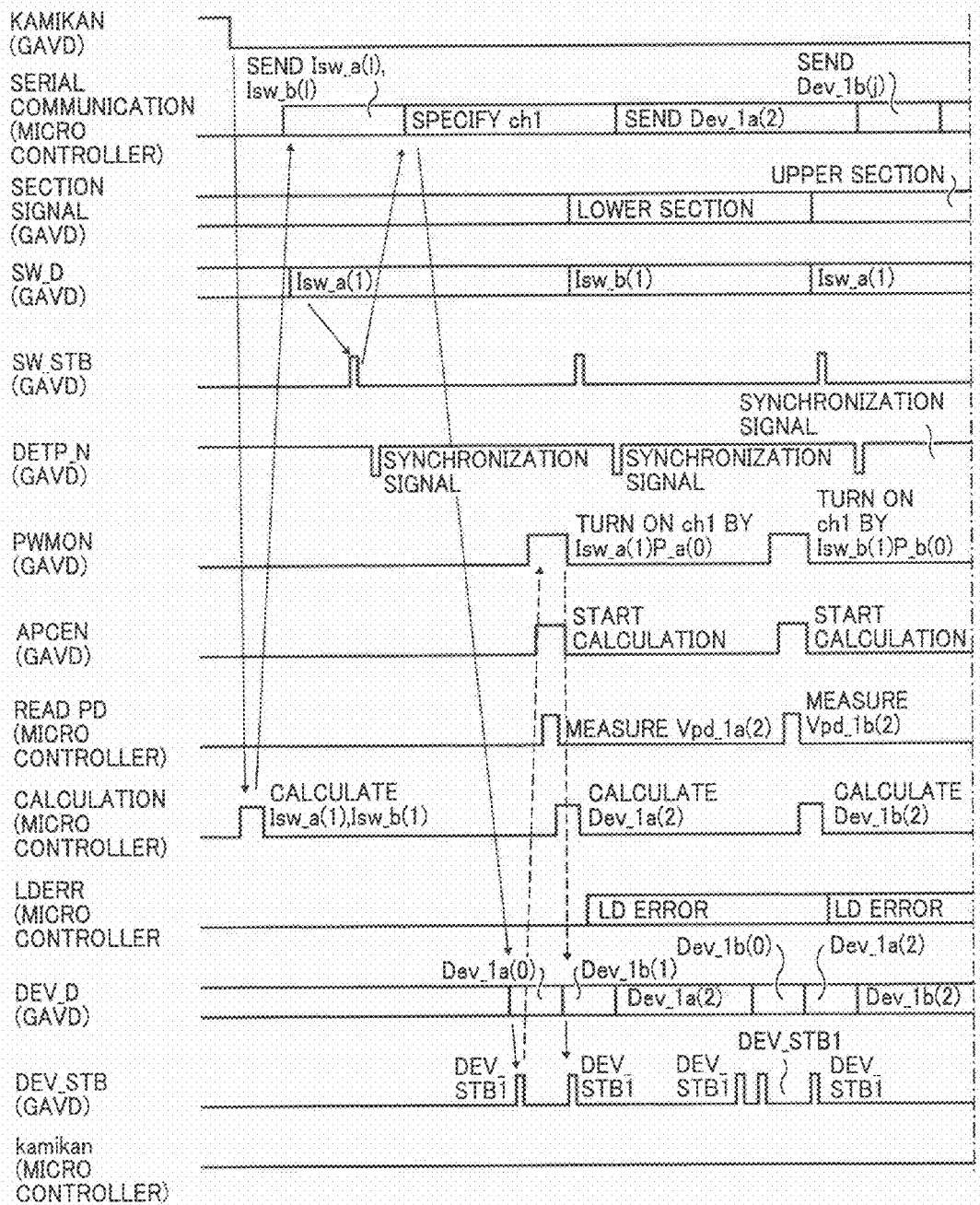
FIG. 36 is a timing chart for explaining the sheet-interval process performed by the micro controller.
Figure 36B:
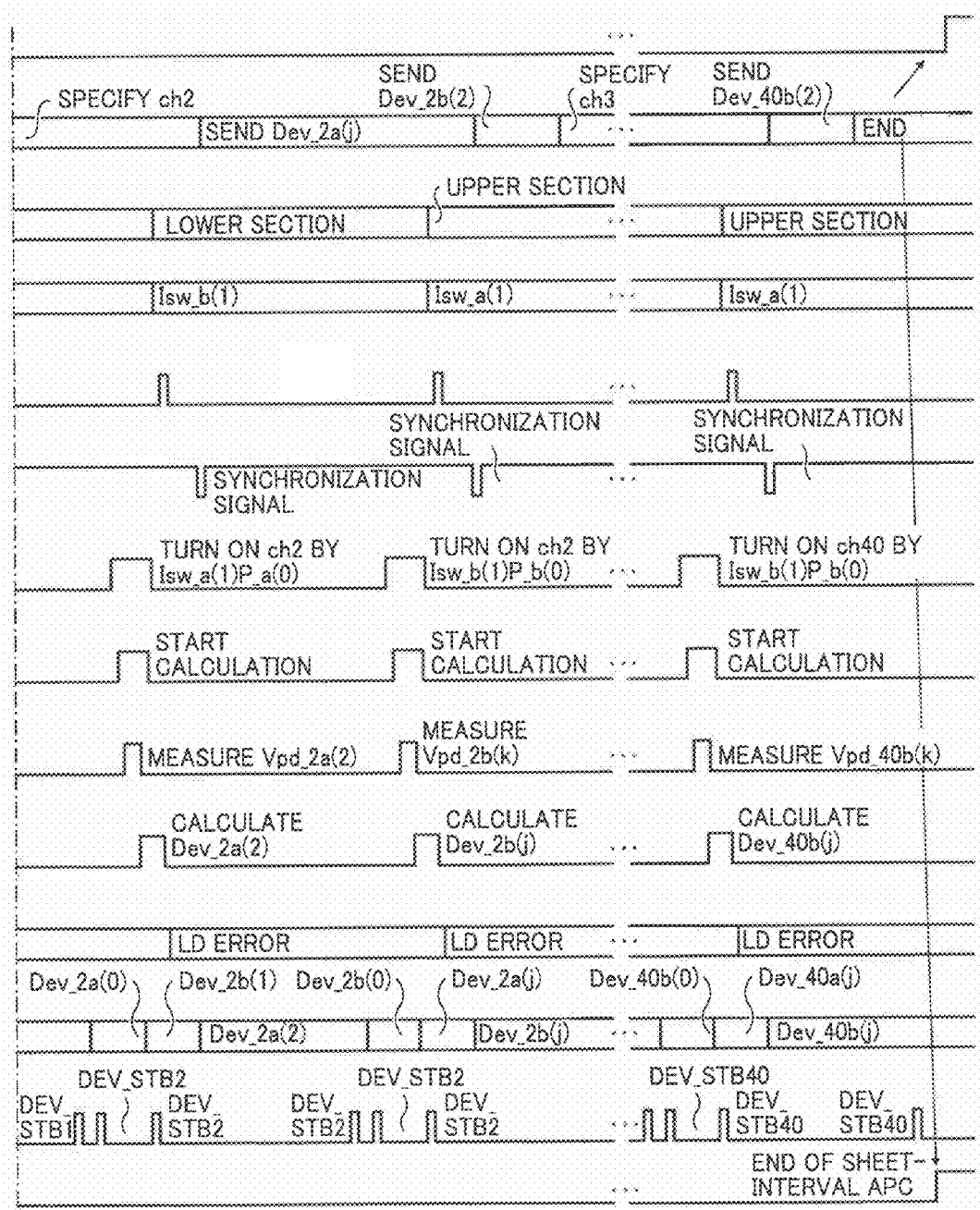

FIG. 36 is a timing chart for explaining the sheet-interval process performed by the micro controller 302. Upon detecting that the GAVD 200 negates a KAMIKAN signal, the micro controller 302 starts the sheet-interval APC. When the KAMIKAN signal is negated, the micro controller 302 checks whether the Isw-updating flag is ON. If the Isw-updating flag is ON, the micro controller 302 calculates the common currents Isw_a(l) and Isw_b(l) in the same manner as in the common-current updating process that is described with reference to the timing chart shown in FIG. 24 and sends the calculated common currents to the GAVD 200. The GAVD 200 then calculates the correction values Dev_1a(j), Dev_1b(j), Dev_2a(j), Dev_2b(j), . . . , Dev_40a(j), and Dev_40b(j), sequentially. When the 40 channel-based correction values are calculated, the micro controller 302 sends a kamikan_r signal indicative of the end of the sheet-interval APC process to the GAVD 200, thereby starting the control of the VCSEL 208 by the GAVD 200.

In the VCSEL initializing operation in response to a power-on of the image forming apparatus 100 or a job start, the calibration value of the intensity monitor voltage is calculated. If many copies are printed out and a considerable time has passed since the intensity monitor voltage is corrected, the environment inside the image forming apparatus 100 changes by heat produced by the polygon mirror 102c and the fixing device. This also changes the temperature surrounding the VCSEL 208, which changes the beam divergence angle of the VCSEL 208 and the beam divergence angle of the scanning beam of each channel. The change of the beam divergence angle changes the ratio between the beam that passes through the aperture mirror 212 and the beam that is reflected by the aperture mirror 212. As a result, the relation between the intensity of the scanning beam on the photosensitive element and the intensity monitor voltage is changed from the relation that is observed before shipment. If the relation is changed, even when the line APC and the sheet-interval APC are performed, the intensity of the canning beam on the photosensitive element cannot be set to the desired intensity.

When a calibration signal is sent from the GAVD 200 to the micro controller 302, update of the calibration value C_ch(m) and the correction value Dev_ch(j) is performed. This intensity correction is called "fourth intensity correction". The calibration value C_ch(m) is calculated using Equation (9) that is based on Equation (4) used in the initializing process.

$$C\_1(m) = \frac{Vsc(0)}{Vsc\_1(m)} \times P(t) \quad (9)$$

The calibration signal is output from the GAVD 200 when it is detected using a temperature sensor 221 that is arranged inside the writing unit that a change in the temperature increases by a predetermined degree or more or when a color-shift correcting process starts. The color-shift correcting process is performed when the number of copies that are printed out sequentially counts up to a predetermined value (when the beam intensity comes to a predetermined intensity).

The number "m" in C_ch(m) increments by one each time the scanning APC is performed. The number "t" in the intensity adjustment value P(t) increments by one each time the process-control APC is performed. The value of the intensity adjustment value P(t) changes as "t" increases.

The scanning APC is performed in the same manner as the calibration-value calculating process shown in FIG. 25. The scanning APC starts when the calibration signal is sent from the GAVD 200 to the micro controller 302.

Figure 37A:
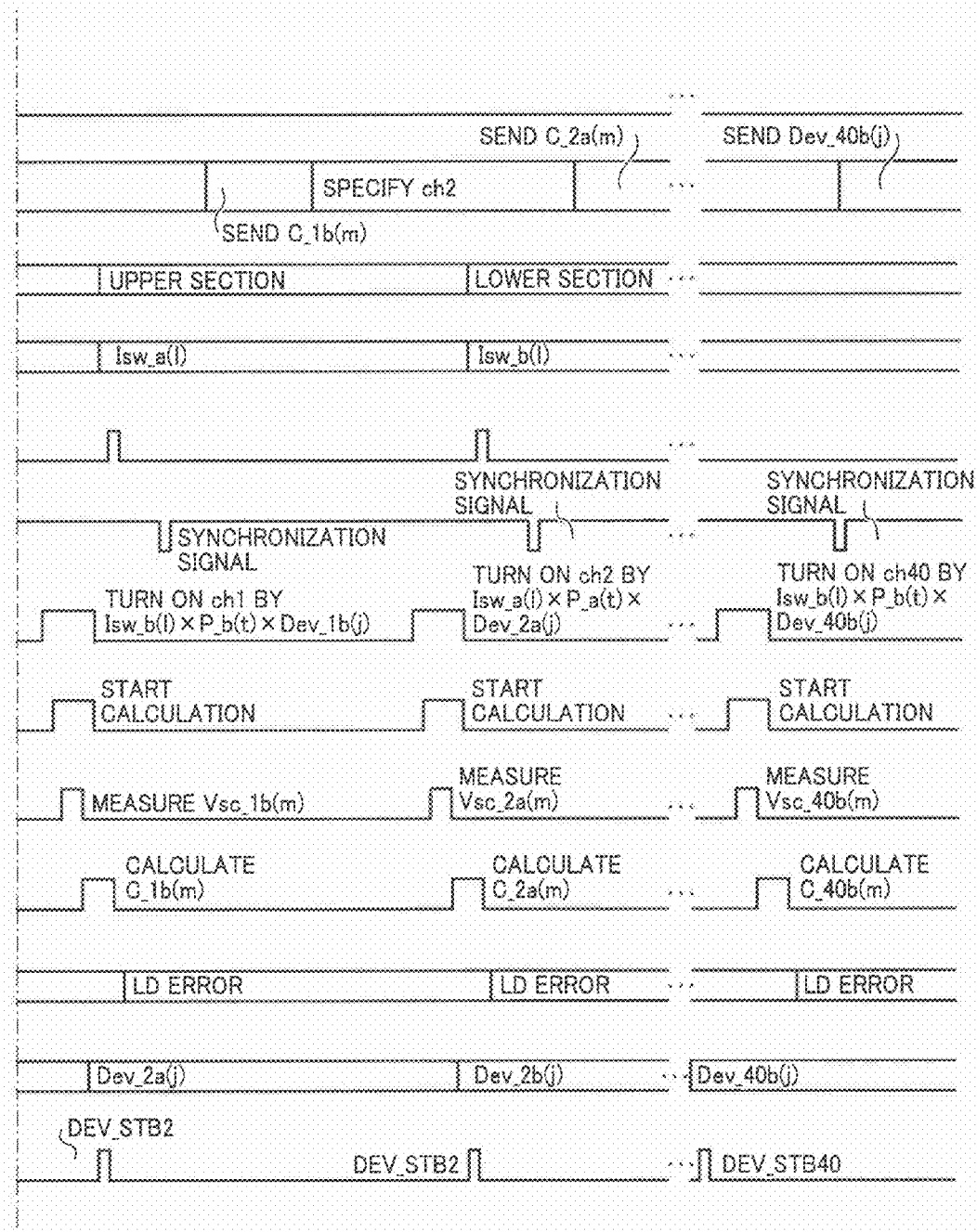
FIGS. 37A and 37B are timing charts that explain a scanning APC performed by the GAVD and the micro controller.
Figure 37B:
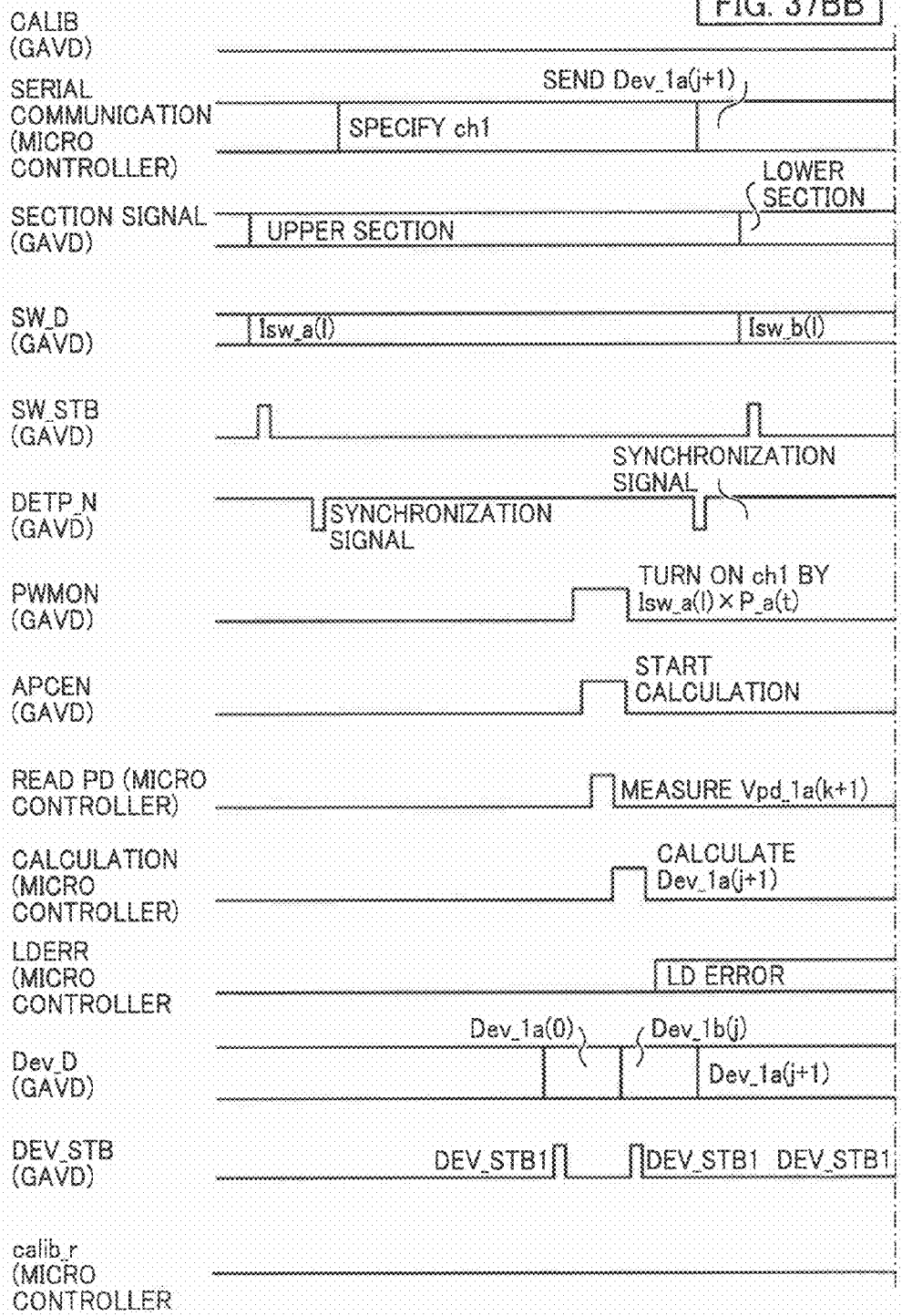
Figure 37B:
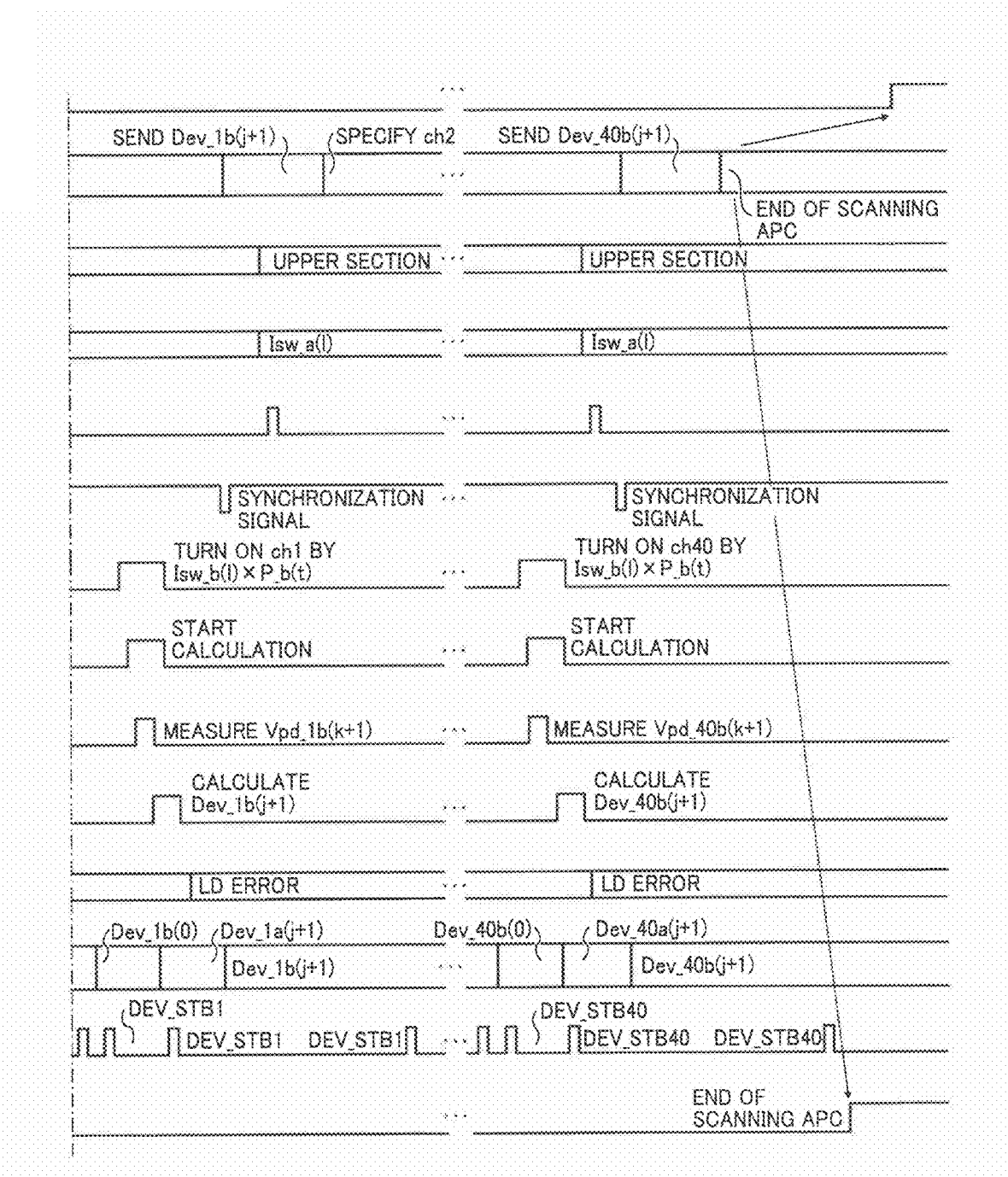

FIGS. 37A and 37B are timing charts that explain the scanning APC. The timing chart of the scanning APC is almost the same as the timing chart shown in FIGS. 26A and 26B that explains the calibration-value calculating process in the initializing operation. Upon detecting that the GAVD 200 negates the calibration signal "CALIB", the micro controller 302 starts the scanning APC process. When the calibration signal "CALIB" is negated, the micro controller 302 calculates the calibration values C_1a(m), C_1b(m), C_2a(m), C_2b(m), . . . , C_40a(m), and C_40b(m) using the measured scanning monitor voltages Vsc_1a(m), Vsc_1b(m), Vsc_2a(m), Vsc_2b(m), . . . , Vsc_40a(m), and Vsc_40b(m). When the process for ch40 is finished, the micro controller 302 sends a calib_r signal indicative of the end of the scanning APC process to the GAVD 200.

Figure 38:
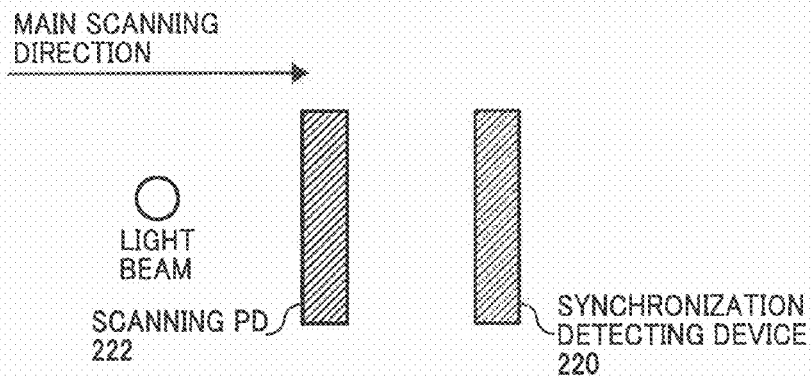
FIG. 38 is a layout plan of a scanning photodiode.

FIG. 38 is a layout plan of the scanning PD 222 that detects the scanning monitor voltage Vsc. The scanning PD 222 is arranged several millimeters away from the synchronization detecting device 220 in the main-scanning direction so that the scanning beam irradiates the scanning PD 222 before the synchronization detecting device 220. The width of the scanning PD 222 in the main-scanning direction is several millimeters. Alternatively, the scanning PD 222 can be arranged in such a manner that the scanning beam irradiates the scanning PD 222 after the synchronization detecting device 220.

When the level of the signal output from the photoelectric conversion element 218 is lower than a threshold, the micro controller 302 determines the LD is in failure and sends the LDERR signal as the error signal to the GAVD 200. The threshold is stored in the ROM area of the memory 308. When the LDERR signal is asserted, the GAVD 200 notifies the main CPU 300 of the error of the LD and instructs the main CPU 300 to display a service call message or the like. The LDERR issuing process is described below.

When determining that the LD error occurs by referring to the level of the signal output from the photoelectric conversion element 218, the micro controller 302 asserts the LDERR signal and sends the LDERR signal to the GAVD 200. The GAVD 200 sets an error value indicative of a type of the error to the RAM area of the memory 308, thereby notifying the main CPU 300 of the type of the error. The main CPU 300 determines an action to be taken by referring to the error value.

The types of error includes as follow:
Error No. 1: Failure of the Photoelectric Conversion Element 218

This error is detected when the intensity monitor voltages of all the channels of the VCSEL 208 are 0 volt (V), while the output from the intensity measuring unit including the synchronization detecting device 220 is not 0 millivolt (mV).
Error No. 2: Failure of the VCSEL 208

This error is detected when the intensity monitor voltages of all the channels of the VCSEL 208 are 0 V and the intensity measuring unit is 0 mV.
Error No. 3: Failure of the Specified Channel of the VCSEL 208

This error is detected when the intensity monitor voltage of the specified channel is 0 V. The specified channel is determined to be an error channel. The channel number of the error channel is sent to the GAVD 200. The GAVD 200 writes the received channel number to the register memory.

The following functional errors can be detected in the initializing operation in addition to Errors No. 1 to No. 3.
Error No. 4: Error in which Any Channel-Based Intensity Monitor Voltages are not Acquired This error is detected when the intensity monitor voltages of all the channels of the VCSEL 208 are 0 V.
Error No. 5: Error in which the Intensity Monitor Voltage of the Specified Channel is not Acquired This error is detected when the intensity monitor voltage of the specified channel is 0 V.
Error No. 6: Deterioration of the VCSEL 208

This error is detected when the correction value Dev is larger than +32% or smaller than −32%.

The errors that may occur in the line APC can be set by the LDERR signal. The errors, for example, include:
Error No. 7: Error in which the Intensity Monitor Voltage of the Specified Channel is Acquired This error is detected when the intensity monitor voltage of the specified channel is 0 V.
Error No. 8: Deterioration of the VCSEL 208

This error is detected when the correction value Dev is larger than +32% or smaller than −32%.

The errors that may occur in the sheet-interval APC can be indicated by the LDERR signal. The errors, for example, include:
Error No. 9: Deterioration of the VCSEL 208

This error is detected when the correction value Dev is larger than +32% or smaller than −32% even after the common current Isw is updated.

The error indicated by Error No. 8 is tried to be corrected by the sheet-interval APC process. When the error cannot be corrected by the sheet-interval APC process, the error is then categorized to Error No. 9. The image forming apparatus 100 sends data about the error that is acquired by the GAVD 200 to the main CPU 300. The main CPU 300 checks the type of the error and displays a corresponding message, e.g., the service call message, on an operation panel of the image forming apparatus 100.

When the intensity of the VCSEL 208 is changed by the process control, the beam divergence angle can be changed by the nature of the VCSEL 208. As described in the above section about the scanning APC, the change of the beam divergence angle changes the relation between the intensity of the scanning beam on the photosensitive element and the intensity monitor voltage of the photoelectric conversion element 218 from the relation that is observed before shipment. Therefore, it is necessary to update the calibration value C_ch.

In a second embodiment of the present invention, the intensity of the VCSEL 208 is adjusted more precisely by updating the calibration value several times by the process-control APC, the line APC, and the sheet-interval APC.

The calibration value is updated at the following timing: when the toner patterns 150 shown in FIG. 27 are formed; immediately before when each of the toner patterns is formed at the timing shown in the timing chart shown in FIGS. 29A and 29B; and after the LD power that is selected by the process control is set. Although the time that it takes for the process control in the second embodiment is longer than that in the first embodiment, the intensity of the laser beam emitted from each channel of the VCSEL can be adjusted more precisely to the target value.

A calibration-value updating process according to the second embodiment is described below. In the following description, the calibration-value updating process is performed in the line APC and the sheet-interval APC.

In the line APC according to the first embodiment, it is necessary to scan two main-scanning lines by deflection by the polygon mirror 102c to calculate the correction value Dev and the bias current Ibi of the channel specified by the micro controller 302. Assume that the line APC is performed from ch1 to ch40, sequentially. In this case, an arbitrary channel is subjected to the line APC every 80 lines.

In some cases, because of the situation in which the image forming apparatus 100 operates or the properties of the VCSEL 208, the intensity control every 80 lines is not enough to catch up a change of the I-L curve shown in FIG. 11 caused by the change in the temperature. The insufficient intensity control brings formation of an undesired image.

To shorten the interval between the line APCs, in the second embodiment, only the calculation and setting of the correction value Dev is performed by the line APC and the detection and setting of the bias current Ibi is performed by the sheet-interval APC. As a result, the interval between the line APCs is reduced to 40 lines, i.e., an arbitrary channel is subjected to the line APC at the half cycle.

Figure 39:
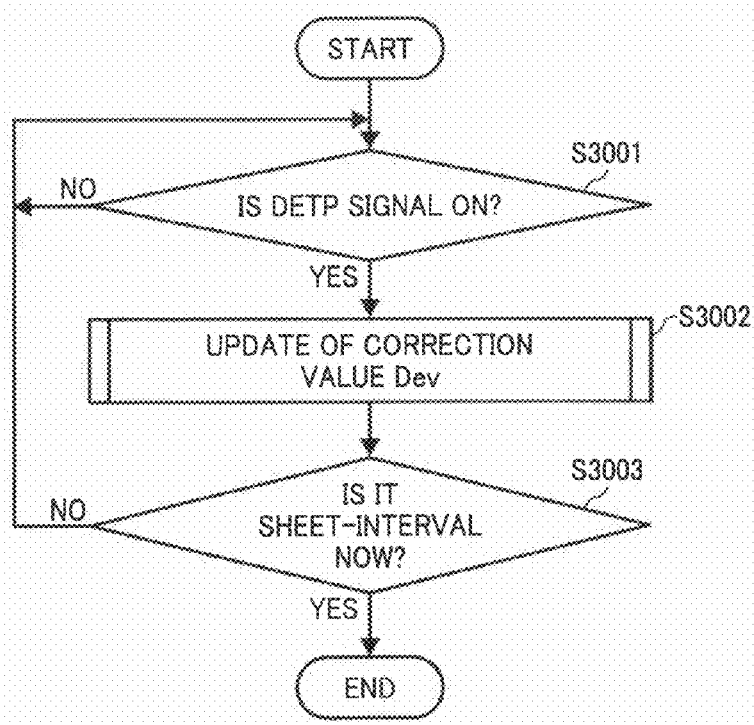
FIG. 39 is a flowchart of a process of updating the correction value Dev by a line APC according to a second embodiment of the present invention.

FIG. 39 is a flowchart of the line APC according to the second embodiment. The line APC according to the second embodiment is almost the same as the line APC according to the first embodiment shown in FIG. 30 except the update of the bias current Ibi is skipped.

Figure 40:
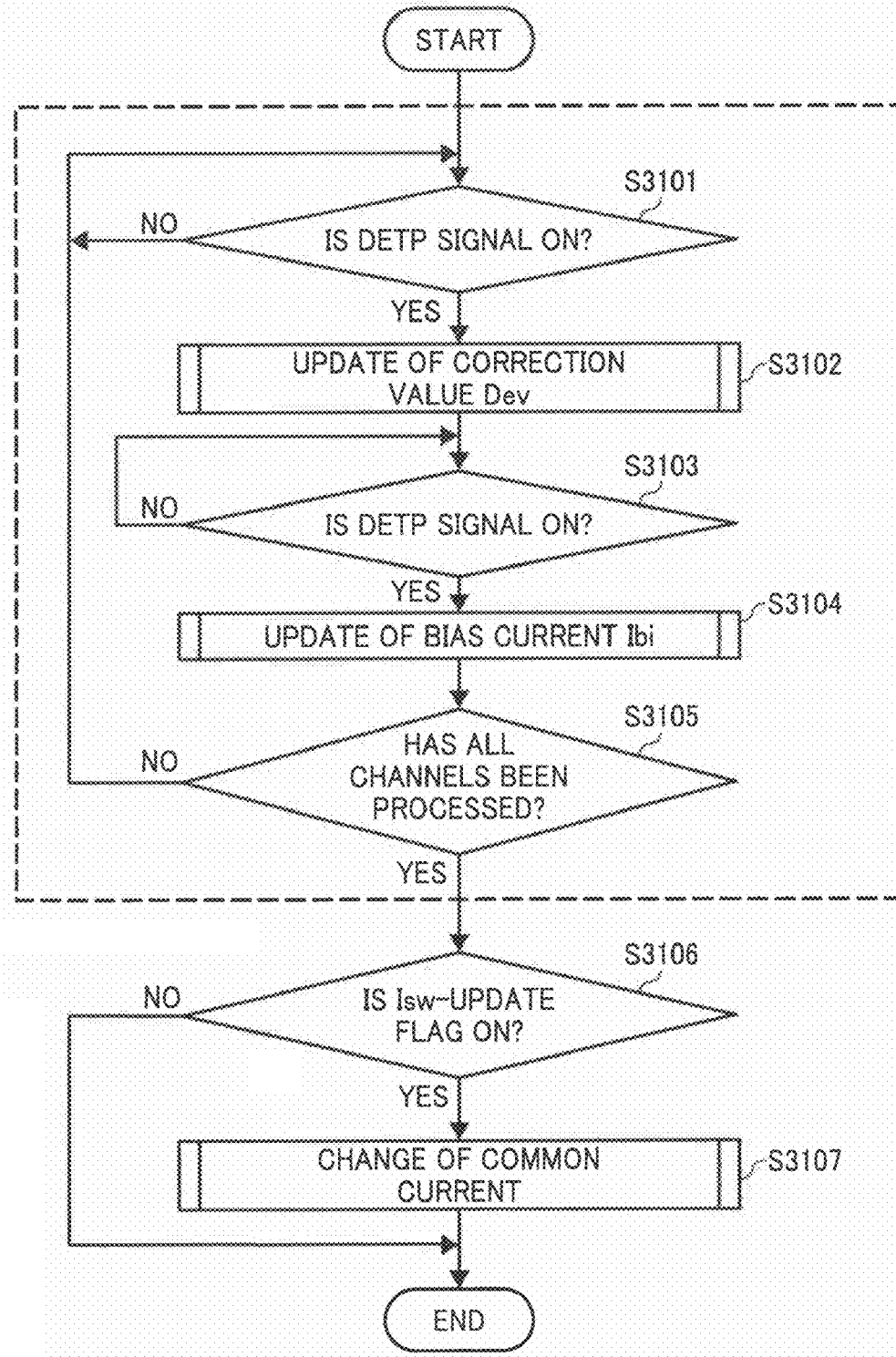
FIG. 40 is a flowchart of a process of updating the correction value Dev, the bias current Ibi, and the common driving current by a sheet-interval APC according to the second embodiment.

FIG. 40 is a flowchart of a sheet-interval APC according to the second embodiment. The sheet-interval APC according to the second embodiment includes all the processes of the sheet-interval APC according to the first embodiment shown in FIG. 35 and additional processes surrounded by a square indicated by a dot line. The additional processes are performed in the same manner as in the line APC according to the first embodiment. More particularly, the correction value Dev of the channel specified by the micro controller 302 is calculated. The bias current Ibi is calculated. If the bias currents of all the channels are updated, the processes of the sheet-interval APC according to the first embodiment are then performed.

As it has been mentioned above, the image forming apparatus 100 according to the first embodiment and the second embodiment performs the intensity control of the VCSEL 208, taking advantages of the multiple laser beams emitted from the VCSEL 208. With this configuration, the image forming apparatus 100 can perform improved image formation without applying a significant influence on latent image formation while reducing the size of the control circuit and the maintenance costs.

According to one aspect of the present invention, even when exposure by a plurality of split laser beams is used for image formation, an efficient control over intensities of the laser beams is implemented without increasing the size of the control circuit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
    a light source that emits a plurality of laser beams;
    a first beam splitter that splits each of the laser beams into a first beam for measuring an intensity of the laser beam and a second beam for scanning a photosensitive element to form an image based on image data;
    a deflecting unit that deflects a direction of the second beam using a multifaceted reflecting mirror provided in a multi-stage with a common rotating axis;
    a second beam splitter that splits the second beam into a plurality of split beams so that each of the split beams is incident on a reflecting surface of the deflecting unit in each stage;
    a first photoelectric converting unit that measures an intensity of the first beam and outputs a first voltage corresponding to measured intensity of the first beam;
    a second photoelectric converting unit that measures an intensity of each of the split beams and outputs a second voltage corresponding to measured intensity of each of the split beams; and
    a control unit that updates, for each of the split beams, a driving-current correction value for correcting a driving current commonly set to for laser beams to be emitted from the light source in advance based on the first voltage and the second voltage, corrects the driving current using updated driving-current correction value, and controls intensities of the laser beams based on corrected driving current.

2. The image forming apparatus according to claim 1, further comprising a detecting unit that detects an arrival of a first split beam at a scanning start point of the photosensitive element, wherein
    in a predetermined time after the detecting unit detects the arrival of the first split beam at the scanning start point, the control unit updates the driving-current correction value using the first voltage and the second voltage for a second split beam.

3. The image forming apparatus according to claim 1, wherein the control unit updates the driving-current correction value using the first voltage and the second voltage for each of the split beams when either one of a change in temperature inside the image forming apparatus and the intensity of the second beam reaches a predetermined value.

4. The image forming apparatus according to claim 1, wherein the control unit updates the driving-current correction value at a time of executing a process control for adjusting performance of forming an image of the image data.

5. The image forming apparatus according to claim 1, wherein the control unit outputs any one of a synchronization signal triggering a first intensity correction to adjust the intensity of the split beam, a process-control signal triggering a second intensity process to adjust performance of forming an image of the image data, a sheet-interval signal triggering a third intensity correction to adjust an amount of the driving current after an end of first scanning of the photosensitive element by the split beam and before a start of second scanning of the photosensitive element, and a calibration signal triggering a fourth intensity correction to adjust the intensities of the laser beams when either one of a change in temperature inside the image forming apparatus and the intensity of the second beam reaches a predetermined value, and controls the intensities of the laser beams at a timing of outputting any one of the synchronization signal, the process-control signal, the sheet-interval signal, and the calibration signal.

6. The image forming apparatus according to claim 5, wherein
    the driving-current correction value is limited within a predetermined range,
    the control unit stores data on the range of the driving-current correction value and a correction-value adjustment value that for correcting the range of the driving-current correction value in a storing unit,
    when the driving current is within a correctable range that can be corrected using the driving-current correction value within the range, the control unit performs the first intensity correction and the second intensity correction,
    when the driving current out of the correctable range, the control unit performs the third intensity correction, and
    when the driving current out of the correctable range by in a range that can be corrected using the correction-value adjustment value, the control unit performs the fourth intensity correction.

7. The image forming apparatus according to claim 6, wherein the control unit measures the first voltage that is observed when the laser beam is emitted using the driving current, calculates the driving-current correction value using measured first voltage, a first reference value that functions as a default value for the first voltage, an intensity change value indicative of an amount of variation of the intensity of the laser beam, and the correction-value adjustment value, and corrects the driving current using calculated driving-current correction value, thereby obtaining a first corrected driving current, and performs the first intensity correction using the first corrected driving current.

8. The image forming apparatus according to claim 7, wherein the control unit measures the first voltage of the laser beam that is updated using the intensity change value, calculates the driving-current correction value using measured first voltage and a value that is obtained by multiplying the first reference voltage by the intensity change value, corrects the driving current using calculated driving-current correction value, thereby obtaining a second corrected driving current, and performs the second intensity correction using the second corrected driving current.

9. The image forming apparatus according to claim 7, wherein, when the driving current cannot be corrected using the driving-current correction value that is any value of the range, the control unit updates the driving-current correction value, corrects the driving current using updated driving-current correction value, thereby obtaining a third corrected driving current, and performs the third intensity correction using the third corrected driving current.

10. The image forming apparatus according to claim 7, wherein the control unit calculates the driving-current correction value using the second voltage and a second reference voltage that functions as a default value for the second voltage, corrects the driving current using calculated driving-current correction value, thereby obtaining a fourth corrected driving current, and performs the fourth intensity correction using the fourth corrected driving current.

11. The image forming apparatus according to claim 7, wherein when performing the first intensity correction and the second intensity correction, the driving-current correction value is calculated using $$\text{Dev\_ch}(j) = \text{C\_ch}(m) \times \left( \frac{\text{Vpd\_ch}(0)}{\text{Vpd\_ch}(k)} \right) \times P(t)$$

where Dev_ch(j) is the driving-current correction value, P(t) is the intensity change value, Vpd_ch(k) is the first voltage observed when the laser beam is emitted using the driving current, Vpd_ch(0) is the first reference voltage, and C_ch(m) is the correction-value adjustment value.

12. The image forming apparatus according to claim 7, wherein performing the fourth intensity correction, the correction-value adjustment value is calculated using $$\text{C\_ch}(m) = \frac{\text{Vsc}(0)}{\text{Vsc\_ch}(m)} \times P(t)$$

where C_ch(m) is the correction-value adjustment value, Vsc_ch(m) is the second voltage, and Vsc(0) is a second reference voltage that functions as a default value for the second voltage.

13. The image forming apparatus according to claim 7, wherein when performing the first intensity correction, the control unit measures the first voltage that is observed when the laser beam is emitted using a driving current Isw(1) that is the driving current after correction by the driving-current correction value and determines measured first voltage to be Vpd_ch(k), measures the first voltage that is observed when the laser beam is emitted using the driving current after correction by a latest driving-current correction value and determines measured first voltage to be Vpd_ch(k+1), calculates a variation amount of a driving current Ibi_ch(h) using $$\Delta \text{Ibi\_ch}(h) = \left( \frac{\text{Vpd\_ch}(k+1) - \text{Vpd\_ch}(0)}{\text{Vpd\_ch}(k+1) - \text{Vpd\_ch}(k)} \right) \times Isw(l)$$

where Vpd_ch(0) is the first reference voltage, and determines the intensity change value using calculated variation amount.

14. The image forming apparatus according to claim 5, wherein
the light source is a surface-emitting laser,
the first intensity correction is performed by a line automatic power control,
the second intensity correction is performed by a process-control automatic power control,
the third intensity correction is performed by a sheet-interval automatic power control, and
the fourth intensity correction is performed by a scanning automatic power control.

15. The image forming apparatus according to claim 5, wherein when performing the third intensity correction, the corrected driving current is calculated using $$Isw(l) = Isw(l-1) \times \left( \frac{\text{Dev\_chMax} + \text{Dev\_chMin}}{2} \right)$$

where Isw(1) is the corrected driving current, Isw(1-1) is the driving current before correction, Dev_chMax is upper limit of the driving-current correction value, and Dev_chMin is lower limit of the driving-current correction value.

16. An image forming method for an image forming apparatus that includes a light source that emits a plurality of laser beams, the image forming method comprising:
first beam splitting including a first beam splitter splitting each of the laser beams into a first beam for measuring an intensity of the laser beam and a second beam for scanning a photosensitive element to form an image based on image data;
deflecting including a deflecting unit including a direction of the second beam using a multifaceted reflecting mirror provided in a multi-stage with a common rotating axis;
second beam splitting including a second beam splitter splitting the second beam into a plurality of split beams so that each of the split beams is incident on a reflecting surface of the deflecting unit in each stage;
first converting including a first photoelectric converting unit measuring an intensity of the first beam and outputting a first voltage corresponding to measured intensity of the first beam;
second converting including a second photoelectric converting unit measuring an intensity of each of the split beams and outputting a second voltage corresponding to measured intensity of each of the split beams; and
controlling including a control unit updating, for each of the split beams, a driving-current correction value for correcting a driving current commonly set to for laser beams to be emitted from the light source in advance based on the first voltage and the second voltage, correcting the driving current using updated driving-current correction value, and controlling intensities of the laser beams based on corrected driving current.

17. The image forming method according to claim 16, further comprising detecting including a detecting unit detecting an arrival of a first split beam at a scanning start point of the photosensitive element, wherein in a predetermined time after the detecting unit detects the arrival of the first split beam at the scanning start point, the updating includes updating the driving-current correction value using the first voltage and the second voltage for a second split beam.

18. The image forming method according to claim 16, wherein the updating includes updating the driving-current correction value using the first voltage and the second voltage for each of the split beams when either one of a change in temperature inside the image forming apparatus and the intensity of the second beam reaches a predetermined value.

19. The image forming method according to claim 16, wherein the updating includes updating the driving-current correction value at a time of executing a process control for adjusting performance of forming an image of the image data.

* * * * *